United States Patent [19]

Tsiang

[11] Patent Number: 5,377,302
[45] Date of Patent: Dec. 27, 1994

[54] SYSTEM FOR RECOGNIZING SPEECH

[75] Inventor: Elaine Y. L. Tsiang, Seattle, Wash.

[73] Assignee: Monowave Corporation L.P., Seattle, Wash.

[21] Appl. No.: 938,862

[22] Filed: Sep. 1, 1992

[51] Int. Cl.$^5$ ............................................. G10L 9/00
[52] U.S. Cl. .................................. 395/2.44; 395/2.4; 395/2.6
[58] Field of Search ..................... 381/41–49; 395/2, 2.4, 2.44, 2.6, 2.11, 2.41, 2.64; 382/22, 30

[56] References Cited

U.S. PATENT DOCUMENTS

| | | | |
|---|---|---|---|
| 4,422,459 | 12/1983 | Simson | 128/702 |
| 4,536,844 | 8/1985 | Lyon | 364/487 |
| 4,905,285 | 2/1990 | Allen | 395/2 |
| 5,058,179 | 10/1991 | Denker et al. | 382/14 |
| 5,067,164 | 11/1991 | Denker et al. | 382/15 |
| 5,105,468 | 4/1992 | Guyon et al. | 382/14 |

OTHER PUBLICATIONS

Chong et al. "Classification and Regression Tree Neural Networks For Automatic Speech Recognition", IEEE, Jul. 1900, pp. 187–190.

Cun et al. "Handwritten Digit Recognition: Applications of Neural Network Chips and Automatic Learning", IEEE, Nov. 1989, pp. 41–46.

"Fundamentals of Hearing—An Introduction," by Yost et al., Holt, Rinehart and Winston, Second Edition, Chapter 6, pp. 52–70, New York, N.Y., 1977/12.

"Exploring the Space-Time Structure at the Output of a Cochlear Model," by Monderer, Columbia University, 1988, pp. 24–62.

"A Theory for Multiresolution Signal Decomposition: The Wavelet Representation," by S. Mallat, IEEE Trans. on Patt. Anal. and Mach. Intell., vol. 11, No. 7, pp. 674–693, Jul. 1989.

"An Analog Neural Network Processor and its Application to High-Speed Character Recognition," by Boser et al., IEEE, pp. I415–I420, Jul. 1991.

"Modularity and Scaling in Large Phonemic Neural Networks," by Waibel et al., IEEE Trans. on Acoustics, Speech, and Signal Proc., vol. 37, No. 12, pp. 1888–1989, Dec. 1989.

"The Meta-Pi Network: Connectionist Rapid Adaptation for High-Performance Multi-Speaker Phoneme Recognition," by Hampshire, II et al., IEEE, pp. 165–168, 1990.

"Frequency-Time-Shift-Invariant for Robust Continuous Speech Recognition," by Sawai, IEEE, pp. 45–98, 1991.

(List continued on next page.)

Primary Examiner—Allen R. MacDonald
Assistant Examiner—Michelle Doerrler
Attorney, Agent, or Firm—Majestic, Parsons, Siebert & Hsue

[57] ABSTRACT

A pattern recognition system particularly useful for recognizing speech or handwriting. An input signal is first filtered by a filter bank having two stages where the outputs of the first stage is fed forward to the second stage of a significant number of filters and the output of the second stage is fed back to the first stage of a significant number of the filters. Such feedback enhances the signal-to-noise ratio and resembles the coupling between the different sections of the basilar membrane of the cochlear. The output of the filter bank is a two-dimensional frequency-time representation of the original signal. A second set of filters which takes as input two-dimensional signals, detects the presence of elementary tonotopic features such as the onset, rise, fall and frequency of any significant tones in a speech signal. A third set of filters detects any contrasts in the elementary features at various levels of resolution. After such filtering, a neural network is employed to learn patterns formed from the multi-resolution contrasts in the identified features so that the system recognizes symbols from an input signal that is continuous in time. In the case of speech, the system recognizes continuous speech in a speaker-independent manner, and is also tolerant of noise.

75 Claims, 44 Drawing Sheets

OTHER PUBLICATIONS

"Neocognition: A Hierarchical Neural Network Capable of Visual Pattern Recognition," by Fukishima, *Neural Networks*, vol. 1, pp. 119–130, 1988.

"Handwritten Digit Recognition with a Back-Propagation Network," by Le Cun et al., A Neural Information Processing Systems 2, Morgan Kaufman Publishers, San Mateo, Calif., pp. 396–404, 1984/01.

"Methods for Enhancing Neural Network Handwritten Character Recognition," by Garris et al., *IEEE*, pp. 1695–1700, 1991.

"Complete Discrete 2-D Gabor Transforms by Neural Networks for Image Analysis and Compression," by Daugman, *IEEE Trans. on Acoustics, Speech, and Signal Processing*, vol. 36, No. 7, pp. 1169–1179, Jul. 1988.

"Uncertainty Relation for Resolution in Space, Spatial Frequency, and Orientation Optimized by Two-Dimensional Visual Cortical Filters," by Daugman, *J. Opt. Soc. Am.*, vol. 2, No. 7, pp. 1160–1169, Jul. 1985.

"Readings in Speech Recognition," by Waibel et al., Morgan Kaugmann Publishers Inc., San Mateo, Calif., 1990, pp. 1–5.

"Voice and Speech Processing," by Parsons, McGrall-Hill Book Company, 1987, pp. 291–292.

"Continuous-Time Temporal Back-Propagation," by Day et al, *IEEE*, pp. I1195–I1100, 1991.

"Connectionist Approaches," Chapter 7, pp. 371–392, 1989, Massachusette Institute of Technology.

"Method for Computing Motion in a Two-Dimensional Cochlear Model," by Sondhi, *J. Acoust. Soc. Am.*, vol. 63, No. 5, pp. 1468–1477, May 1978.

"A Computational Cochlear Nonlinear Preprocessing Model with Adaptive Q Circuits," by Hirahara et al., *IEEE*, pp. 496–499, 1989.

"A Computationally Efficient Basilar-Membrane Model," by Strube, pp. 207–214, Federal Republic of Germany, 1985, vol. 96.

"Implementation of Nonlinear Wave-Digital-Filter Cochlear Model," by Friedman, *IEEE*, pp. 397–400, 1990.

"Darpa Neural Network Study," Oct. 1987–Feb. 1988, pp. 111–156.

"Image Coding Using Lattice Vector Quantization of Wavelet Coefficients," by Antonini et al., *IEEE*, 1991, pp. 2273–2276.

"A Complete Parametrization of 2D Nonseparable Orthonormal Wavelets," by Basu et al., Proceedings IEEE-SP, Time-Frequency and Time-Scale Analysis, 1992, pp. 55–58.

"Character Recognition with Selective Attention," by Fukushima et al., *IEEE*, pp. I593–I598, 1991.

"TDNN-LR Continuous Speech Recognition System Using Adaptive Incremental TDNN Training," by Inui-Dani et al., *IEEE*, pp. 53–56, 1991.

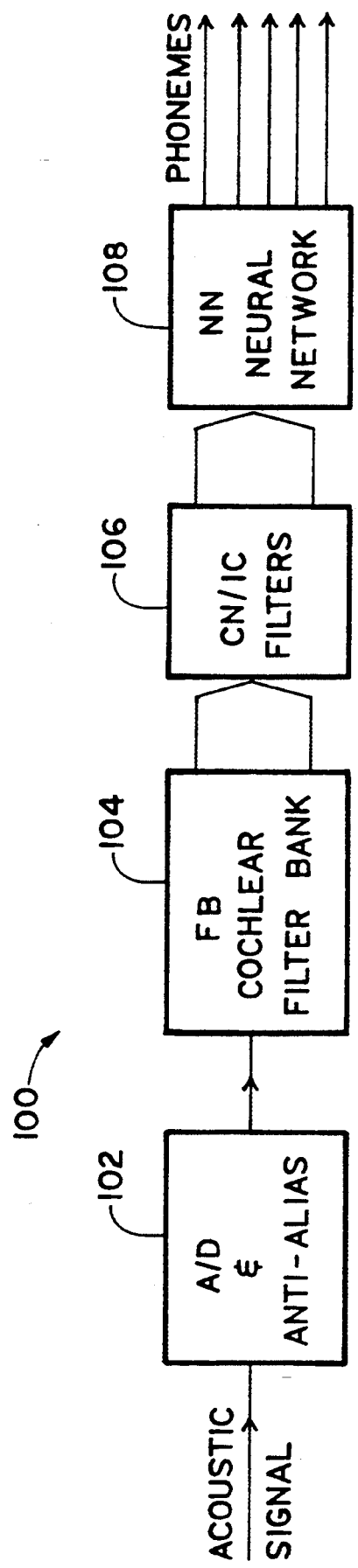
FIG._1.

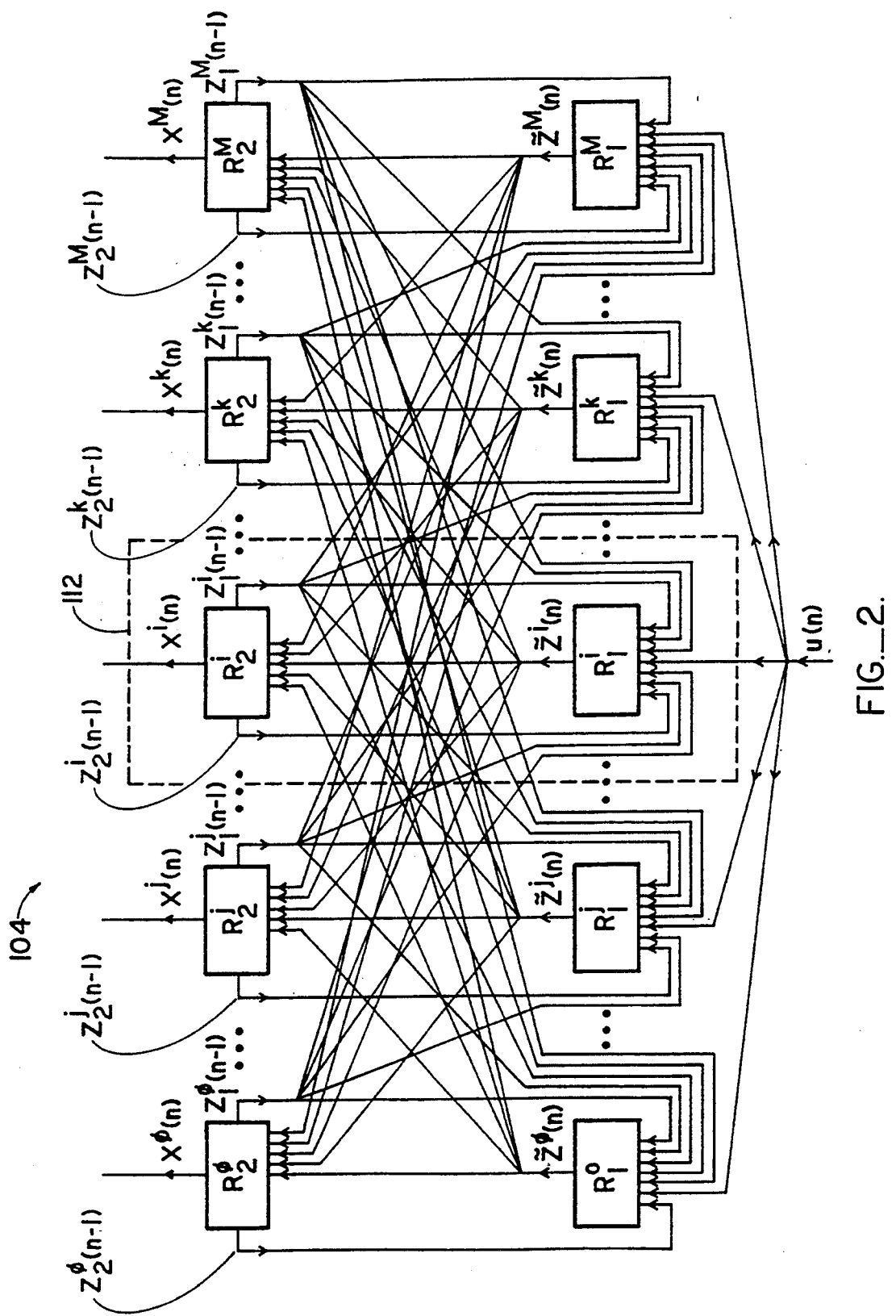
FIG._2.

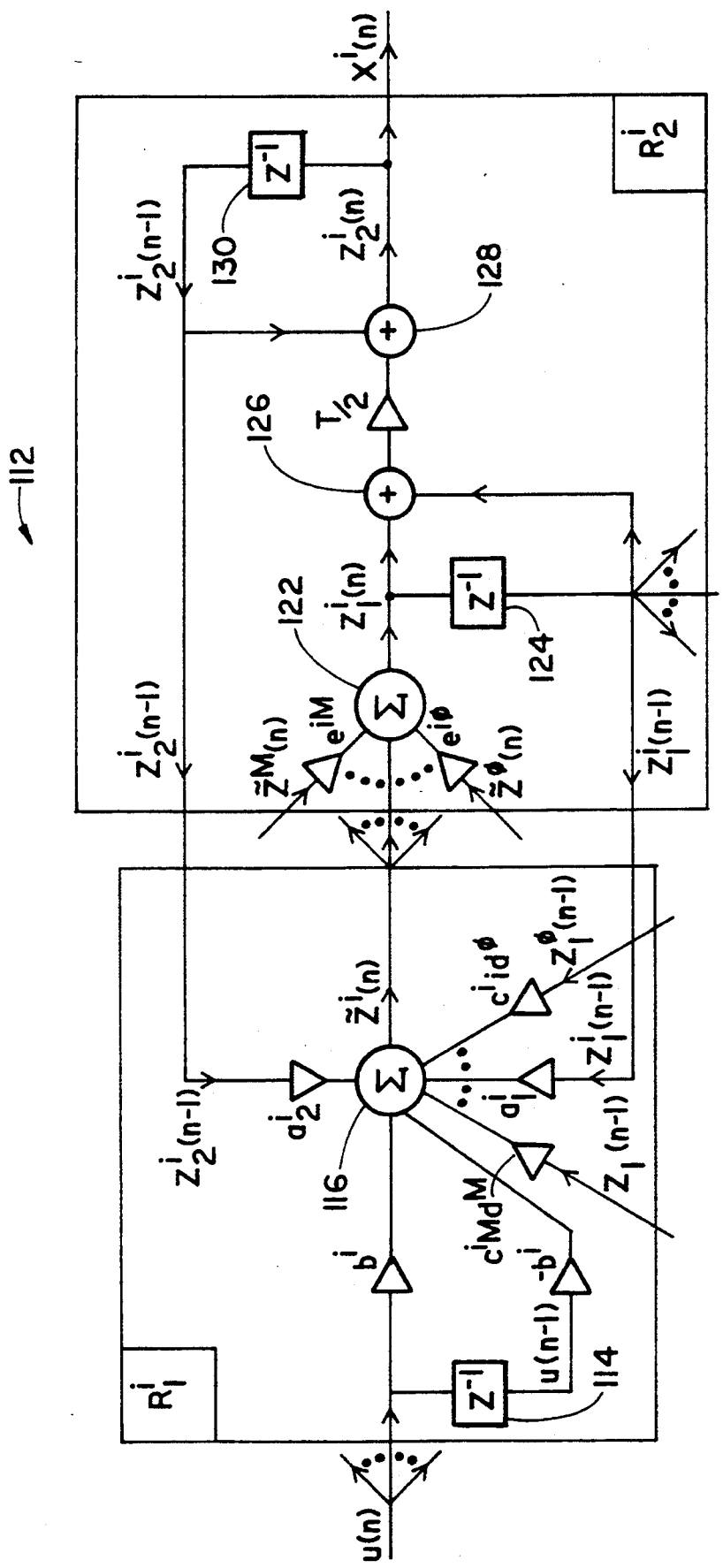
FIG._3.

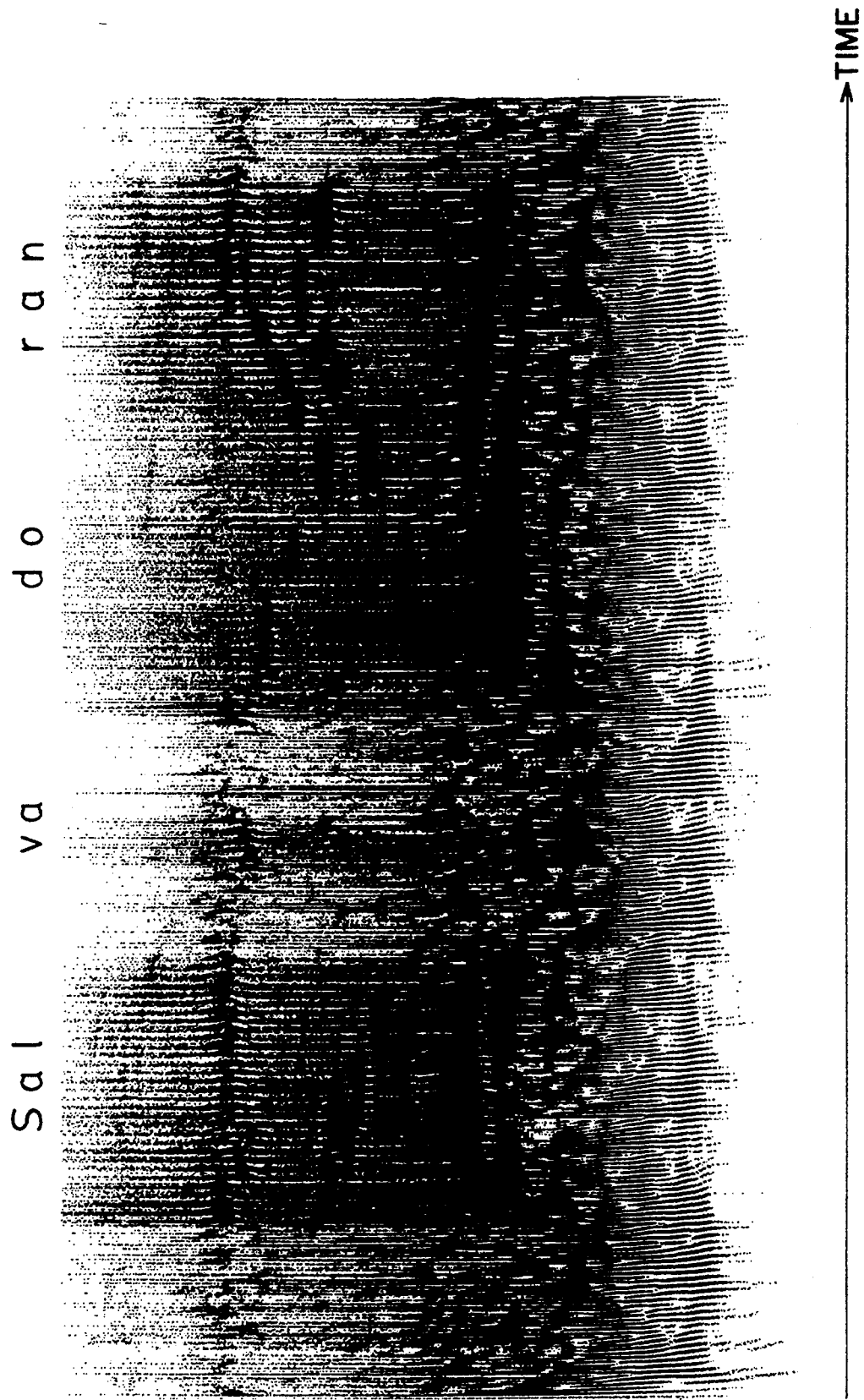
FIG._4.

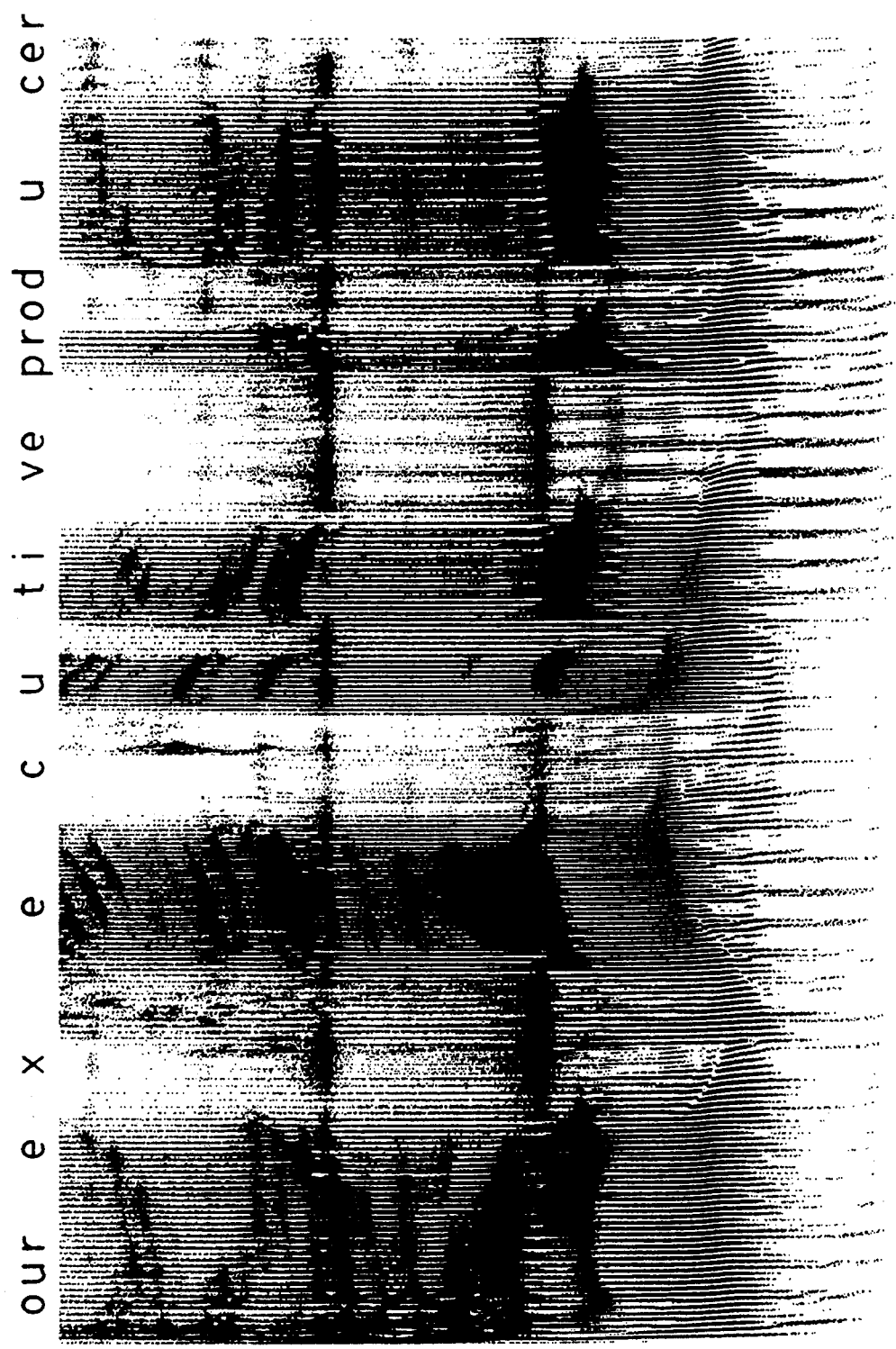
FIG._5.

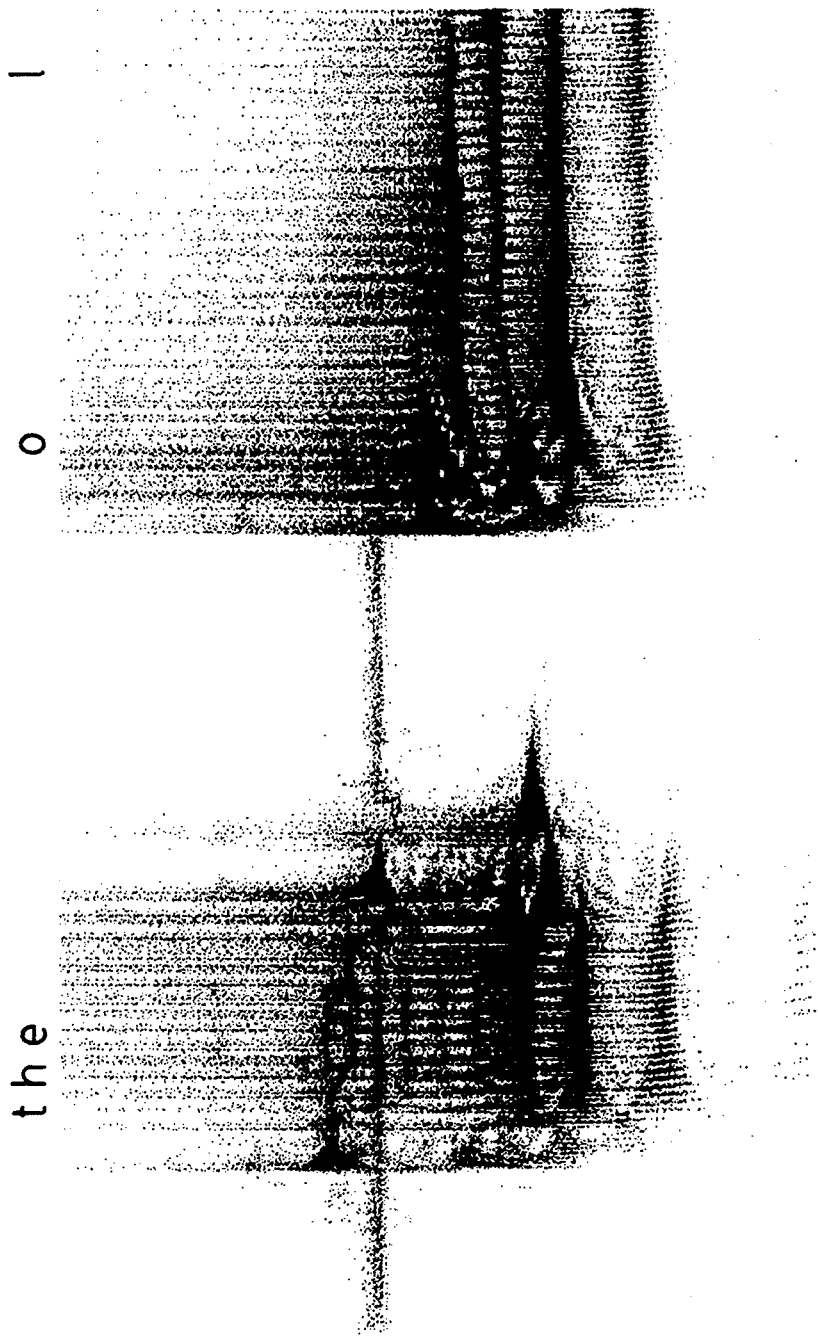
FIG._6.

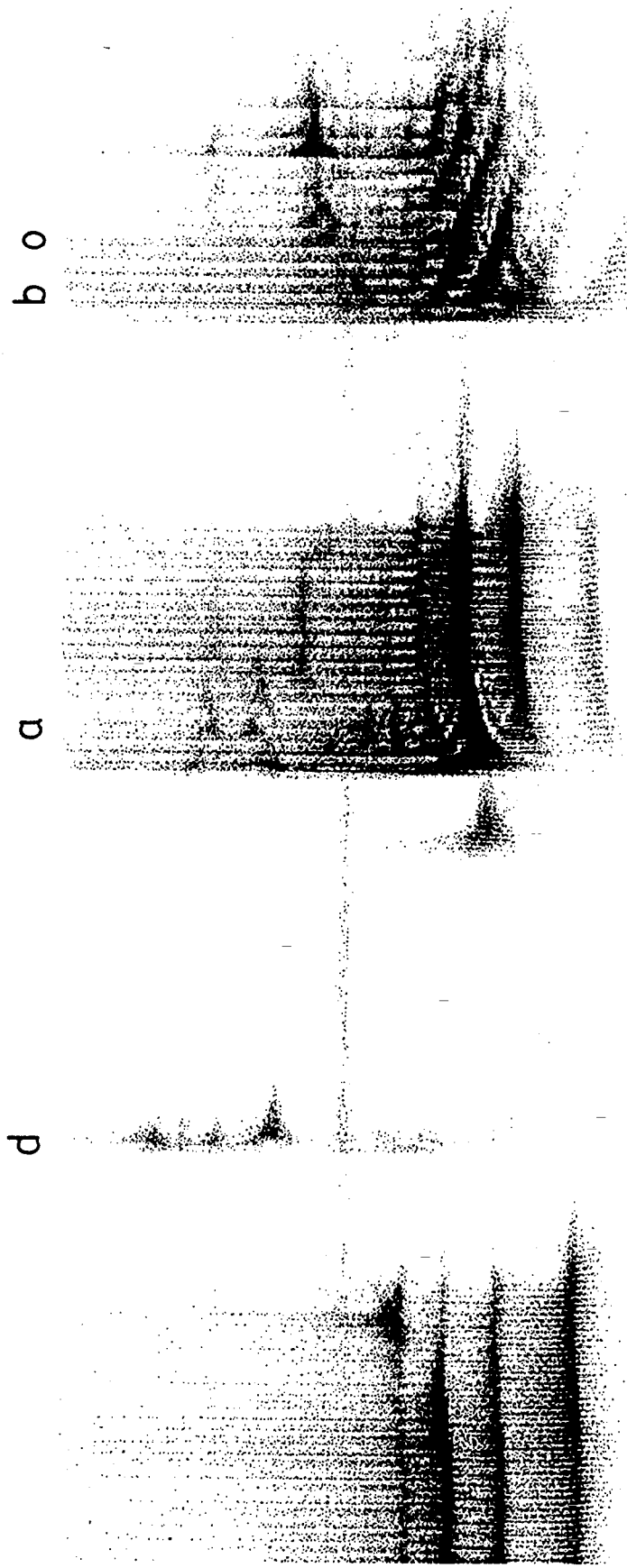
FIG._7.

FIG.__8A.
FIG.__8B.
FIG.__8C.
FIG.__8D.
FIG.__8E.
FIG.__8F.
FIG.__8G.
FIG.__8H.

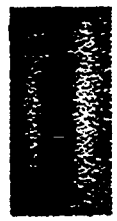
FIG._9A.
FIG._9B.
FIG._9C.
FIG._9D.
FIG._9E.
FIG._9F.
FIG._9G.
FIG._9H.

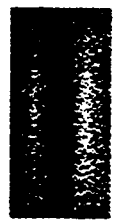
FIG._10A.
FIG._10B.
FIG._10C.
FIG._10D.
FIG._10E.
FIG._10F.
FIG._10G.
FIG._10H.

FIG.—10 I.
FIG.—10J.
FIG.—10K.
FIG.—10L.
FIG.—10M.
FIG.—10N.
FIG.—10 O.
FIG.—10P.

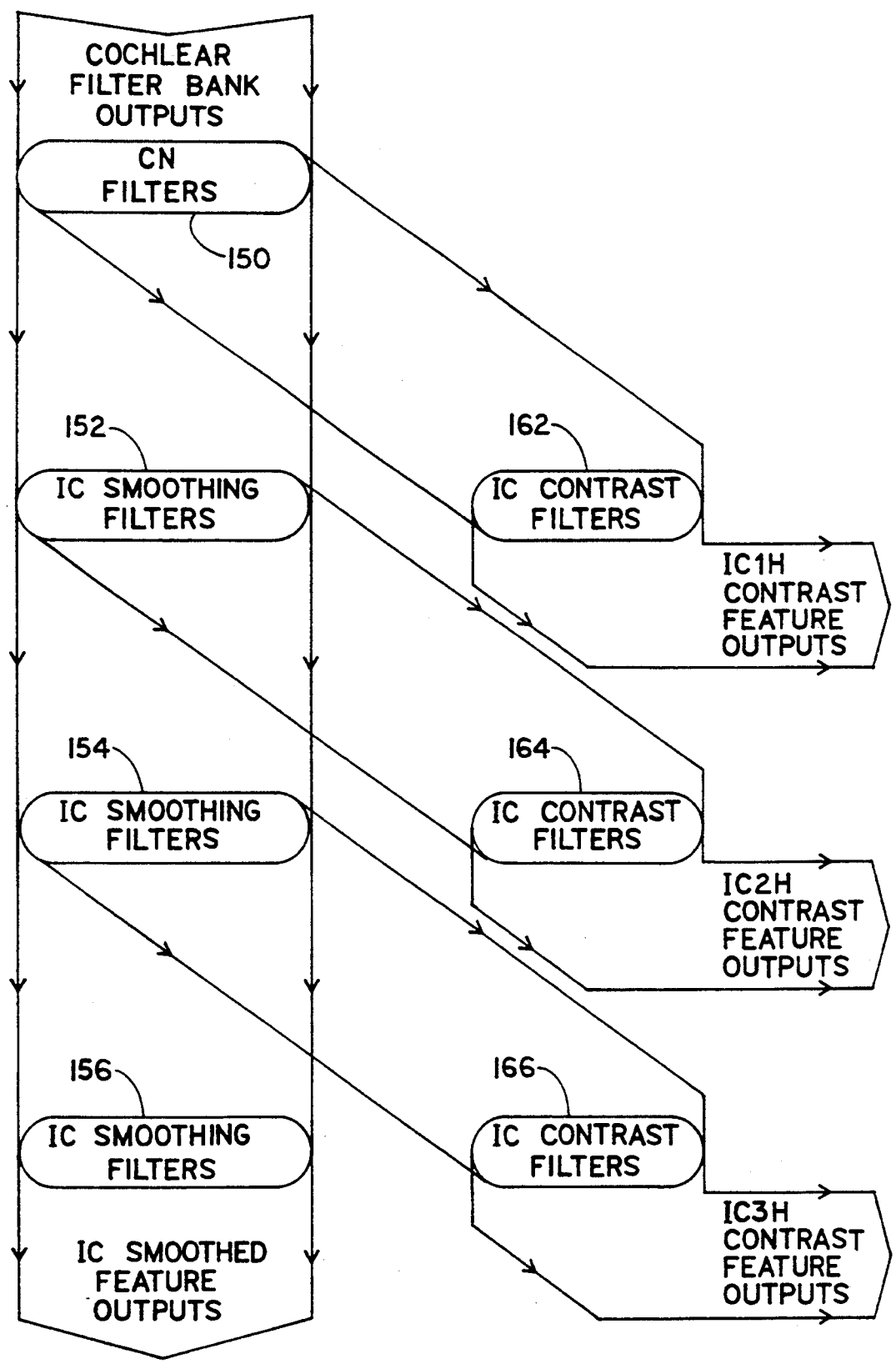
FIG.\_11A.

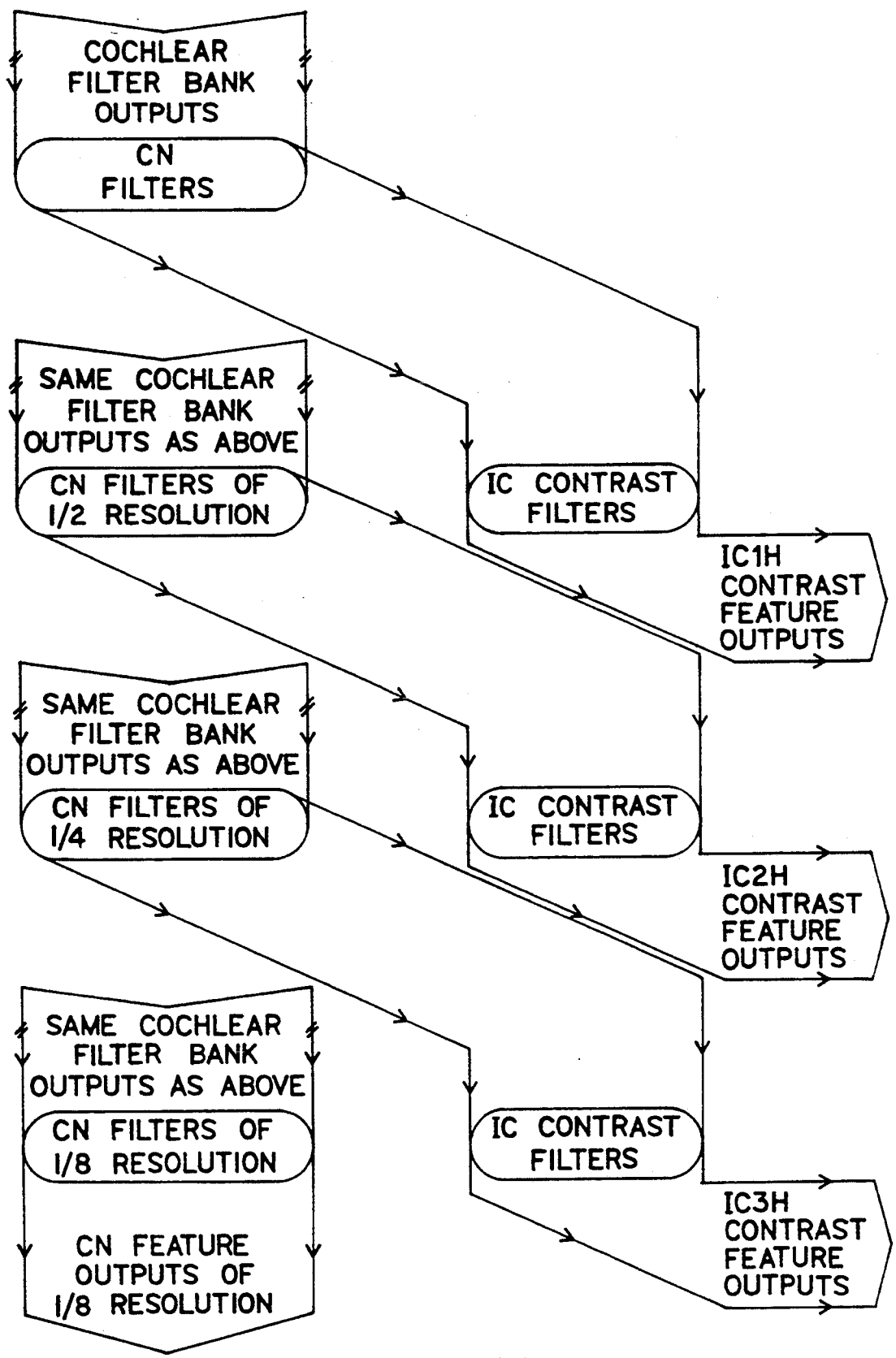
FIG._11B.

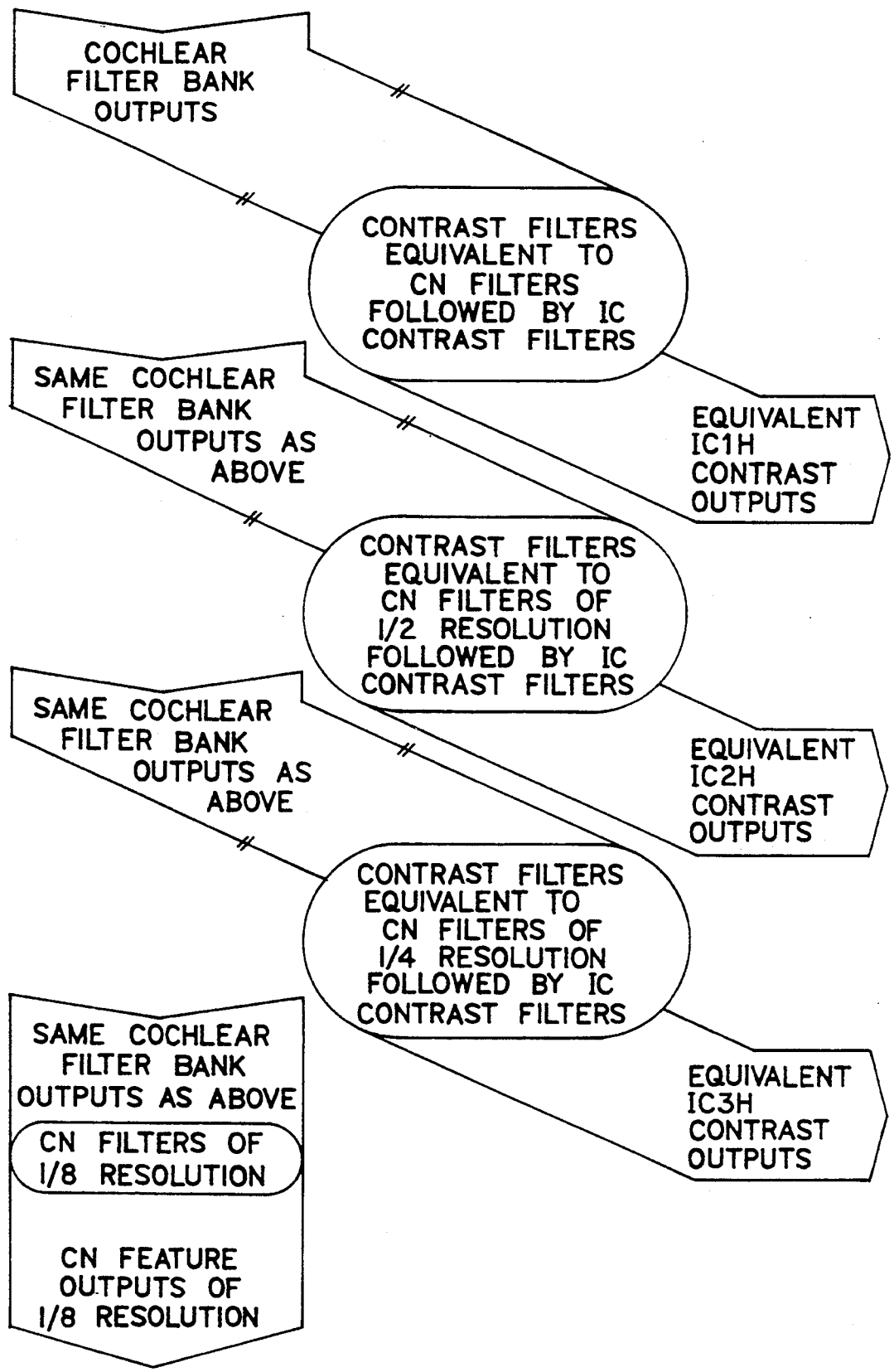
FIG._11C.

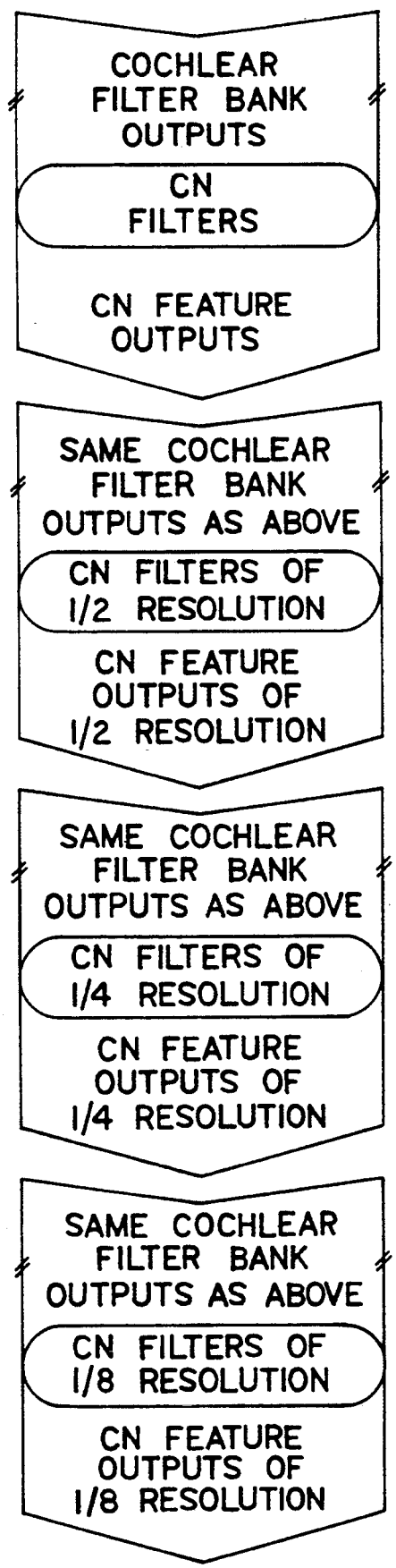
FIG._11D.

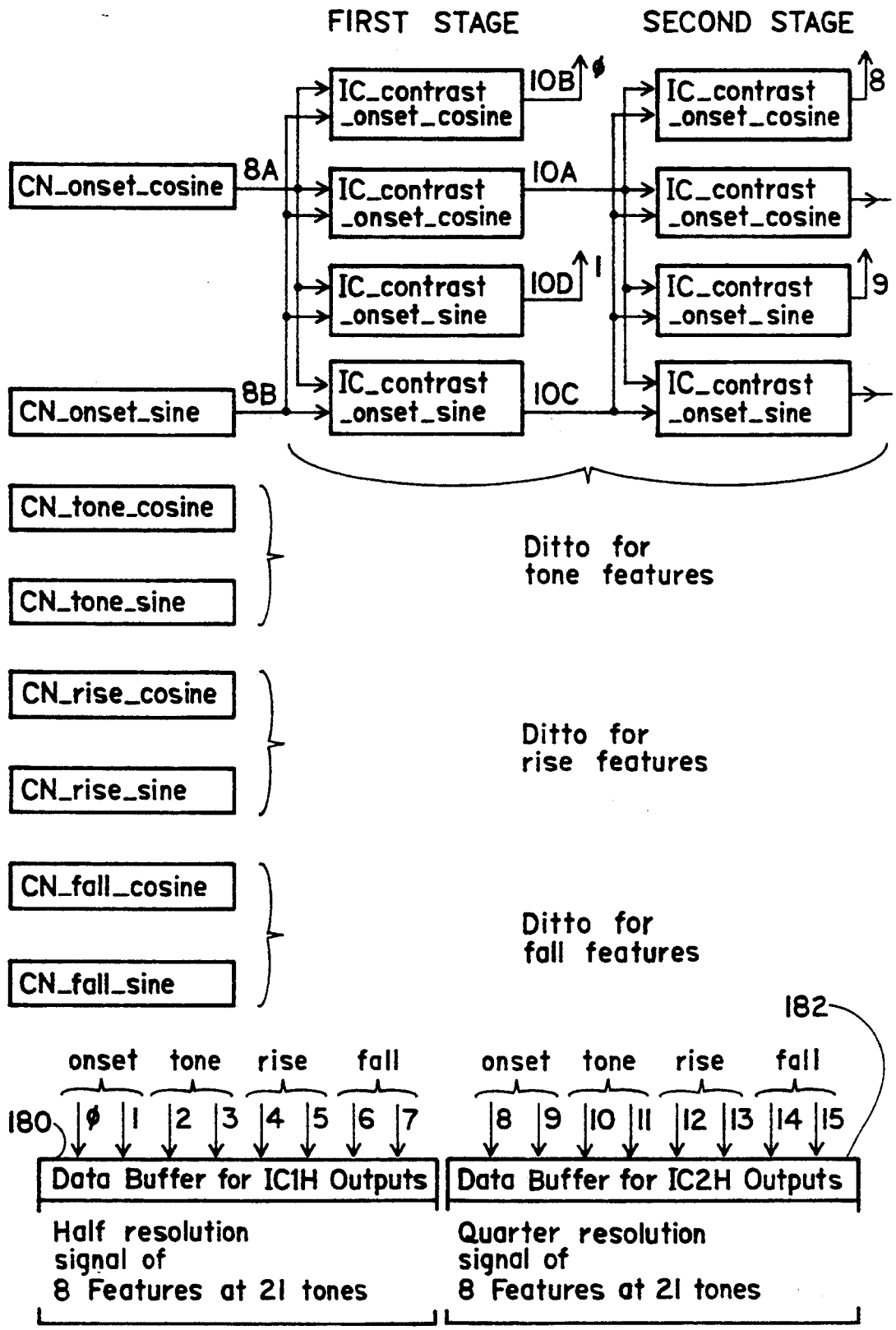
FIG._12.

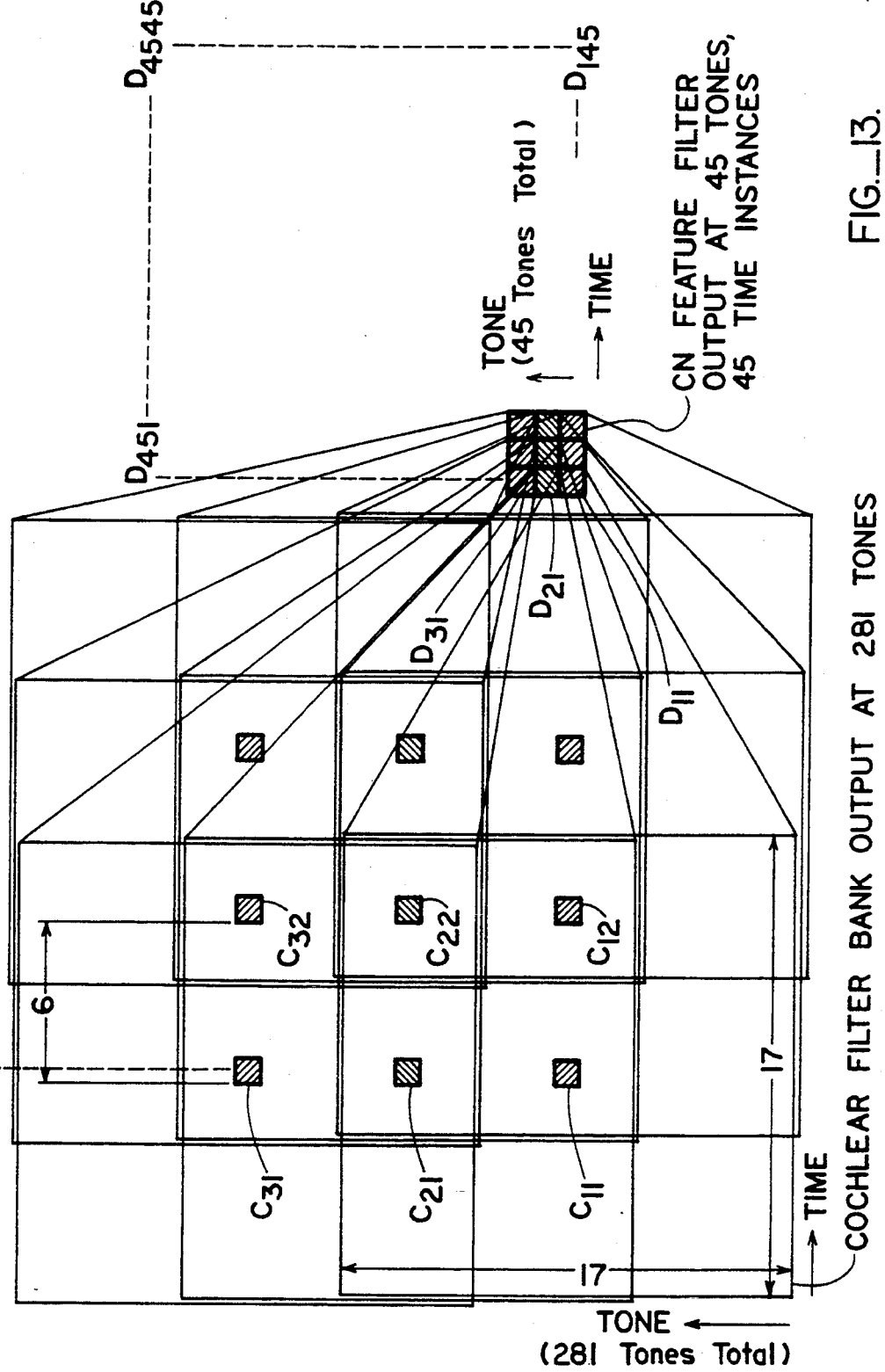
FIG._13.

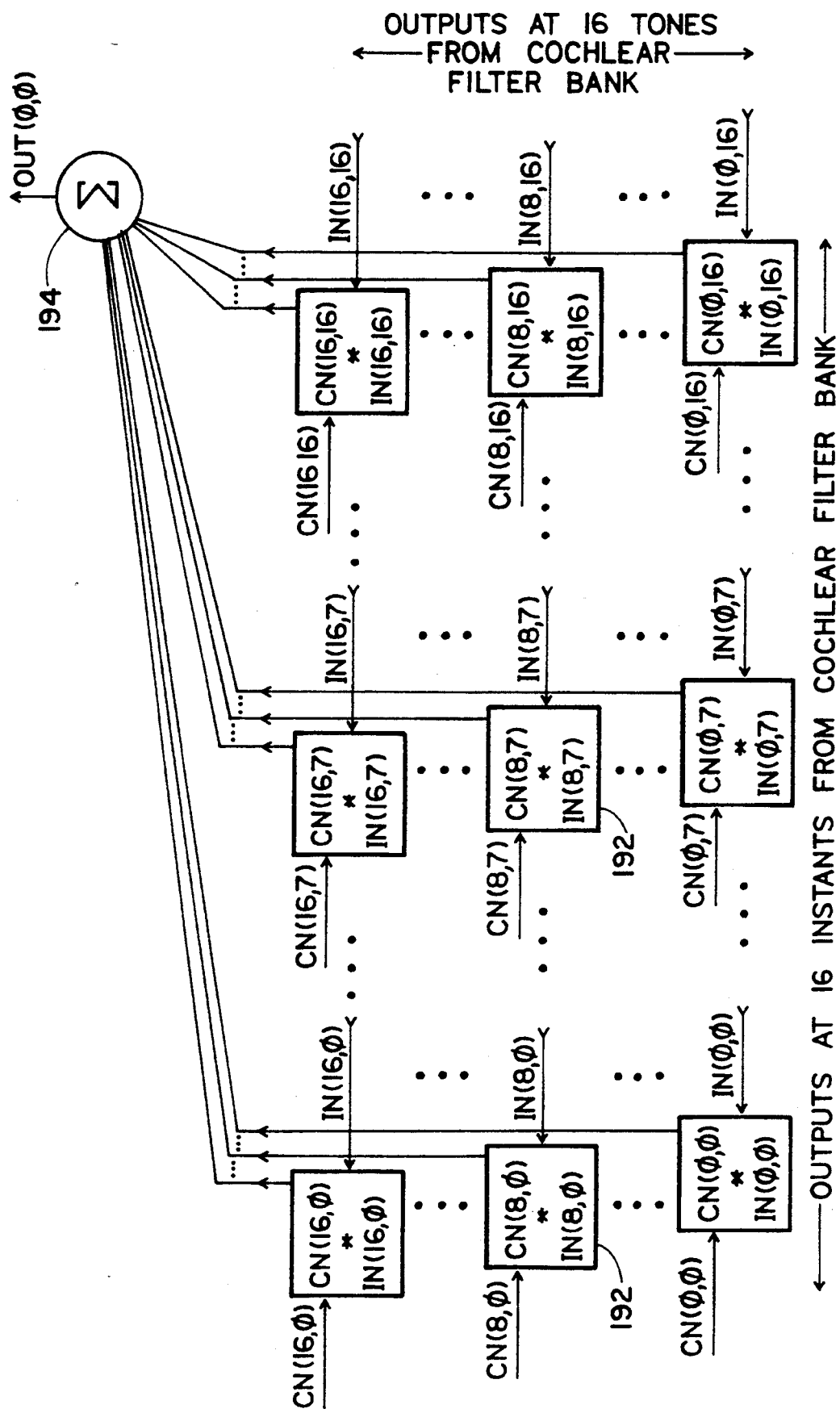
FIG._14.

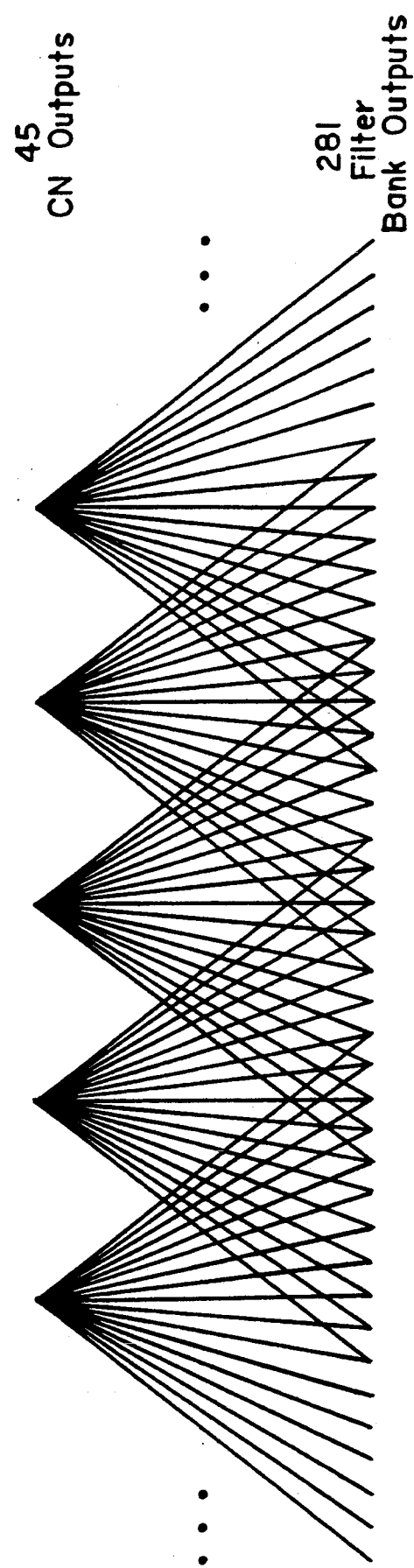
FIG._15.

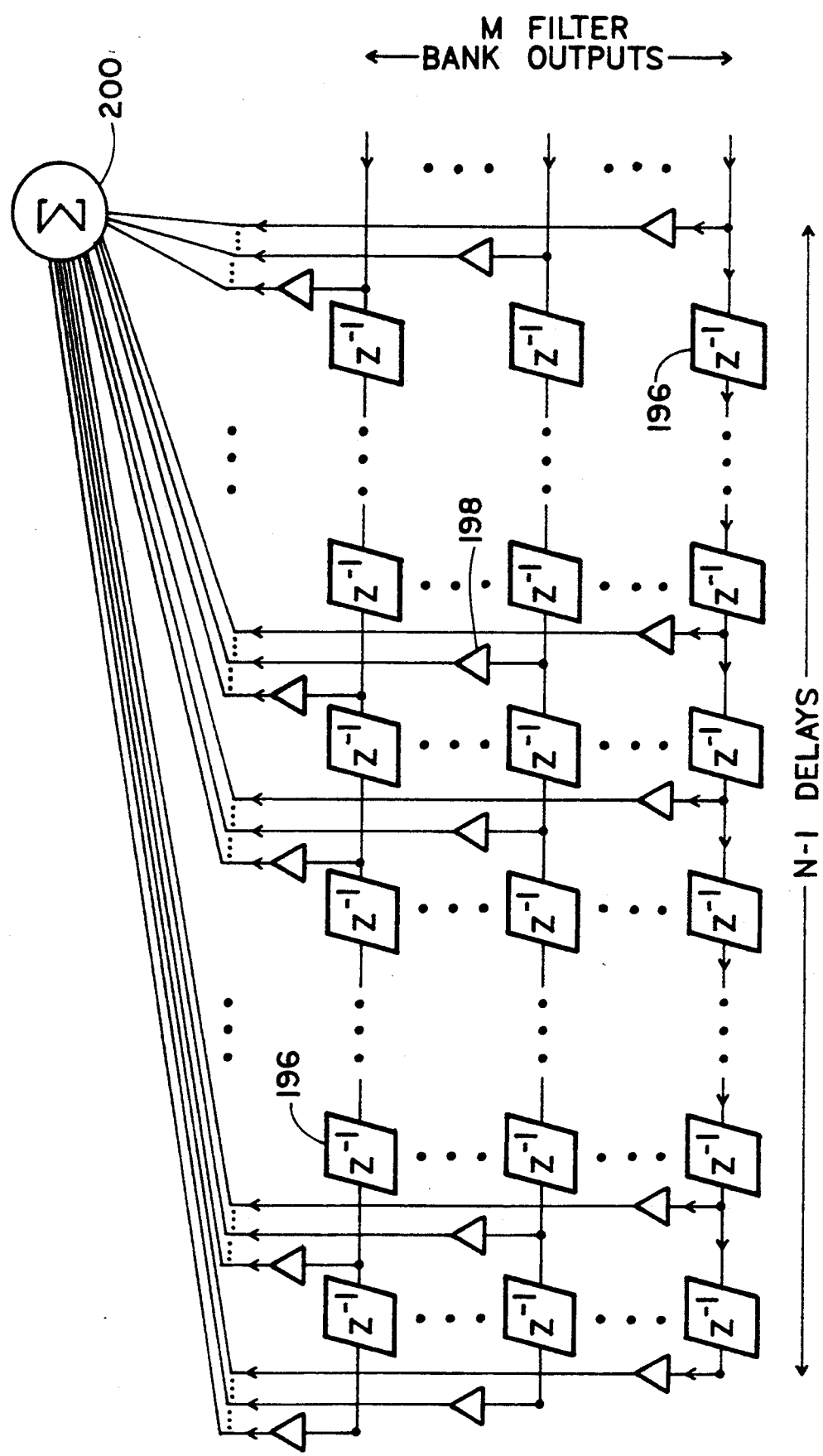
FIG._16.

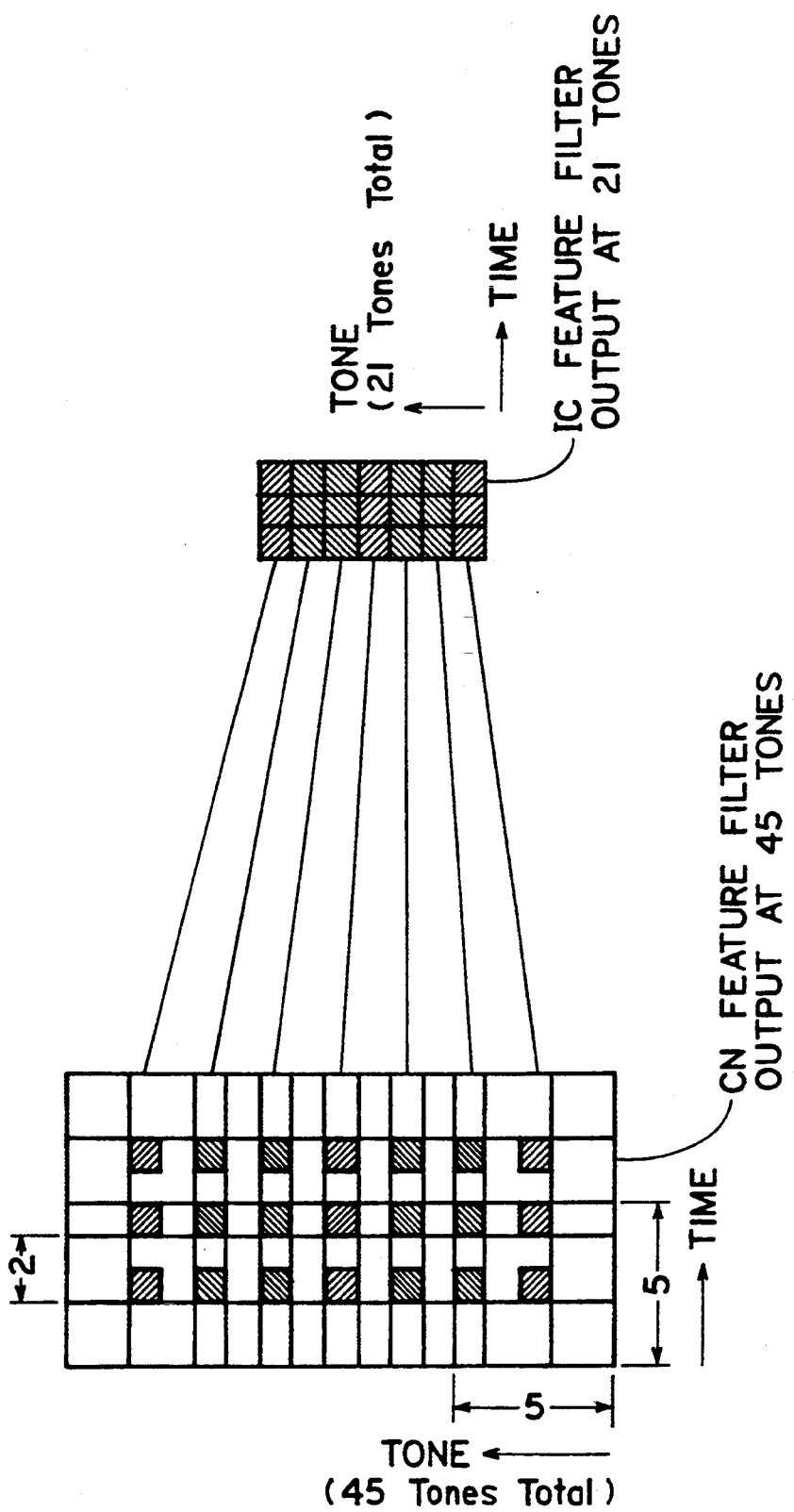
FIG._17A.

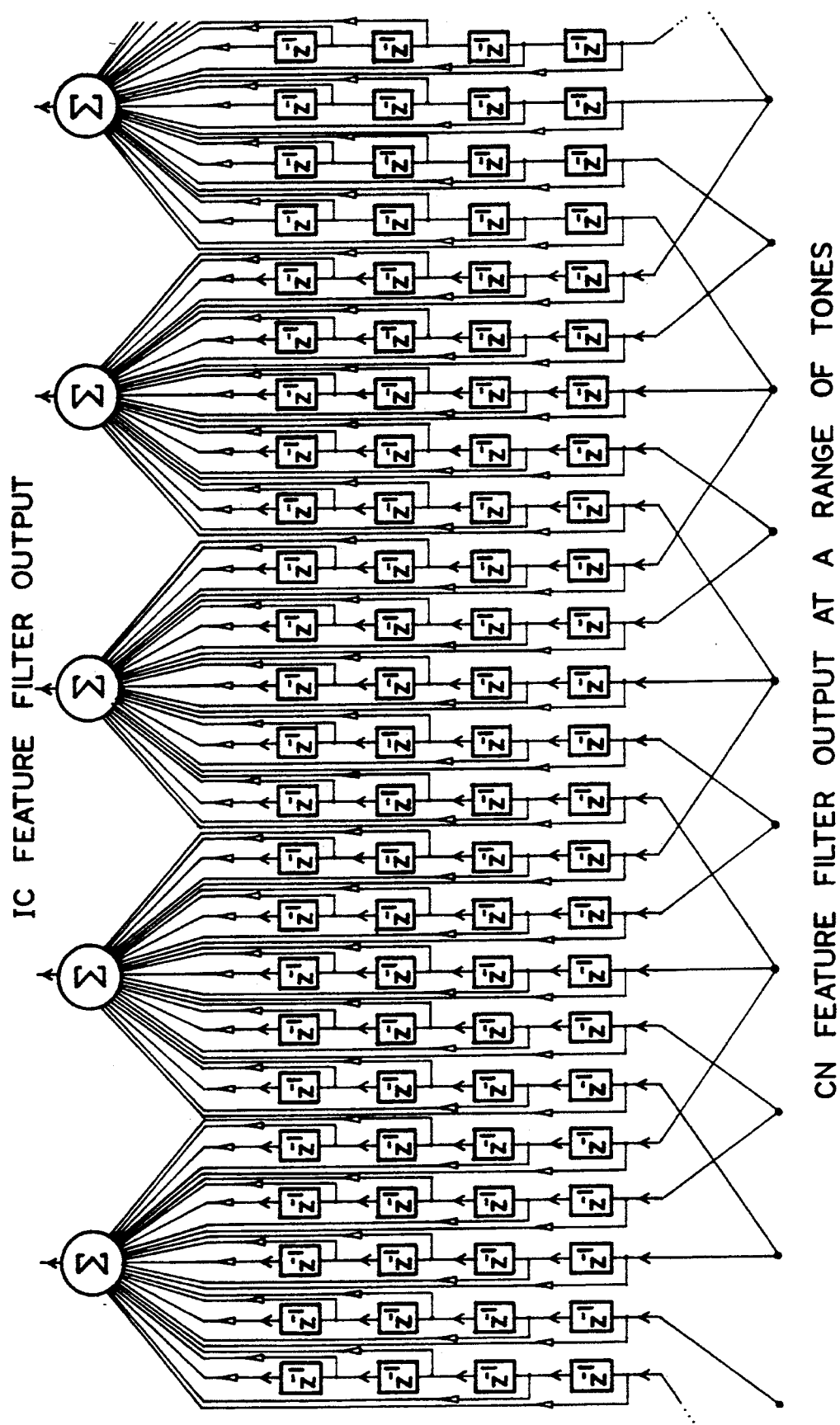
FIG._17B.

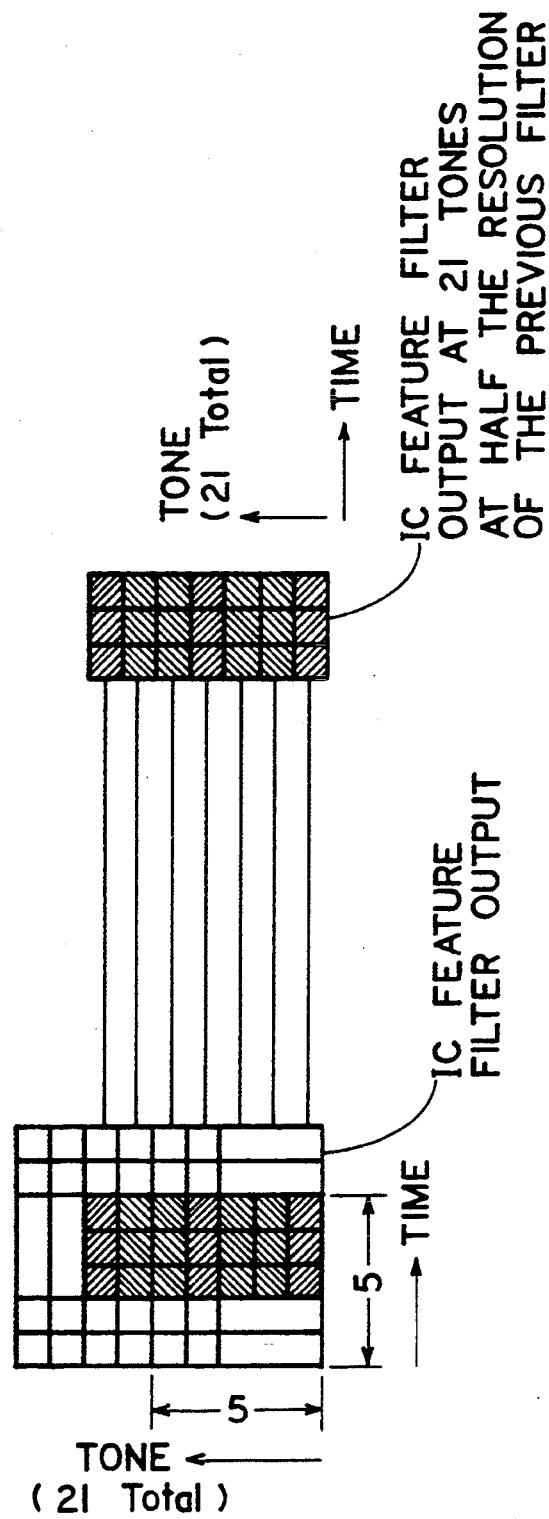
FIG._18A.

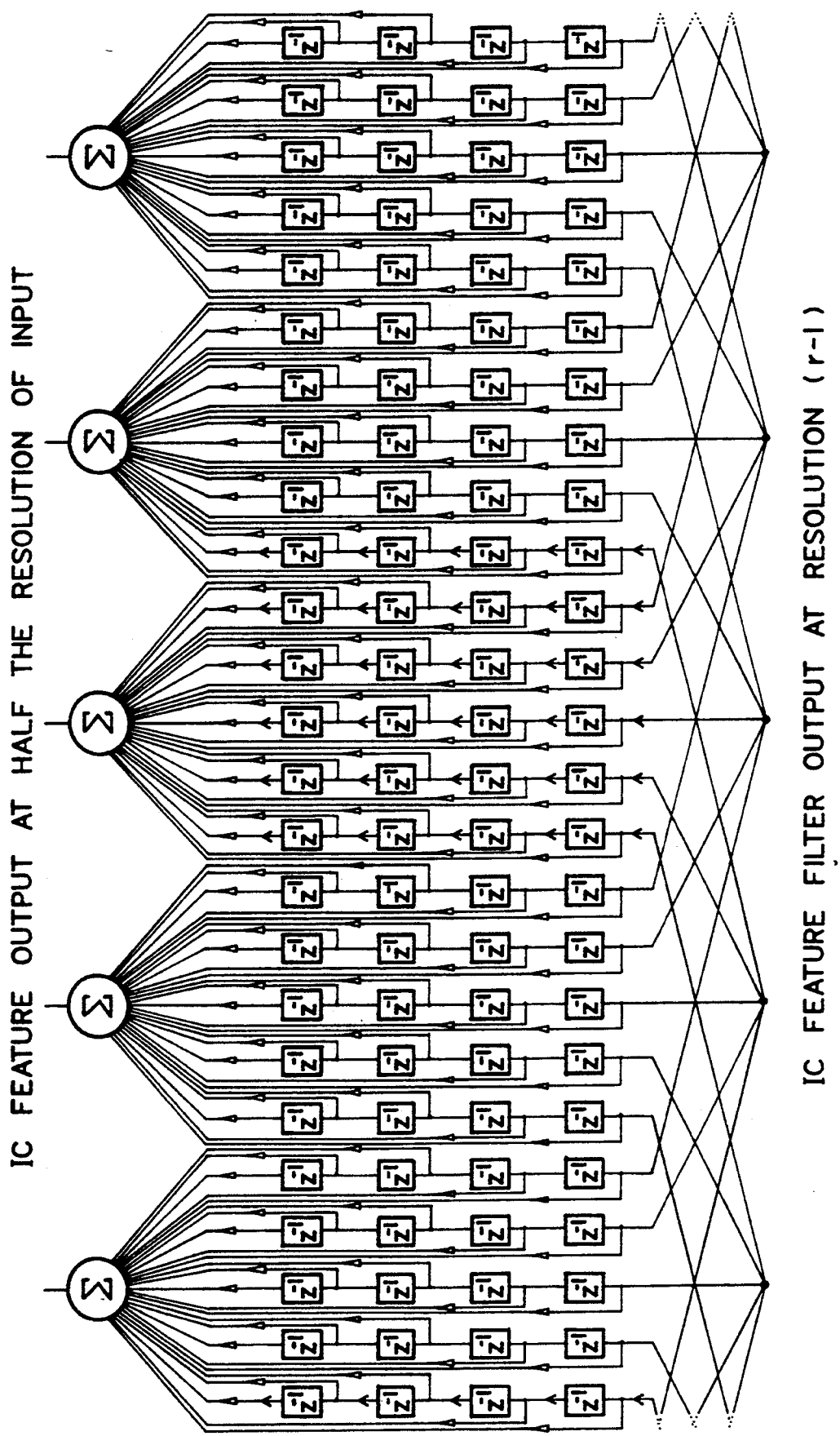
FIG._18B.

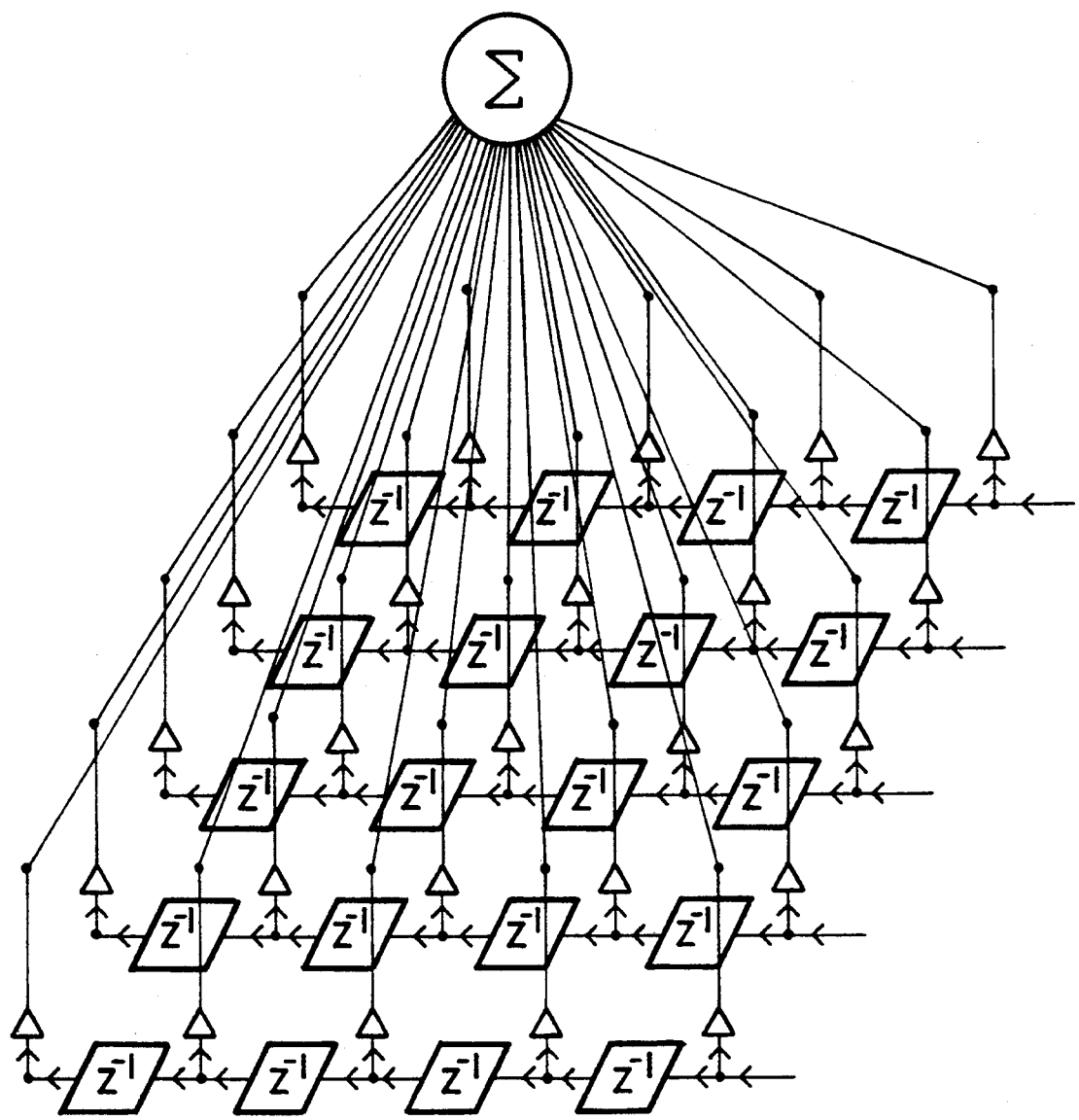
FIG._20.

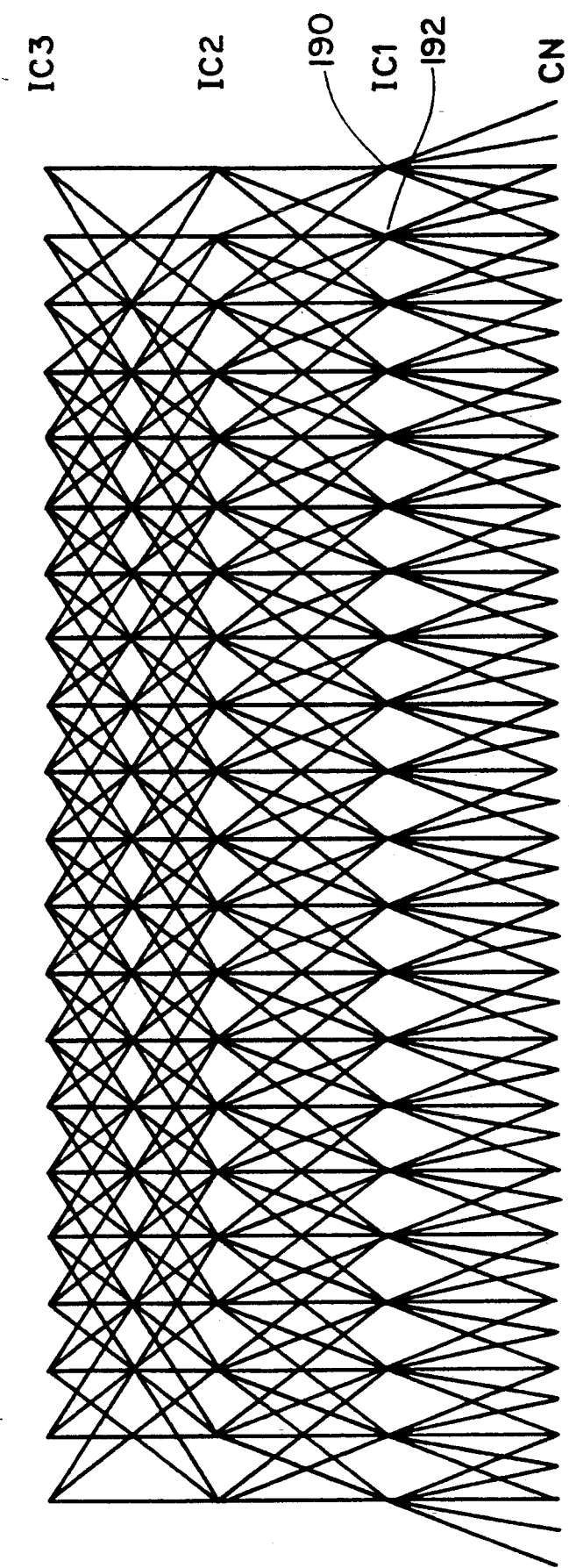
FIG._21.

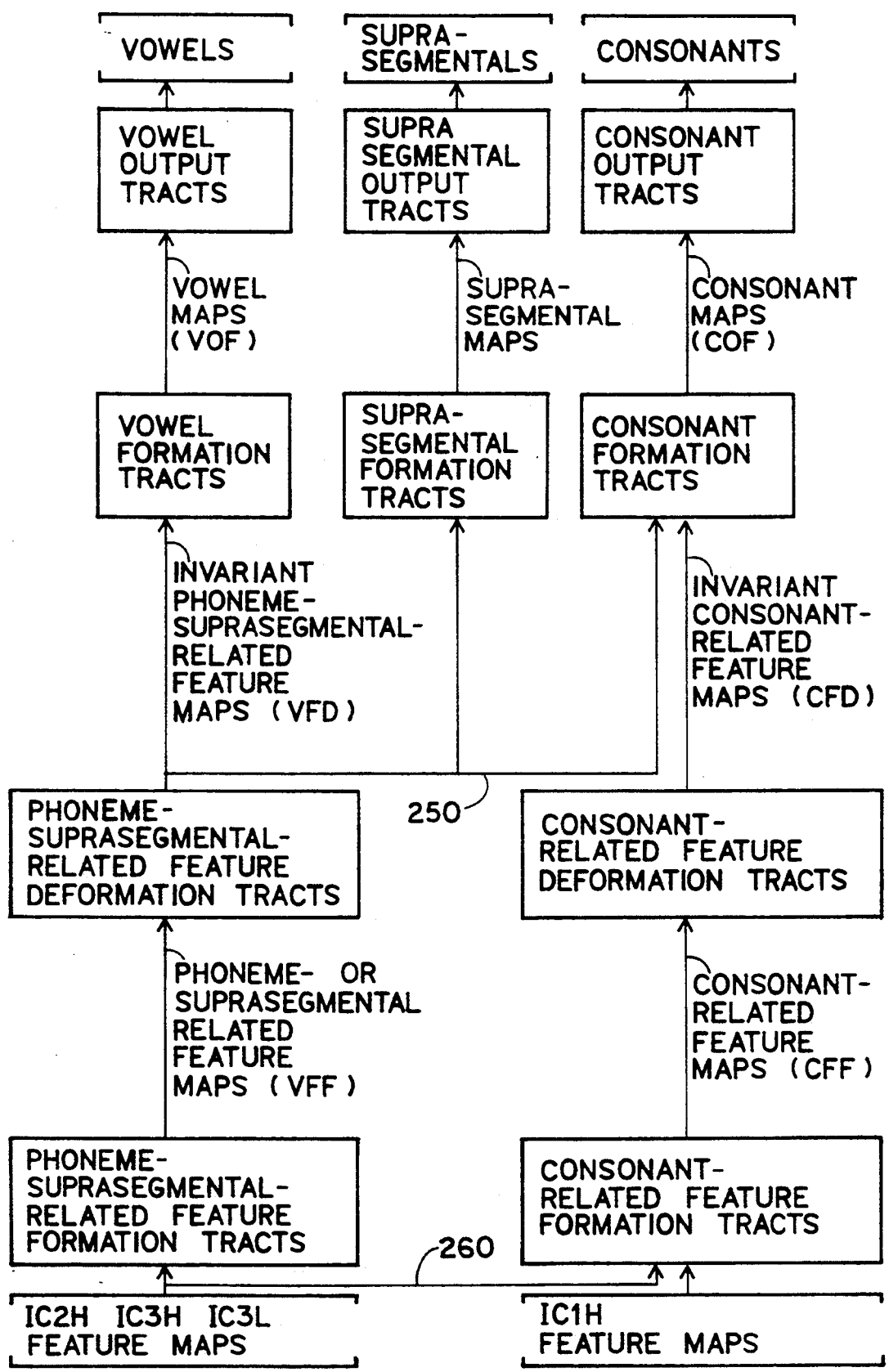
FIG._22.

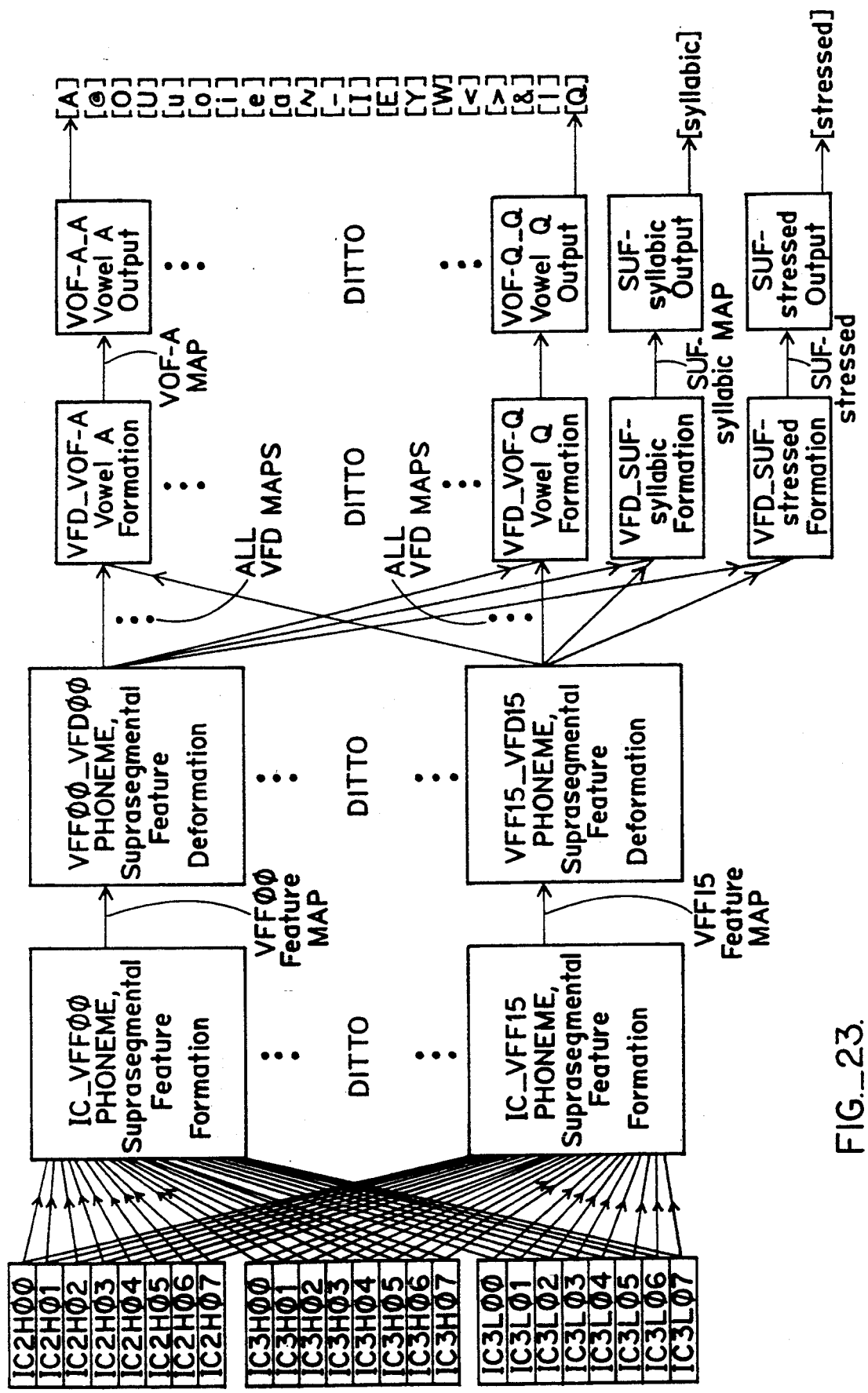
FIG._23.

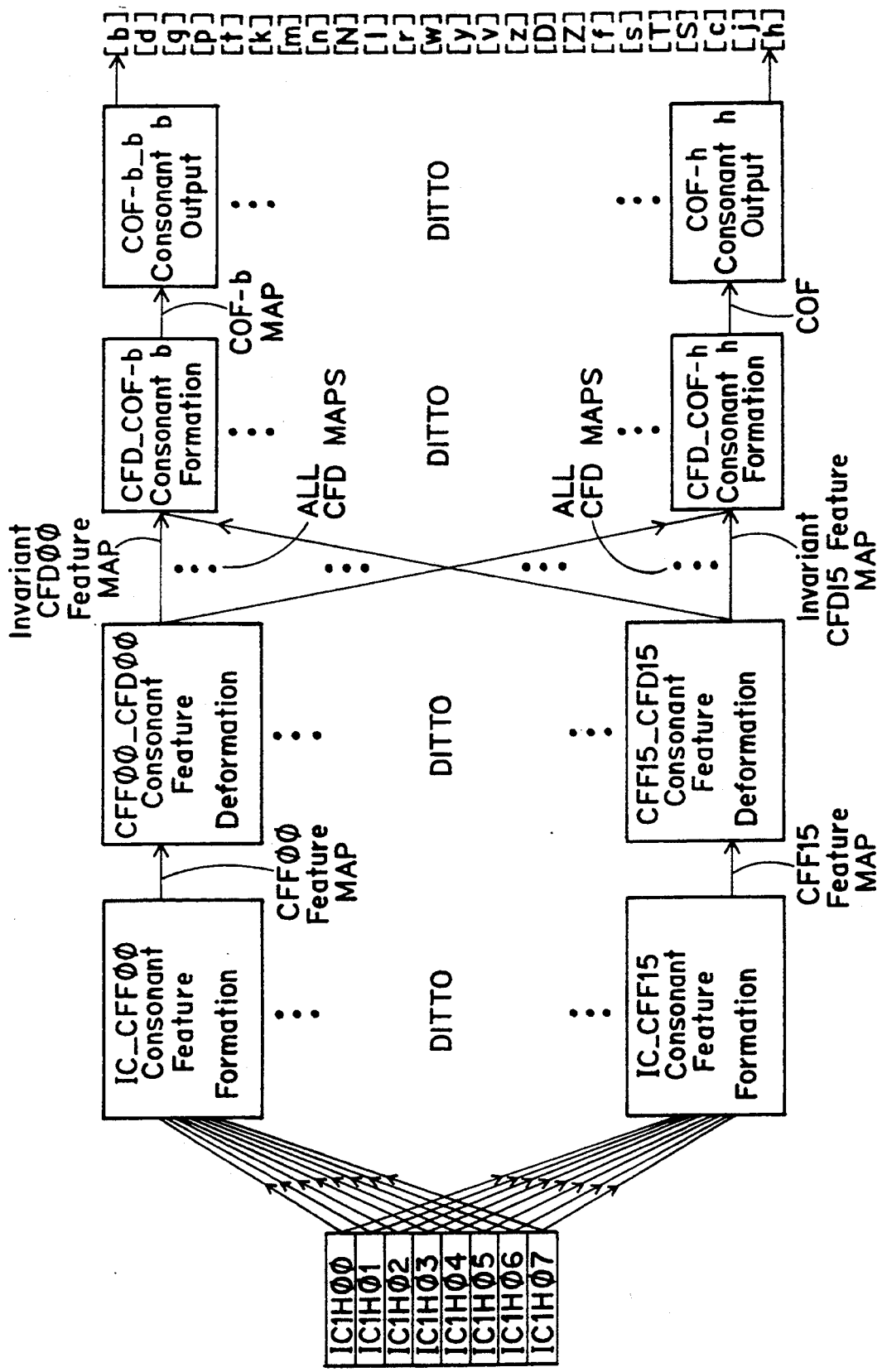
FIG._24.

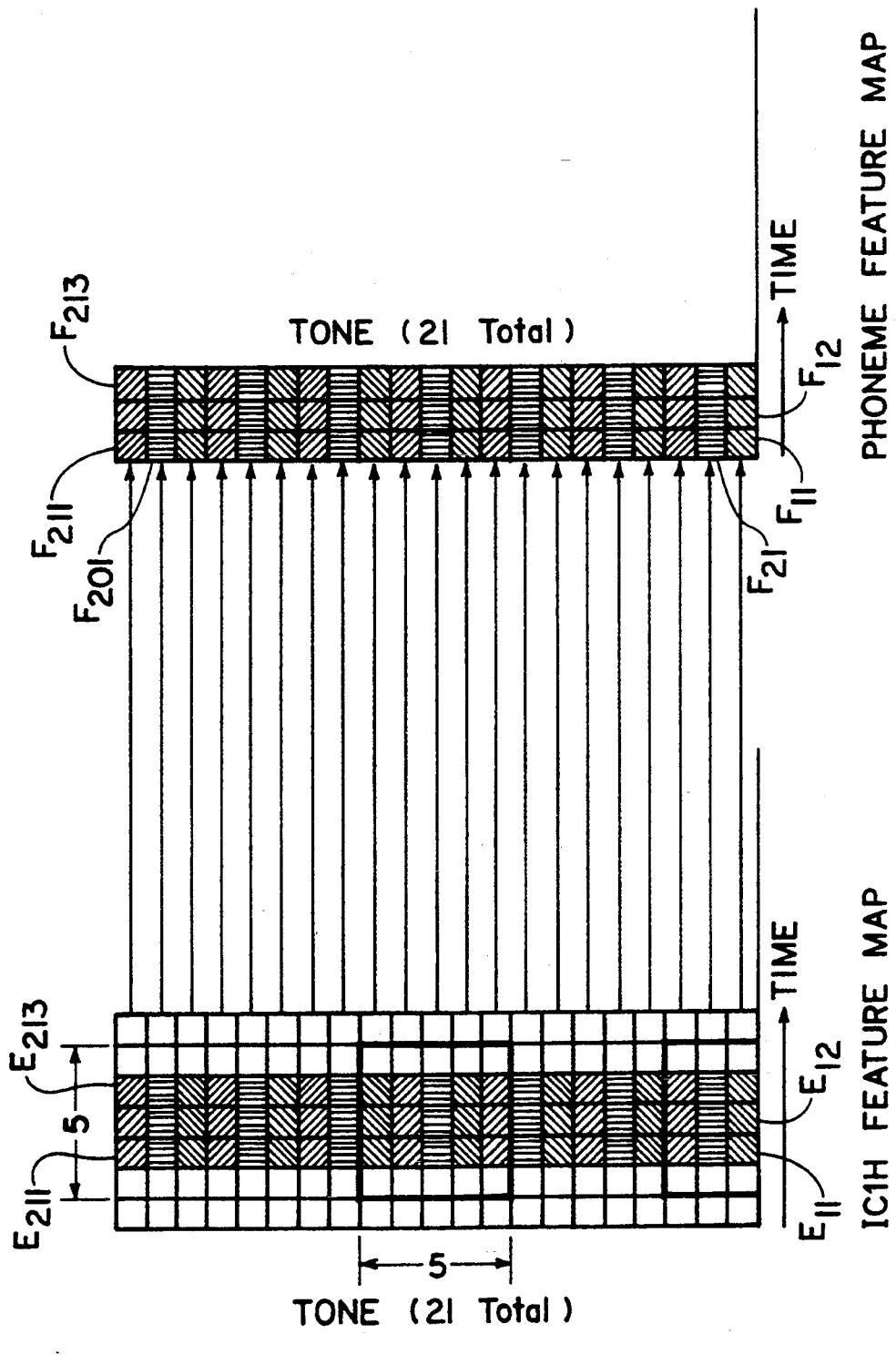
FIG.—25.

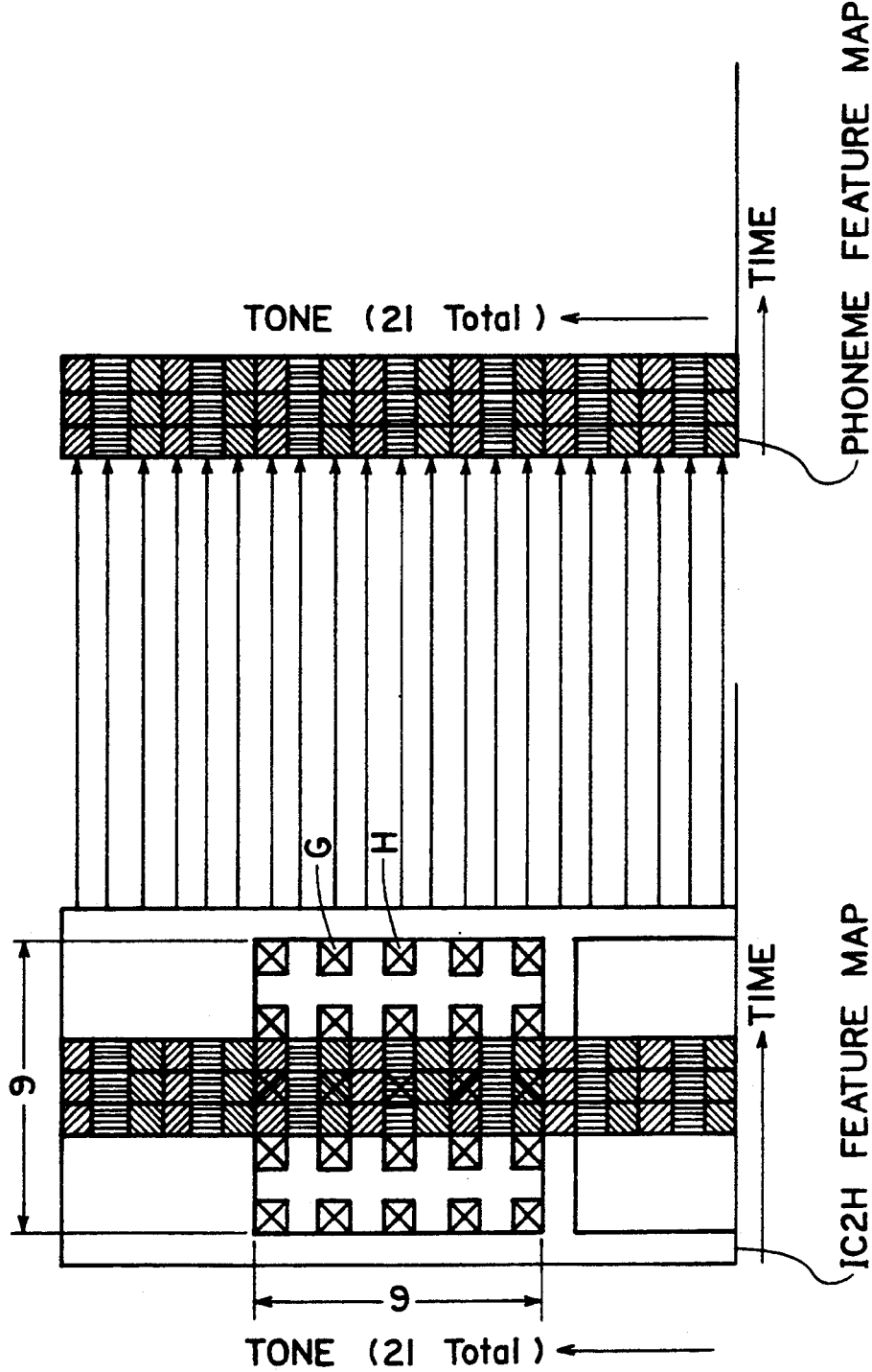
FIG._26A.

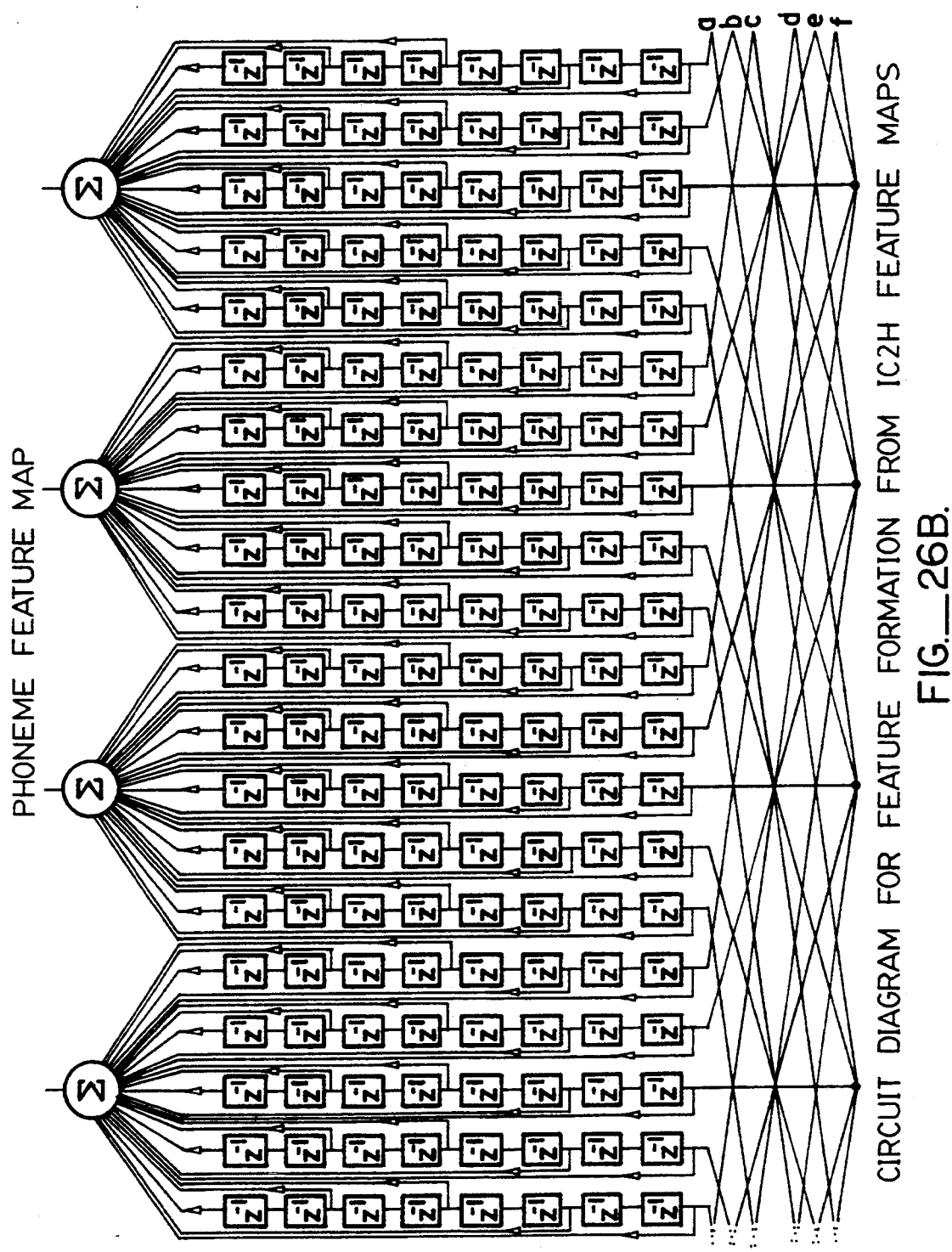
FIG._26B.
CIRCUIT DIAGRAM FOR FEATURE FORMATION FROM IC2H FEATURE MAPS

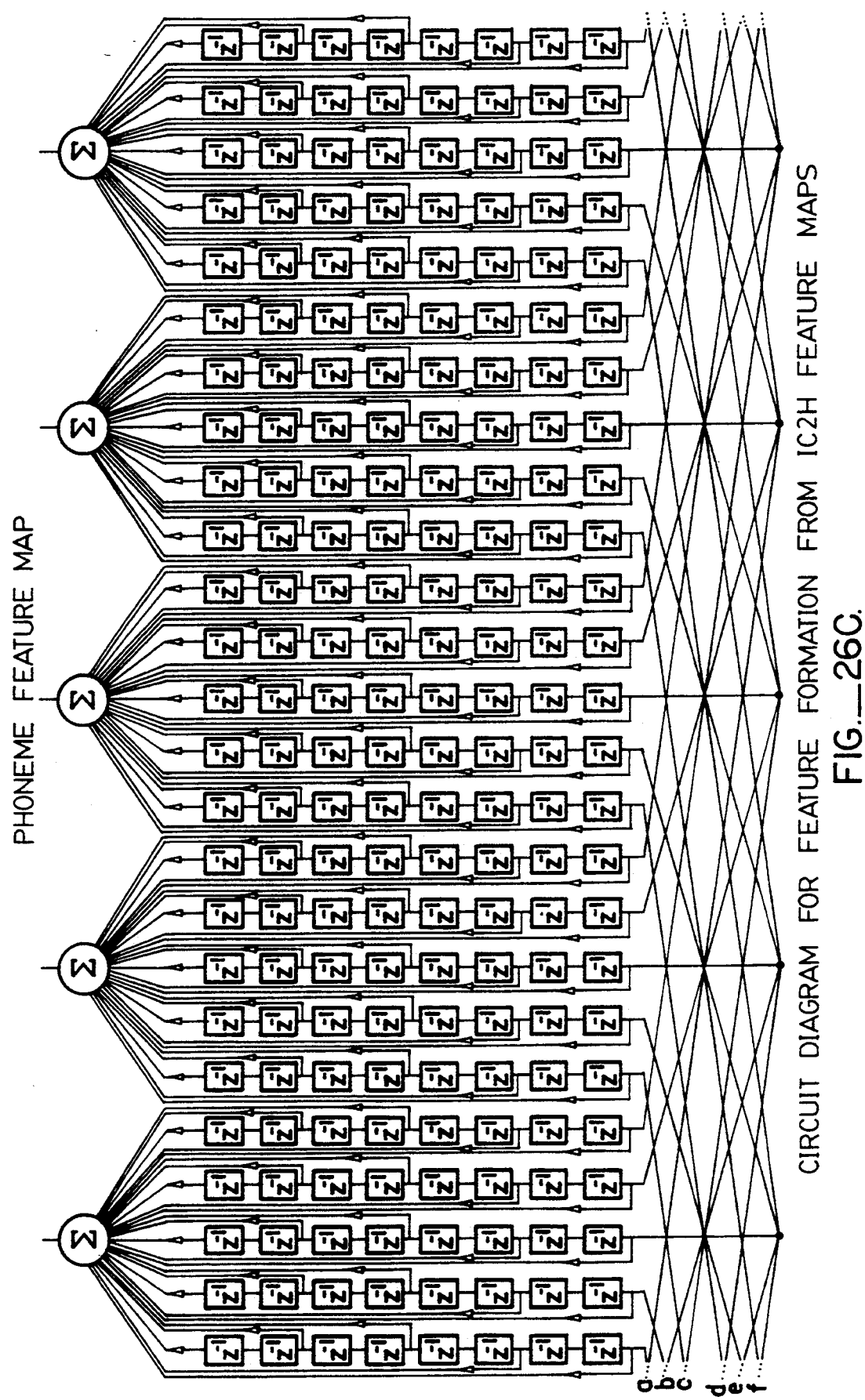
FIG.—26C. CIRCUIT DIAGRAM FOR FEATURE FORMATION FROM IC2H FEATURE MAPS

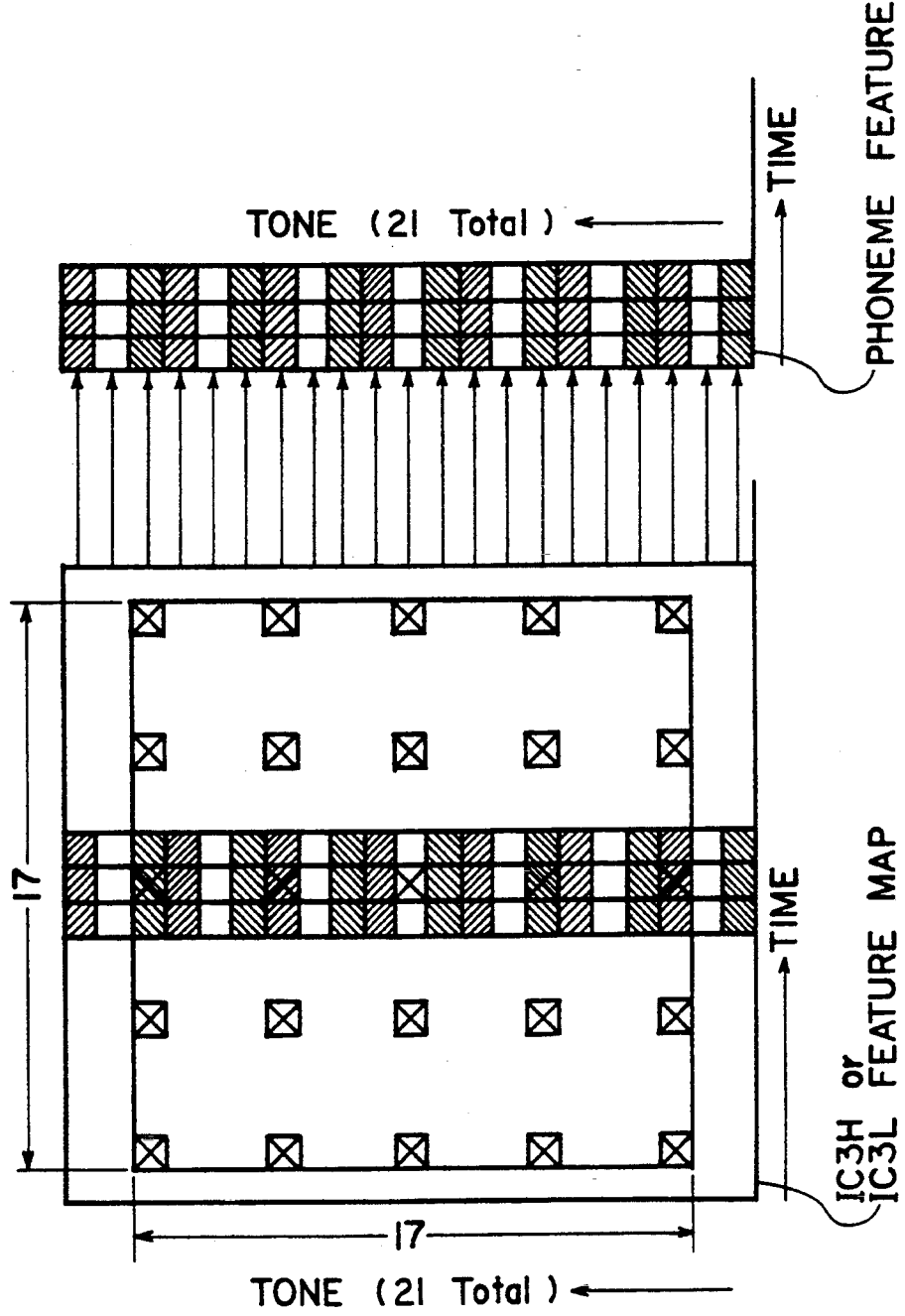
FIG._27.

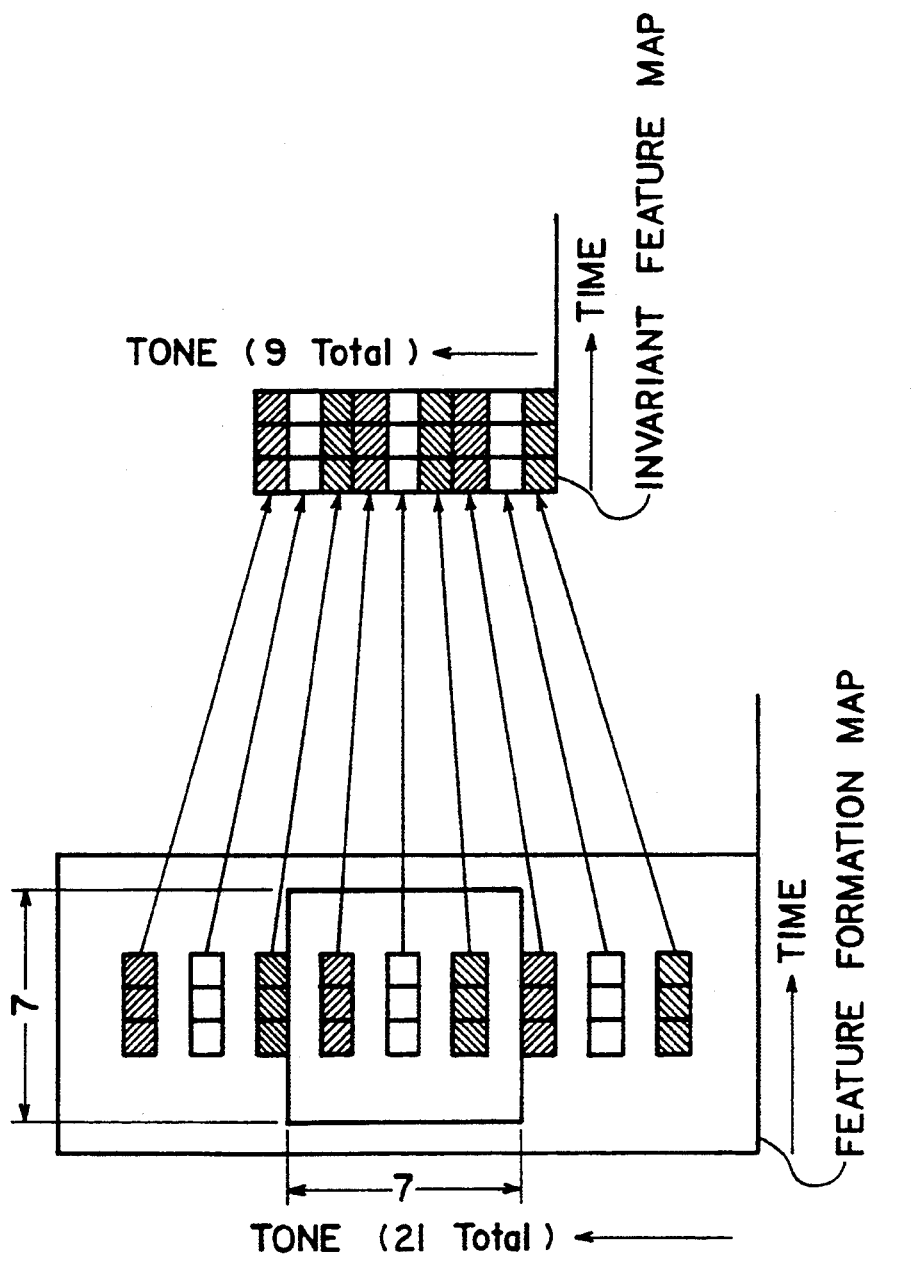
FIG._28A.

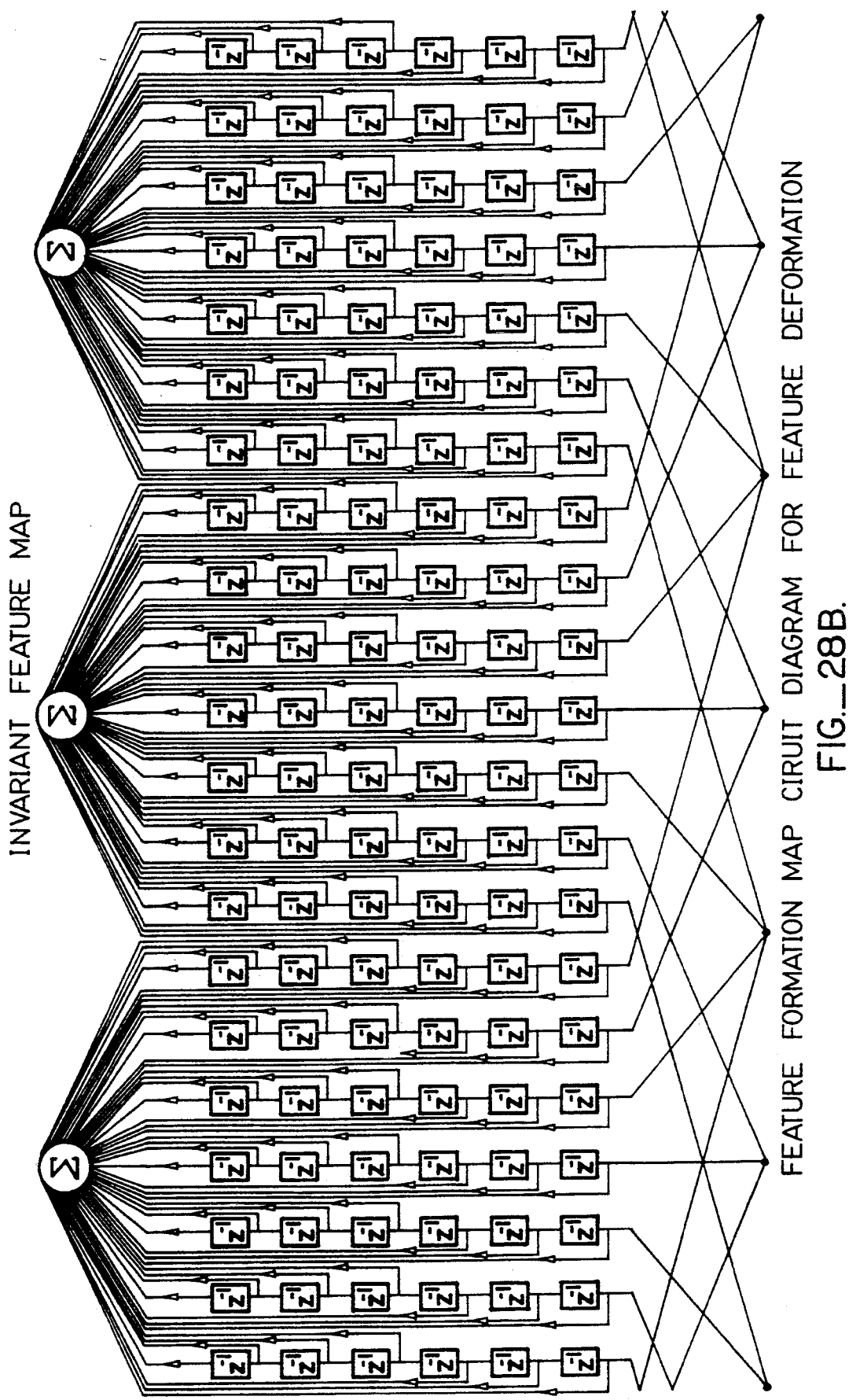
FIG._28B. FEATURE FORMATION MAP CIRUIT DIAGRAM FOR FEATURE DEFORMATION

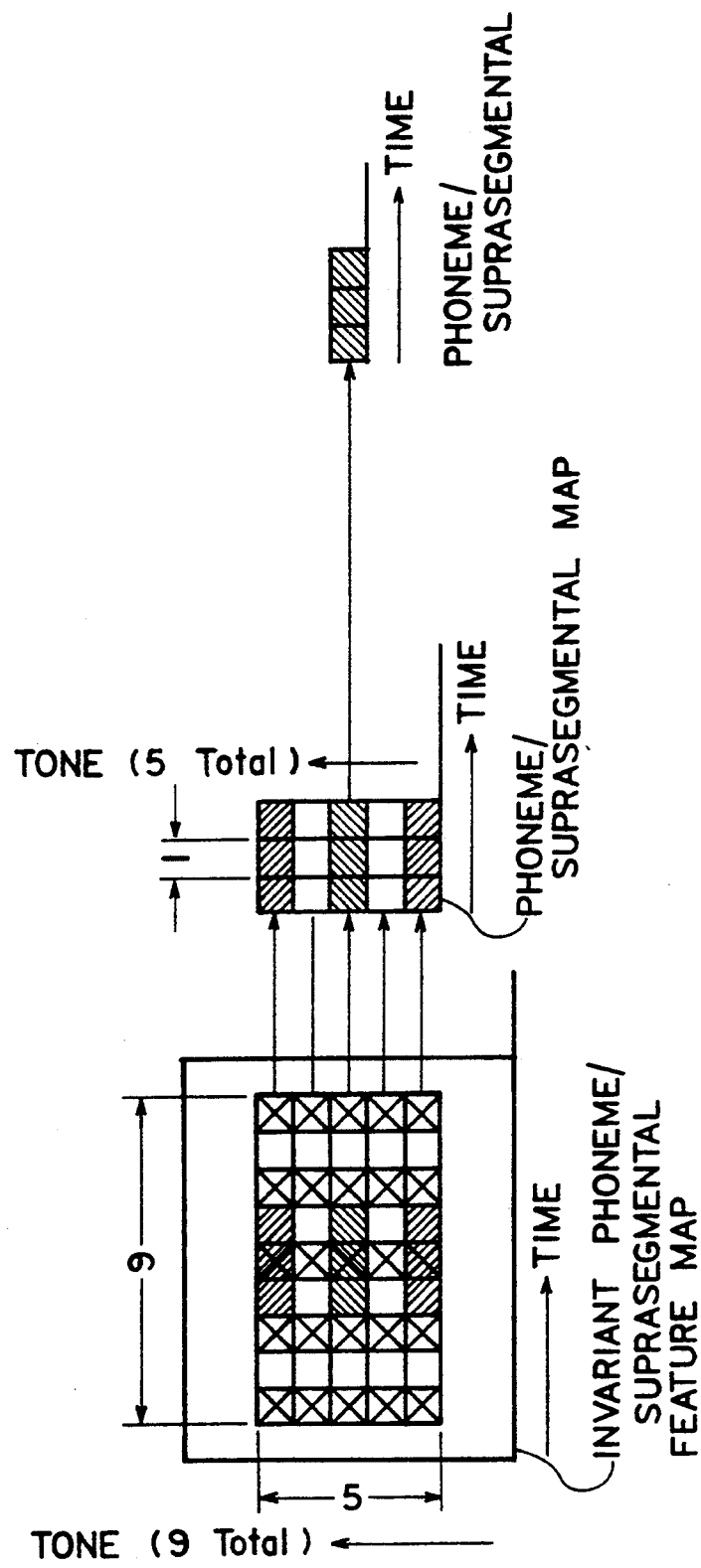
FIG._29.

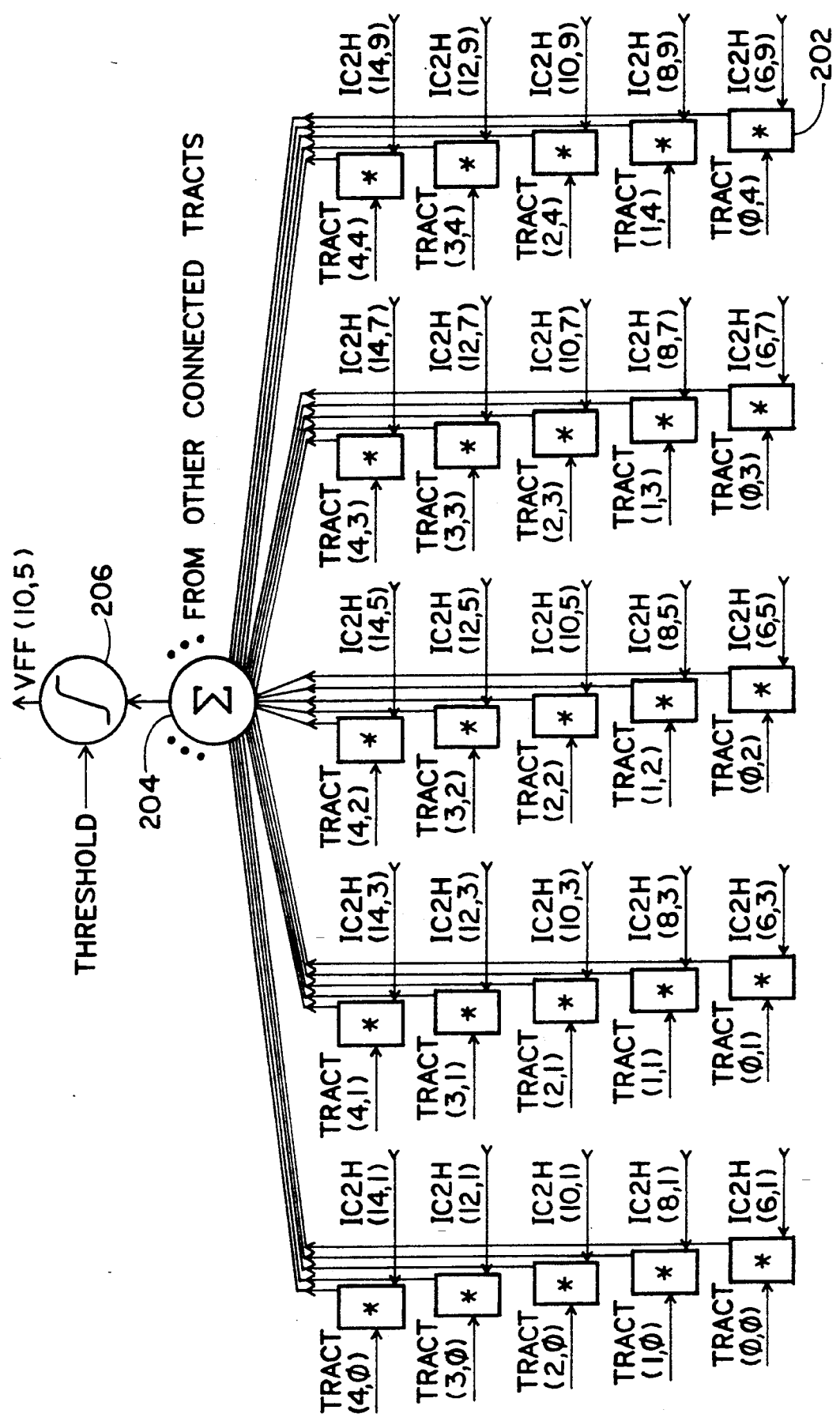
FIG._30.

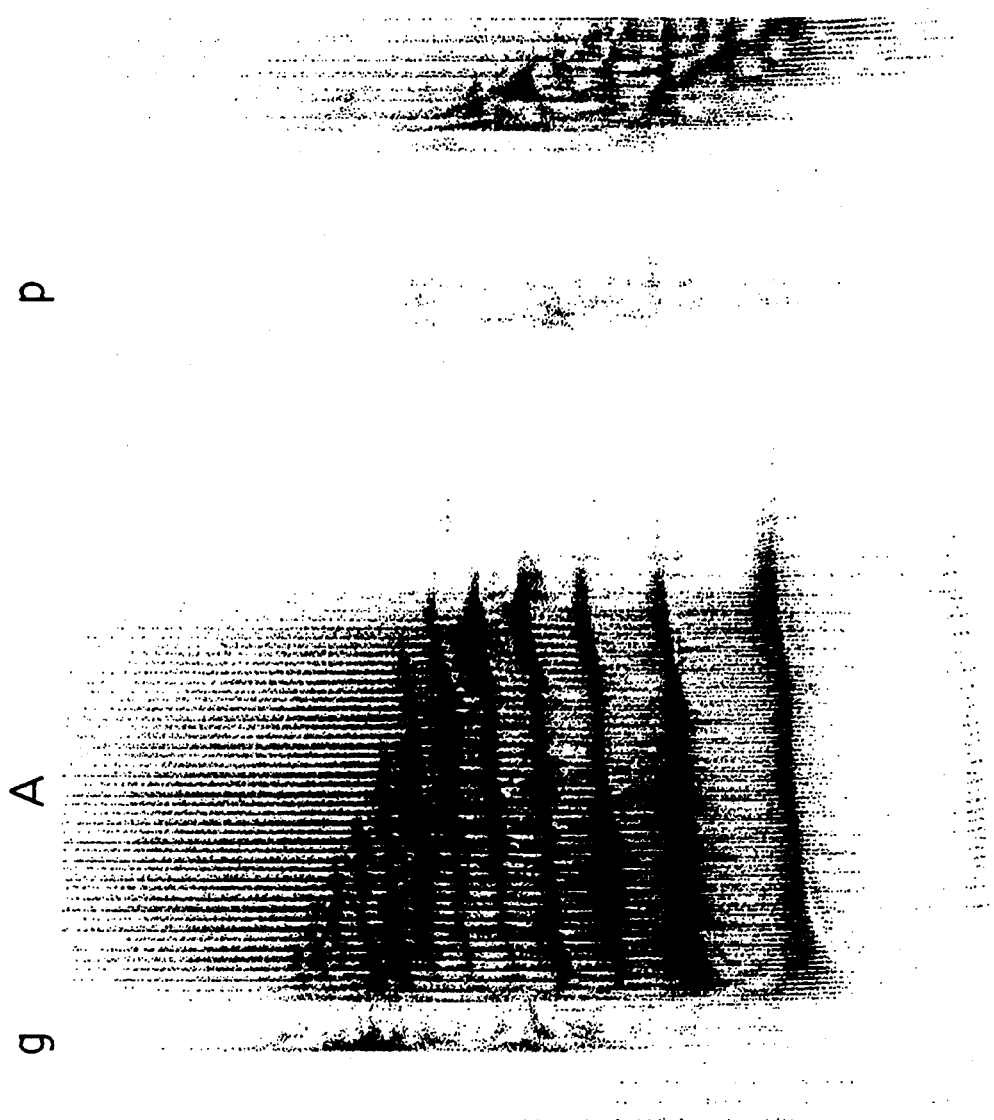
COCHLEARGRAM
FIG._31.

CN MAPS
tone_cosine
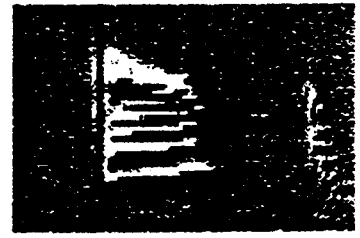
rise_cosine
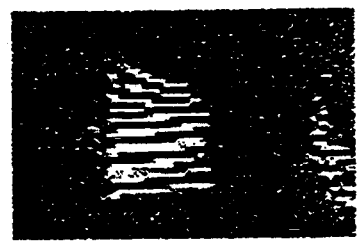
tone_sine
rise_sine
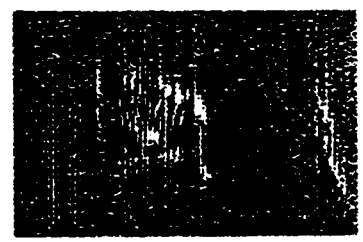
onset_cosine
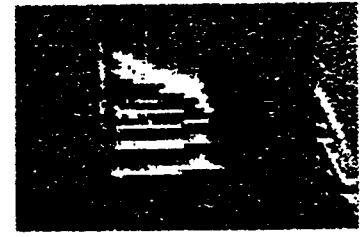
fall_cosine
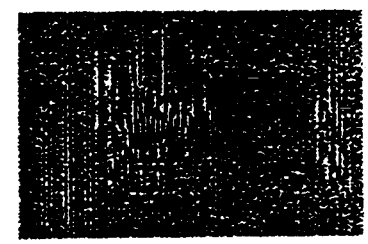
onset_sine
fall_sine
FIG._32A.

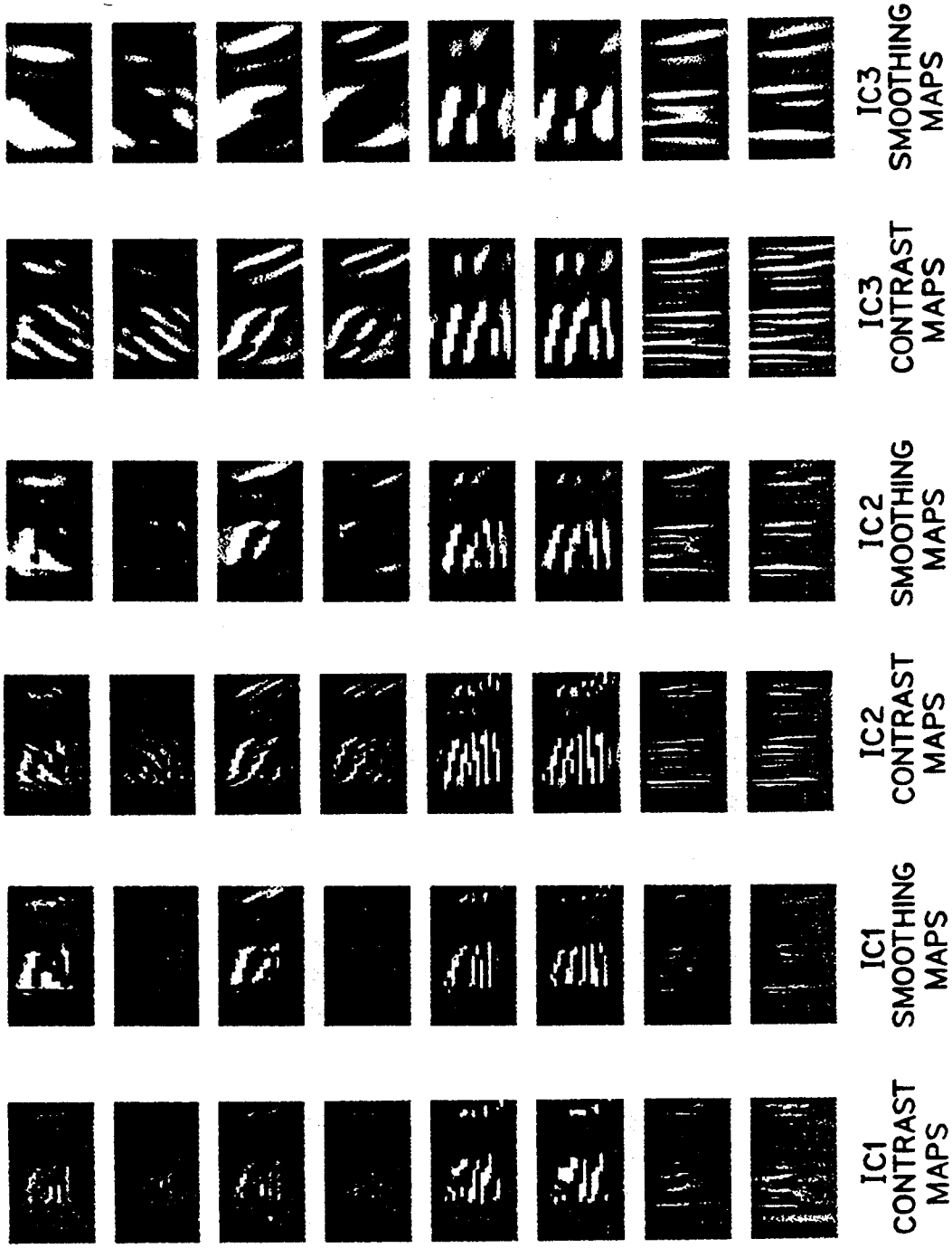
FIG. _32B.

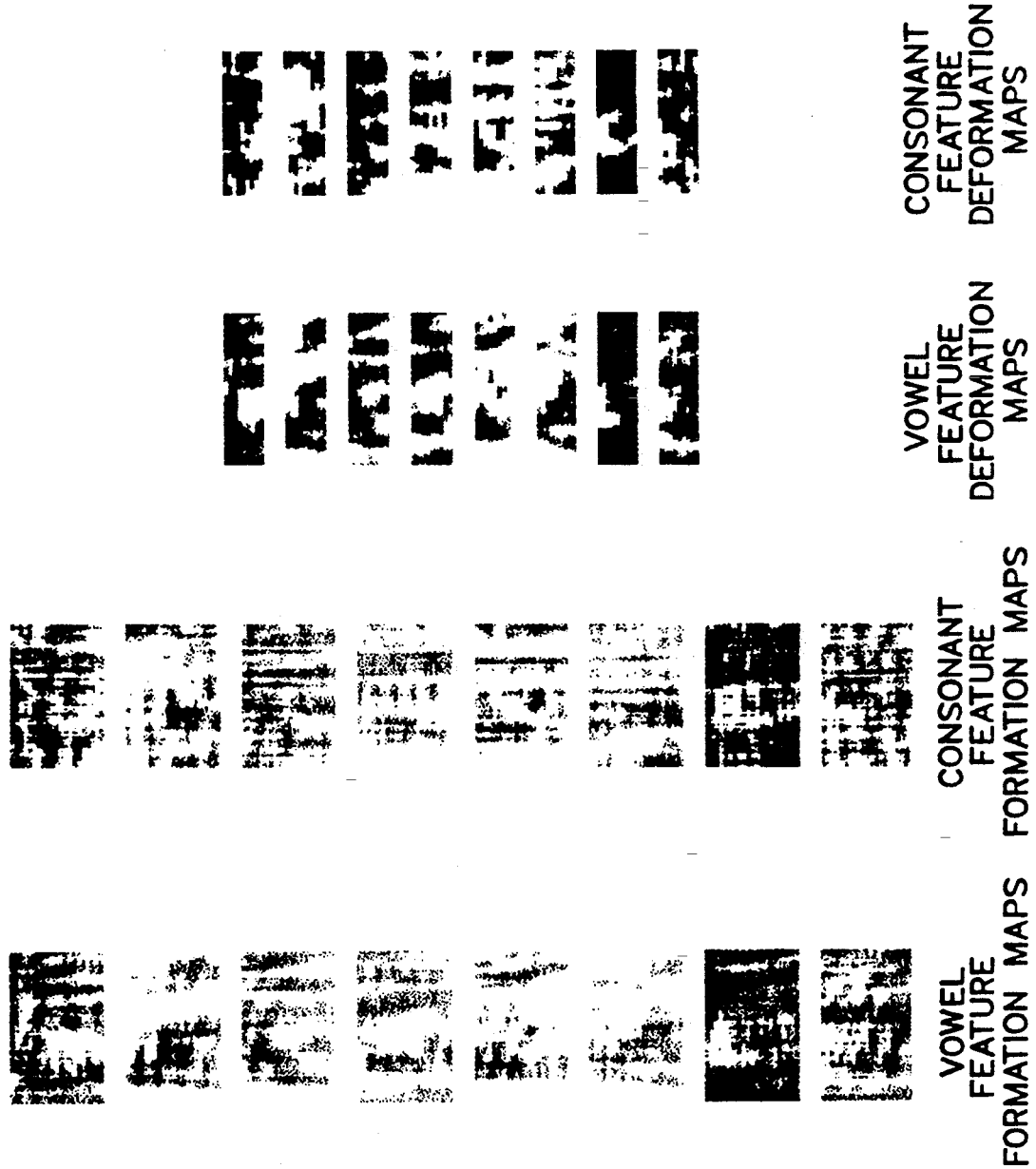
FIG._32C.

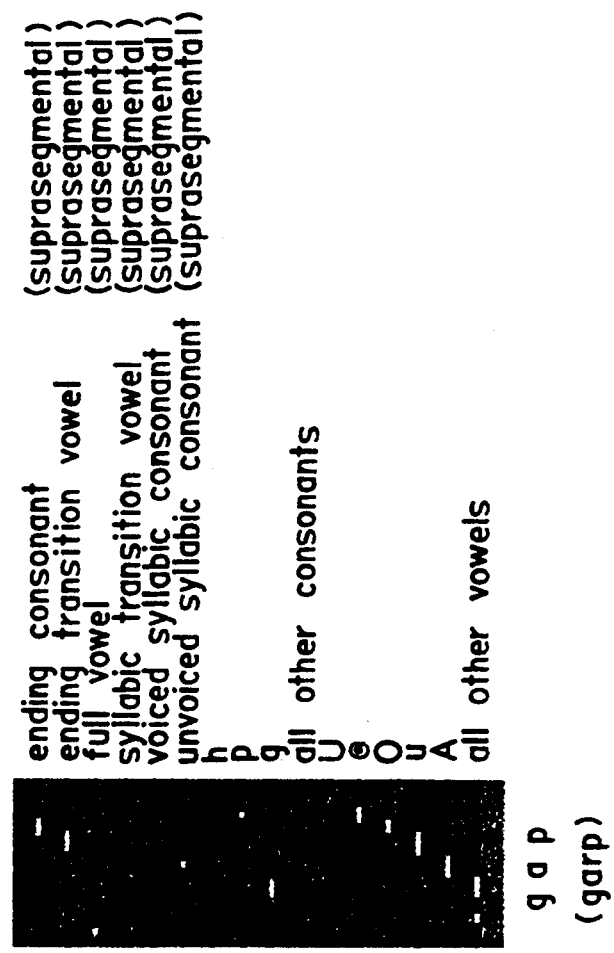
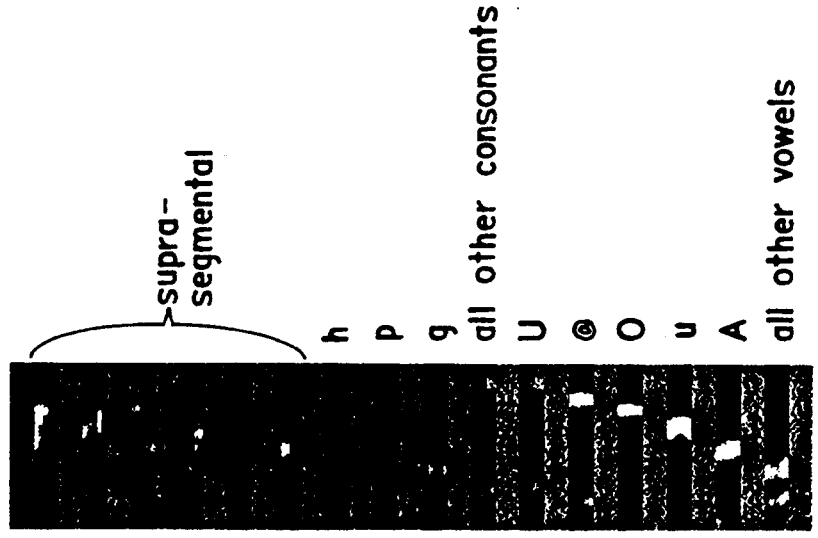
FIG._32D.

SYSTEM FOR RECOGNIZING SPEECH

BACKGROUND OF THE INVENTION

This invention relates to a system for pattern recognition that is particularly useful for recognizing speech and handwriting.

Speech recognition may be defined as the extraction of a sequence of symbols from a continuous stream of auditory data. In handwriting recognition, such sequence of symbols is extracted from visual data. By using this invention, a machine recognizes speech or handwriting as competently as humans.

Personal experience as well as linguistic theory give us the strong impression that certain identifiable sounds, which we call phonemes, form the basis of the symbolic structure that is language. The use of phonetic transcription of speech is not restricted to academic purposes. It is pervasively practised in stenograph reporting in courts of law and congressional hearings.

However, machine recognition of phonemes is notoriously difficult. Contextual effects, known as coarticulation, variability within one speaker, as well as from speaker to speaker, lead to multiple manifestations of the same underlying phoneme. Nevertheless, humans or, for that matter, animals such as dogs and cats, have little difficulty in recognizing spoken sounds. Furthermore, humans are able to do so against a background of noise or distraction, commonly referred to as the cocktail party syndrome.

In the past few years, one approach, referred to as HMM (Hidden Markov Models), has been successful in dealing with the variability in speech. This approach has achieved high performance in terms of accuracy, but requires extensive modeling of the particular language being used. In essence, the approach compensates for an inadequate representation of individual speech events by astutely guessing the best match over a sequence of such events. It captures the statistical properties of sequences of events in the parameters of the models. It achieves this high performance through a thorough statistical accounting of the particular body of speech data used to train the models and an efficient method of searching through a large number of hypotheses for the best match. Because of this, the performance degrades rapidly in the face of noise, novel speech or non-speech sounds, that is, in real-life environments. The problem of novel speech may be solved by a more comprehensive set of models, but this entails ever greater demand for searching.

In contrast, neural networks, the only other significant approach, is tolerant of noise, generalizes well, and requires relatively modest amount of computational power in actual performance. This approach has achieved results superior to that of HMM in the recognition of isolated phonemes from one speaker, but has difficulty with fluent speech and true speaker independence.

It is therefore desirable to provide a pattern recognition system in which these difficulties in both approaches described above are overcome.

SUMMARY OF THE INVENTION

One objective of this invention is to improve the machine recognition of phonemes from fluent speech, spoken by familiar or new speakers, in any language, in everyday noisy circumstances, to the level of performance of humans.

As will be evident from this disclosure, only the first stage of this invention deals with auditory signal processing. The later stages deal with any two-dimensional signals. Insofar as the difficulties of recognizing written symbols from continuous handwriting are similar to those of recognizing phonemes from continuous speech, it is a second objective of this invention to recognize continuous handwriting.

In conventional speech recognition systems, the acoustic signal is regarded as a one-dimensional signal. Frequency content of the signal, obtained usually by Fourier transform techniques, is therefore regarded as capturing all of the relevant information. This invention is based on the inventor's insight that speech, or more generally, sound, as processed by human beings, or even animals, must be as literally represented by two-dimensional pictures as vision. This invention asserts that speech recognition, in any language, is founded on the texture of sound. In other words, the applicant recognized that, in addition to frequency of the tones present in speech, timing information concerning when significant tonotopic events happen is also critical for recognizing speech. Therefore, in addition to the detection of the presence of significant tones in speech, change in significant tones over time is also important.

This invention proposes a multitude of filters with two-dimensional outputs ordered in frequency and time for extracting the texture of sound, and for the formation of the compact units of sound, i.e., phonemes, from the texture.

The ordering of filter outputs in frequency is referred to below as "tonotopy." The texture of sound is embodied in elementary tonotopic features. These are filter outputs indicating the presence of any significant tones, and the change in significant tones over time. In the preferred embodiment, the elementary tonotopic features may include onset, rise and fall of any significant tones of the sound signal. The term "onset" refers to the timing of initiation or cessation of significant tones. As a further improvement, the elementary tonotopic features may also include the frequencies of any significant tones.

One aspect of the invention is directed towards a system and method for recognizing patterns in an input signal where the input signal contains tonotopic information. The method for recognizing patterns in an input signal containing tonotopic information comprises first filtering the input speech signal to provide a filtered output, said output indicating the tonotopic characteristics of said input signal over a time period. The method further comprises filtering said output to provide an output exhibiting elementary tonotopic features that indicate presence of any significant tones in the input signal and change in said significant tones over time.

The system comprises first means for filtering the input signal to provide a filtered output, said output indicating the tonotopic characteristics of said input signal over a time period, and second means for filtering the output to determine elementary tonotopic features indicating presence of any significant tones indicated by the input signal and change in significant tones over time. The first filtering means therefore is the first stage which deals with auditory signal processing. The second filtering means may therefore be composed of one or more later stages dealing with two-dimensional signals. In the preferred embodiment, the second filtering means processes the first filtering means output to provide a two-dimensional representation at various scales or resolutions in frequency and time of the tonotopic features of the input signal. The features preferably include onset, rise and fall of any significant tones of the input signal in the two-dimensional representation. In a further improvement, the tonotopic features also indicate frequency of any significant tones of the input signal.

In the preferred embodiment where the input signal is a speech signal, in addition to the first and second filtering means, the pattern recognizing system further comprises a neural network responsive to the two-dimensional representation of this input speech signal for identifying phonemes, groups of phonemes, or suprasegmentals in the input signal, and the filtering means is a cochlear filter bank having coefficients of selected dimensions of a representative biological cochlear described in more detail below.

To recognize patterns in an input speech or non-speech sound signal, it is important to improve the signal-to-noise ratio in a preprocessing stage so that patterns present in the input signal may be recognized during subsequent analysis despite a noisy background. This invention is based on the observation that, by using a plurality of filters arranged in parallel where the filters have different frequency pass bands, and by feeding back a significant number of the output signals of the filters to at least some of the inputs of the filters, signal-to-noise ratio can be greatly increased.

Thus, another aspect of the invention is directed toward a filter bank for use in recognizing patterns in an input signal such as a sound signal. The filter bank comprises a plurality of M filters arranged in parallel, M being a positive integer, each filter having a first stage and a second stage. The first stage of each filter includes first delay means for delaying the input signal and means for subtracting from the input signal or a signal derived therefrom the delayed input signal or a signal derived therefrom and adding thereto feedback signals from at least some of the second stages of the M filters or signals derived therefrom to derive an output signal. The second stage of each filter provides an output signal and includes means for adding the output signals of the first stages of at least some of the filters or signals derived therefrom to obtain a first sum signal, and second means for delaying said first sum signal and supplying said delayed first sum signal or a signal derived therefrom to the first stages of at least some of the filters. The second stage also includes means for adding the first sum signal and the delayed first sum signal or signals derived therefrom to obtain a second sum signal, and third means for delaying the output signal of the second stage and supplying said delayed output signal of the second stage or a signal derived therefrom to the first stage of at least some of the filters. The second stage of each filter also includes means for adding to the second sum signal or a signal derived therefrom the delayed output signal of the second stage or a signal derived therefrom to derive the output signal of the second stage.

Where the above-described filter bank is used for recognizing patterns in an input acoustic signal in an embodiment of the invention, the characteristics of the M filters are related to characteristics of the representative biological cochlear. Specifically, each of the M filters corresponds to a section of a basilar membrane of the cochlear where the filter design depends explicitly on the effective breadth of the basilar membrane in the representative biological cochlear. In the preferred embodiment, the effective breadth varies as a linear function of position along the basilar membrane. Such specific design further enhances the signal-to-noise ratio. When the filter design is modeled after a biological cochlear, the feeding back of the filter output to the inputs of the filters represents coupling between the different sections of the basilar membrane through a fluid in the scalae vestibuli and tympani of the cochlear, where such coupling also enhances the signal-to-noise ratio in a biological cochlear. The feedback action is therefore believed to have a similar effect in signal preprocessing to the coupling in the biological cochlear. In the preferred embodiment, the filter design is modeled after a three-dimensional representative biological cochlear.

As discussed in the "Background of the Invention," while speech recognition systems employing neural networks have been able to recognize isolated phonemes, to date such an approach has not been successful in recognizing phonemes from continuous speech. As known to those skilled in the art, achieving recognition of continuous speech is very difficult. To recognize phonemes from continuous speech, a system must be able to detect the separate symbolic units. This detection of the symbolic units at the phonemic level is sometimes referred to as the segmentation of the speech signal. Segmentation of continuous speech is difficult because the articulation of a phoneme overlaps the articulation of the preceding and the following phonemes. Hence, the articulation of phonemes in continuous speech is never as "pure" as in discrete utterances, but is heavily influenced by contextual effects. This phonemenon is called "co-articulation."

Another aspect of the invention is directed towards a system of filters and method of filtering for recognizing patterns in an input signal that is a function of two variables, such as tonotopy and time in the case of speech, or space and time in the case of handwriting, or still other types of two-dimensional input signals. This aspect of the invention is based on the discovery that pattern detection is based on contrast information, where the pattern may be present in the form of boundaries. The method of this aspect of the invention is for recognizing patterns in an input signal that is a function of tone and time in the case of speech, or space and time in the case of handwriting. The method comprises filtering said signal to provide an output indicating contrast information in the signal, where said contrast information in turn indicates the presence of any significant patterns in the input signal.

Some filters in the preferred embodiment of the invention output contrast information, and when connected to other suitable filters, provide contrast information preferably at multiple levels of resolution. The contrast information derived at each coarser resolution provides the context for the information at the finer resolutions. This multi-resolution contrast information provides the basis for boundary detection and pattern recognition across different contexts, and hence the recognition of phonemes and suprasegmentals across different contexts. In addition, extracting contrast information contributes significantly to subtracting out background noise.

The system of this aspect of the invention comprises means for filtering the input signal to provide a filtered output containing contrast information that indicates the presence of any significant patterns in the input signal. Where significant local variations of the input signal define boundaries in a two-dimensional representation of the input signal in reference to two orthogonal axes, in the preferred embodiment, the filtering means provides an output indicating the presence of at least one of three types of boundaries: vertical, horizontal or inclined boundaries, where the orientation of the boundaries (vertical, horizontal and inclined) is in reference to the two orthogonal axes. In the preferred embodiment, the filtering means includes one or more contrast filters to filter the input signal in order to provide contrast information.

Also in the preferred embodiment, in addition to contrast filters, the filtering means also comprises one or more orientation filters and one or more smoothing filters connected in series in at least one sequence, each sequence of smoothing filters filtering the output of one of said one or more orientation filters or a signal derived therefrom, defining a corresponding orientation filter, to each provide an output. The output of each smoothing filter in a sequence contains average value information indicating orientations of said local variations at a coarser resolution than those indicated by the output of the corresponding orientation filter and by the output of a different smoothing filter upstream in the same sequence. Each contrast filter filters either the output of an orientation filter or the output of a smoothing filter, or a signal derived therefrom to provide an output. Each of said contrast filters provides an output that is coarser in resolution than the output of the orientation filter or smoothing filter filtered by said each contrast filter, said output of each contrast filter containing contrast value information indicating the locations of the boundaries at different resolutions.

Where two (or more) orientation filters are employed, each for providing an output indicating a different corresponding type of boundaries, the smoothing filters in the sequence filtering the output of the orientation filter provide average value information on such corresponding boundaries at different resolutions and the contrast filter outputs indicate the locations of such boundaries. The boundaries may be vertical, horizontal or inclined with respect to the axes of the two dimensional representation of the input signal.

As a further improvement, the system further comprises a neural network including at least one phoneme- or suprasegmental-related feature formation layer for processing contrast information at different resolutions from at least some of the contrast filters and the average information from at least one smoothing filter to provide a plurality of phoneme- or suprasegmental-related feature formation maps.

For a speech recognition system to be truly speaker-independent, it must be able to recognize speech patterns distorted in unpredictable ways by the manners of speech of previously unknown speakers. Furthermore, for such a system to be useful in everyday noisy circumstances, it must be able not only to overcome background noise, but other interfering sounds that may be non-vocal, or if vocal, non-speech. The ability of neural networks to recognize patterns degraded by random and non-random noise has prompted those skilled in the art to use them for speech recognition. But to date, none has proposed a neural network architecture for overcoming the variability of speech.

The invention also teaches a neural network that contains one or more phoneme-related or suprasegmental-related feature formation layers and one or more deformation layers for performing local averaging to generalize the features recognized so that these features can be recognized irrespective of local variations. Hence, yet another aspect of the invention is directed toward a system for recognizing patterns in an input signal containing speech tonotopic information. The system comprises means for filtering the input speech signal to provide a filtered output. The output indicates the tonotopic characteristics of said input signal over a time period and identifies any significant patterns therein, where the filtering means contains no neural network. The system further comprises a neural network which includes at least one phoneme- or suprasegmental-related formation layer for processing the output of the filtering means to provide a plurality of phoneme- or suprasegmental-related formation maps; and at least one phoneme- or suprasegmental-related deformation layer which performs a local averaging operation on phoneme- or suprasegmental-related feature maps to provide invariant phoneme-related feature maps or invariant suprasegmental-related feature maps.

In conclusion, the various aspects of this invention address the stated difficulties of speech recognition. The filter bank addresses the issue of enhancing the signal-to-noise ratio. The filters that derive elementary tonotopic features provides the texture of sound that is the foundation for the recognition of speech sounds in any language. The contrast filters detect boundaries of patterns across different contexts to overcome the effect of coarticulation in continuous speech. And finally, the neural network has an architecture that enables the recognition of sound patterns irrespective of the variability of speech of different speakers.

BRIEF DESCRIPTION OF THE DRAWINGS

FIG. 1 is a block diagram of a speech recognition system to illustrate this invention.

FIG. 2 is a block diagram illustrating in more detail the cochlear filter bank of FIG. 1.

FIG. 3 is a block diagram illustrating in more detail the construction of each filter of FIG. 2.

FIGS. 4–7 are two-dimensional (frequency and time) representations of the output of the filter bank of FIGS. 1–3 in response to certain input signals to illustrate the operation of the filter bank.

FIGS. 8A–8H which make up FIG. 8 are 8 figures illustrating the coefficients of CN filters which may be used for identifying certain patterns present in the output of the cochlear filter bank, such as onset, frequency, fall and rise of significant tones present in any speech signal.

FIGS. 9A–9H which make up FIG. 9 illustrate the coefficients of filters similar to those in FIGS. 8A–8H, except that the filters in FIGS. 9A–9H are coarser in resolution than those illustrated in FIGS. 8A–8H.

FIGS. 10A–10P which make up FIG. 10 graphically illustrate the equivalent filters resulting from applying first the CN filters of FIGS. 8A–8H, and then the 8 smoothing and 8 contrast IC filters. The sequential filtering by first the CN filters, followed by the smoothing IC filters amounts to an approximation of the filters of FIGS. 9A–9H.

FIG. 11A is a block diagram illustrating the operation of the CN/IC filters of this invention.

FIGS. 11B, 11C, 11D are block diagrams illustrating alternative filters to the CN/IC filters of FIG. 11A to illustrate alternative embodiments of the invention.

FIG. 12 is a detailed signal flow diagram illustrating a more detailed operation of the CN/IC filters of FIG. 11A, when such filters are used for recognizing speech.

FIG. 13 is a schematic diagram illustrating the superposition scheme (including superposition, multiplication and summation) for the operation of the CN filters of FIGS. 11 and 12.

FIG. 14 is a block diagram of a circuit for illustrating one embodiment of the CN filter.

FIG. 15 is a schematic diagram illustrating the operation of the CN filters of FIGS. 11 and 12.

FIG. 16 is a schematic circuit diagram of a circuit to illustrate another embodiment of the CN filters of FIGS. 11 and 12.

FIGS. 17A and 18A are schematic diagrams illustrating the superposition scheme (including superposition, multiplication and summation) of the operation of the IC filters with decimation and with no decimation respectively.

FIGS. 17B, 18B are schematic circuit diagrams illustrating circuits for implementing the superposition schemes of FIGS. 17A, 18A respectively.

FIG. 20 is a schematic circuit diagram of a circuit illustrating another embodiment of the IC filters.

FIG. 21 is a schematic diagram illustrating the connectivity between the different CN and IC filters.

FIG. 22 is a block diagram for a neural network to illustrate another aspect of the invention.

FIG. 23 is a signal flow diagram for vowel and suprasegmental recognition to illustrate in more detail the operation of the neural network of FIG. 22.

FIG. 24 is a diagram for consonant recognition illustrating a more detailed operation of the neural network of FIG. 22.

FIG. 25 is a schematic diagram illustrating the superposition scheme for feature formation from IC 1H feature maps.

FIG. 26A is a schematic diagram of a superposition scheme for feature formation from IC2H feature maps.

FIGS. 26B and 26C are schematic circuit diagrams which together illustrate a circuit for implementing the superposition schemes of FIG. 26A.

FIG. 27 is a superposition scheme for feature formation for IC3H or IC3L feature maps.

FIG. 28A is a schematic diagram of a superposition scheme for feature deformation.

FIG. 28B is a schematic circuit diagram illustrating a circuit for implementing the superposition schemes of FIG. 28A.

FIG. 29 is a schematic view of superposition schemes for phoneme/supersegmental formation and output.

FIG. 30 is a block diagram of a circuit for implementing the superposition, multiplication and summing operations called for in FIG. 26A.

FIG. 31 is a two dimensional (frequency and time) representation of the 281 outputs of the cochlear filter bank of FIG. 1, where the filter bank is used to filter an input speech signal "garp".

FIGS. 32A, 32B together are a graphical illustration of the outputs of the CN/IC filters in FIG. 1 when used to filter the two dimensional representation of the filter bank outputs of FIG. 31.

FIGS. 32C, 32D together are a graphical illustration of the outputs of different layers of the neural network illustrated in FIGS. 22-30 when used to process the outputs of the CN/IC outputs illustrated in FIGS. 32A, 32B.

For convenience and simplicity in description, identical components are labeled by the same reference numerals in this application.

DETAILED DESCRIPTION OF THE PREFERRED EMBODIMENTS

Figure 19:
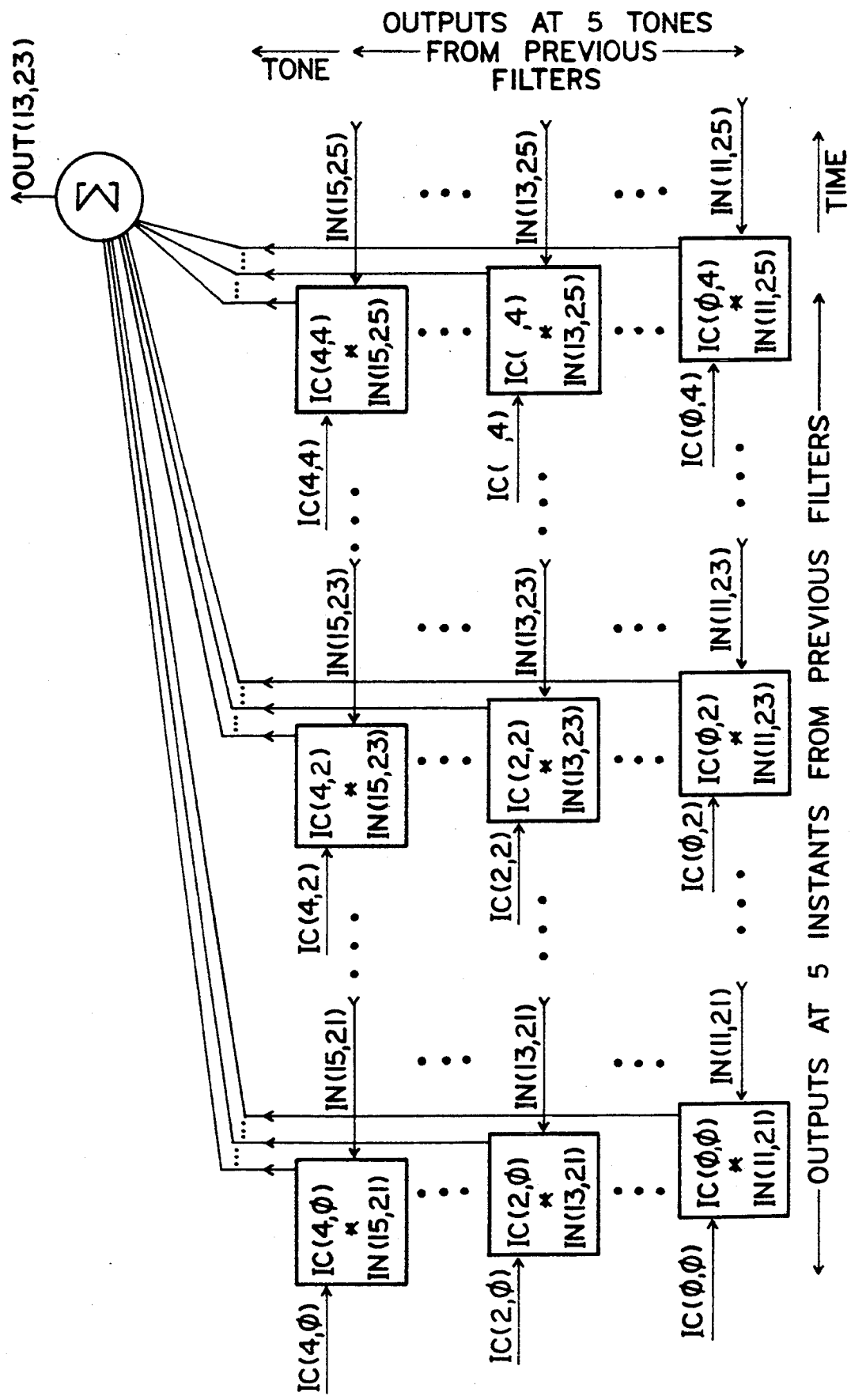
FIG. 19 is a block diagram of a circuit illustrating one embodiment of the IC filters whose operation is illustrated in FIG. 17A and 18A.

FIG. 1 is a block diagram of a speech recognition system to illustrate an embodiment of this invention. As shown in FIG. 1, system 100 comprises an A/D converter and anti-alias filter 102 as is commonly used in speech recognition systems. The A/D converter in block 102 therefore converts an analog input acoustic signal such as speech signal into digital signals which, after being filtered, are then fed to a cochlear filter bank 104 which comprises the first stage of the system 100, excluding the conventional functional block 102. The output of filter bank 104 is supplied to stage two of the system comprising a collection of cochlear nucleus/inferior colliculus (CN/IC) filters 106 which derive contrast and average value information from the cochlear filter bank output. The contrast and average value information is then processed by a neural network 108 to provide phonemes and suprasegmentals. While system 100 illustrates the recognition of speech information from acoustic signals, the CN/IC filters 106 and neural network 108 may also be used for analyzing a space-time two-dimensional representation of handwriting.

Cochlear Filter Bank

As discussed above, humans or animals such as dogs and cats, have little difficulty in recognizing spoken sounds. For this reason, research and development in speech recognition have used models of the biological cochlear for designing machines which can emulate the function of a biological cochlear in recognizing speech in spoken sounds. Before a cochlear model is considered, however, it will be useful to first review the general function and construction of the cochlear. The cochlear and its mechanical response are described in Chapter 6, "Fundamentals of Hearing—An Introduction" by William A. Yost et al., Holt, Reinhardt and Winston, New York, N.Y., pp. 52–70. The relevant description of the cochlear from this reference is summarized below.

The cochlea includes a basilar membrane disposed in a chamber and divides the chamber into two parts. The base end of the membrane is connected to the eardrum through a mechanical connection which includes the stapes. The chamber surrounding the basilar membrane is filled with a fluid which is essentially water. When a sound signal reaches the eardrum, the eardrum vibrates and the vibration is transmitted to the basilar membrane through the stapes and the fluid.

As illustrated in FIG. 6.4, page 56 in "Fundamentals of Hearing," by Yost et al., referenced above, the base end of the basilar membrane connected to the stapes is narrower and stiffer than the apical end and may be under a small amount of tension. The membrane widens more or less uniformly from the base end towards the apical end.

This variation in width and stiffness of the basilar membrane gives different sections of the membrane different resonant frequencies. Each section will tend to respond most strongly to those frequencies in the incoming signal closest to its resonant frequency. According to a three-dimensional model of the Applicant, the basilar membrane is thought of as an array of mechanical filters, arranged in the order of their frequency response, each filter corresponding to a section of the basilar membrane.

In the article "Exploring the Space-Time Structure at the Output of a Cochlear Model," by Benjamin Monderer, Columbia University, 1988, a two-dimensional version of the above-described structure of the ear is set forth in FIG. 3.2.1. In the article, Monderer constructed a two-dimensional box model of the cochlear illustrated in FIG. 3.3.1. The mathematical formulation of the model and the design of a cochlear filter bank based on this model are also set forth in that article. Monderer's filter bank, in ignoring the third dimension, and hence also the breadth of the basilar membrane, lacks the crucial property of noise suppression desirable for an early-stage filter for speech recognition. In contrast, using a three-dimensional model of the cochlear, applicant has designed a filter bank with strong noise suppression.

The design of the filter is based on the realization that the response of each section of the cochlear membrane is coupled in all three dimensions to the response of other sections through the fluid in the scala vestibuli and scala tympani. Moreover, the breadth of the basilar membrane, being of the third dimension, critically determines the strength of the coupling. Such coupling enables the filter bank to entrain the dominant signal in such a way as to enhance it with respect to less dominant background noise. Applicant proposes an intra-filter feedback as well as an inter-filter feedback, and filter coefficients based on the breadth of the basilar membrane to simulate the action of such coupling in order to increase the signal-to-noise ratio for speech recognition.

In section 3.5, entitled "The Integro-Differential Cochlear Map," of the above-referenced paper by Monderer, differential-integral equations are set forth for his two-dimensional model. Using essentially the same mathematical approach as Monderer in the three-dimensional model, Applicant arrives at the following differential-integral equation:

$$m(x)(d^2y/dt^2) + q(x)(dy/dt) + k(x)y(x) = \quad (1)$$

$$-2\rho B(x)x(du/dt) - 2\rho B(x)\int_0^L g(x/\xi)(d^2y/dt^2)B(\xi)d\xi \quad$$

where $$(\tfrac{1}{2}\pi)\sum_{k=-\infty}^{\infty}\sum_{m=-\infty}^{\infty}\sum_{n=-\infty}^{\infty}(-1)^k(1/r_{kmn}(\xi - \quad (2)$$

$$x) - 1/r_{kmn}(\xi + x))$$

and $$r_{kmn}(\delta) = [(2kL + \delta)^2 + (2mH)^2 + (nH)^2]^{\tfrac{1}{2}} \quad (3)$$

In the equations above, $\rho$ is the density of the fluid in the cochlear chamber, L the length of the basilar membrane, H the height of the scala vestibuli as well as its width. $B(x)$ is the effective breadth of the basilar membrane, x the distance along the basilar membrane, and y the distance along the height of the cochlear chamber. $m(x)$, $q(x)$, $k(x)$ are the mass, damping and stiffness per unit length of the basilar membrane, and u is the driving velocity at the stapes caused by the input speech signal.

The above equations and the three-dimensional model of Applicant differ radically from Monderer's in the feedback term and the explicit dependence on the effective breadth "$B(x)$."

Making the effective breadth vary linearly with position x (distance from the base end) along the basilar membrane, $$B(x)=B(0)-B_{taper}x \quad (4)$$

a first approximation to equation (1) leads to the following system of differential equations when discretized along the length of the basilar membrane at the rate of $(1/D)=(M/L)$ points per unit length:

$$[m^i + (\tfrac{1}{3})HB^i + 2(D^2/H^2)(B^i)^{2*}i](d^2y^i/dt^2) + q^i dy^i/dt + k^i y^i = \quad (5)$$

$$-2\rho DB^{i*}i^* du/dt - 2\rho(D^2/H^2)B^i\sum_{j=0}^{M}B^j\Theta_{ij}(d^2y^j/dt^2)$$

where $B^i$, $m^i$, $q^i$, $k^i$, $y^i$ are respectively the breadth, mass per unit length, damping per unit length, stiffness per unit length and the displacement along the height of the cochlear chamber of the ith section of the basilar membrane, i being indexed along the basilar membrane, and u is the input speech signal.

When discretized in time by $$y(n+1)=y(n)+(T/2)(dy(n+1)/dt+dy(n)/dt) \quad (6)$$

we obtain the filter equations 7–10 set forth below:

$$z^i(n)=a_1^i * z_1^i(n-1)+c^i * \Sigma_j d^j\Theta^i_j * z_1^j(n-1) + a_2^i * z_2^i(n-1)+b^i * (u(n)-u(n-1)); \quad (7)$$

$$z_1^i(n)=\Sigma_j e^i_j * z^j(n); \quad (8)$$

$$z_2^i(n)=z_2^i(n-1)+(T/2) * (z_1^i(n)+z_1^i(n-1)); \quad (9)$$

where $$\Theta^i_j = \begin{Bmatrix} i, & i < j \\ 0, & i = j \\ j, & j < i \end{Bmatrix} \quad (10)$$

and $u(n)$ is the nth sample of the input speech signal, where the filter coefficients are formed from the cochlear parameters as follows according to equations (11) below:

$$\mu^i = m^i + (\tfrac{1}{3})HB^i + 2\rho(D/H)^2(B^i)^{2*}i + q^i(T/2) + k^i(T/2)^2; \quad (11)$$
$$a_1^i = (m^i + (\tfrac{1}{3})HB^i + 2\rho(D/H)^2(B^i)^{2*}i - q^i(T/2) - k^i(T/2)^2)/\mu^i;$$
$$a_2^i = -2k^i(T/2)/\mu^i;$$
$$b_i = -2\rho DB^{i*}i/\mu^i;$$
$$c^i = 2\rho D^2(B^i/H)/\mu^i;$$
$$d^i = B^i/H;$$

and according to equations (12), (13) as follows:

$$\Sigma_k[\delta^i_k+c^i\Theta^i_k d^k]e^k_j=\delta^i_j \quad (12)$$

That is, $$\Sigma_k[\delta^i_k+c^i d^k\Theta^i_k]z^k_1(n)=z^i(n) \quad (13)$$

In the above equations, $\delta^i_j$ is the identity matrix, T the sampling period where the integral-differential equation is discretized in time.

FIG. 2 is a block diagram illustrating in more detail the cochlear filter bank 104 of FIG. 1. As shown in FIG. 2, filter bank 104 comprises (M+1) filters each receiving as input an acoustic signal u(n) and provides an output $X^i(n)$, where i ranges from "0" to "M." In the preferred embodiment, each of the (M+1) filters has a structure identical to filter 112 which has two stages: a stage one $R_1^i$ and a stage two $R_2^i$. The input signal u(n) is first processed by the first stage whose output $z^i(n)$ is fed to the second stage which provides the output signal $X^i(n)$. The second stage also provides feedback signal $Z_2^i(n-1)$ to the first stage and a different feedback signal $Z_1^i(n-1)$ to the first stage of preferably all the filters including the first stage $R_1^i$. The first stage $R_1^i$ derives its output from the acoustic input signal as well as certain outputs from stage two of all the filters. Similarly, the output of stage one $R_1^i$ is fed to the inputs of the stage two of preferably all the filters.

The feed forward paths from stage one of each filter to stage two of all the filters and the feedback paths from stage two to stage one of all the filters simulate the cross coupling between adjacent sections of the cochlear membrane through the fluid in the cochlear chamber.

The input signal u(n) is the $n^{th}$ sample and the signals from stage two (fed back to stage one of all the filters) are derived from the $(n-1)^{th}$ sample, that is, the speech signal sampled one sampling period T before the $n^{th}$ sample. A more detailed construction of each filter 112 is set forth in FIG. 3.

As shown in FIG. 3, a unit delay element 114 delays the prior sample u(n-1) by a unit delay, where both the present and the previous samples are amplified by amplifier $b^i$. An adder 116 then adds the difference between the delayed prior sample u(n-1) and the present sample u(n) to the various feedback signals derived from the u(n-1) sample from stage two of all the filters in order to derive an output signal $\bar{z}^i(n)$, where this output signal is then supplied to the stage two of all the filters. As shown in FIG. 3, the various feedback paths from stage two to $R_1^i$ are preferably amplified by various factors before these feedback signals are added by adder 116.

Adder 122 then adds the feed forward signals from stage one of all the filters to provide an output $z_1^i(n)$. This signal, after being delayed by unit delay 124, is supplied to stage one of all the filters as a feedback signal for computing the output for the next sample and is also fed forward to adder 126 which adds such signal to the output of adder 122 for the next sample. In other words, adder 126 would add $z_1^i(n)$ to $z_1^i(n-1)$ to provide an output signal which is amplified by a factor T/2 to adder 128 during the sampling of the $n^{th}$ sample. It will be noted that T is the sampling period. Adder 128 adds such output to feedback signal $z_2^i(n-1)$, which is the output of the previous sample through unit delay 130 to derive the output $X^i(n)$. Unit delay 130 delays the present output and feeds such output to adder 128 as well as the first stage of filter 112 for deriving the output of the next sample.

It will be evident that the above-described structures of filter 112 and filter bank 104 conform to the filter bank equations 7-10. Despite such conformity, it will be understood that the assumptions in deriving filter bank equations 1-9 do not limit the embodiment of FIGS. 2 and 3 or equations 10-13. Specifically, the effective breadth B(X) does not need to vary linearly with precision along the basilar membrane, although such feature is preferable.

The above-described filter design enables the filter to be stable down to a sampling frequency of about 10 kilohertz, whereas conventional designs appear to require a sampling frequency on the order of 100 kilohertz.

In the preferred embodiment, the output of the first stage of each filter is fed forward to the stage two of all filters and feedback signals are supplied by stage two of each filter to stage one of all the filters. It will be understood, however, that not all of the outputs of stage one of the filters need to be fed forward to stage two of all the filters as long as a substantial number (e.g., over half) of such signals are fed forward. Similarly, it is adequate for a significant number of output signals of stage two to be fed back to stage one of the filters; again, it may be adequate for such feedback action to be implemented for only over half of the filters. The feedback pattern may be random, but statistically evenly distributed, or regular, such as omitting a definite number of feedback paths at regular intervals.

While the delay elements in FIGS. 2 and 3 all have the same unit delay, it will be understood that the filter bank will perform the above-described function even though the delays introduced by the delay elements may differ. Preferably, when the coefficient $a_1^i$ is in the range between 0 and about 1, the coefficients $a_2^i$, $b^i$, $c^i$, $d^i$ are respectively in the ranges between about $-1,000,000,000$ and 0, about $-100,000$ and 0, 0 and about 10, and 0 and about 10,000, for all values of i between 0 and M.

Speech samples were input directly from a radio receiver; or recorded in an ordinary business office with a dictation microcassette recorder, such as Model Pearlcorder L200, using a low-cost Sony microphone, model MTL F-96. The results of feeding the recording through the filter bank described above are illustrated in FIGS. 4-7. FIG. 4 is a two-dimensional representation of the output of filter bank 104 of FIGS. 1-3 where the input signal is a radio broadcast of the word "Salvadoran" pronounced by President George Bush in the background of helicopter noise. The vertical axis is the frequency or tone axis where 281 frequencies are represented and the horizontal axis is time. The degree of darkness of the plot is proportional to the strength of the signal at a particular frequency at a particular time in the plot. Various portions of the plot corresponding to the particular syllables are labeled. As is evident from FIG. 4, the various syllables pronounced are clearly visible and are distinct from a very noisy background due to helicopter noise. In other words, the filter bank enables dominant signal that is present to occlude high level background noise.

FIG. 5 is a similar plot of the output of the filter bank 104 where the input acoustic signal is a radio broadcast of the phrase "our executive producer," where the relevant portions of the plot are again labeled by the syllables on top. As shown in FIG. 5, the dominant signal again occludes two more or less constant frequencies of some background music. FIGS. 6 and 7 combined is a similar plot in an expanded time scale of the filter bank output corresponding to an input of a recording of the phrase "the old abbot" where the ending sound of the last word has been cut off in the recording. As shown in FIG. 5, the dominant signal again occludes a narrow band noise from a computer.

The most important property of the above-described filter bank design is the ability of the filter bank to entrain its output to a dominant signal—leading to the suppression of background noise, whether broad band or narrow band. Graphically, FIGS. 4–7 look like the occlusion of background noise by a foreground signal. This property makes the filter bank described herein uniquely suitable for use as an early-stage filter in speech recognition and everyday noisy environment. While the above-described filter bank is particularly useful for speech recognition, it will be understood that the structure of the filter bank as set forth in FIGS. 2 and 3 may be suitable for other pattern recognition applications as well, such as other acoustic or sonar applications. All such applications are within the scope of the invention. It is preferable for the audible range of frequencies to be spanned by enough number of filters in the filter bank, such as more than ten filters in the filter bank. While preferably the filters in the filter bank cover non-overlapping frequencies, the filter bank will still function even if the filters cover overlapping frequencies; all such variations are within the scope of the invention.

The CN/IC Filters

The outputs of the filters in the filter bank must be analyzed or further filtered to detect the presence of phonemes and suprasegmentals. In the preferred embodiment as shown in FIG. 1, the means for filtering the filter bank output is divided into two stages: the CN/IC filters 106 forming the second stage and a neural network 108 forming a third stage. The CN/IC filters may be regarded as part of a neural network except for their lack of a nonlinear amplification function, or transfer function at their outputs. Such a nonlinear transfer function serves to threshold as well as limit the saturation of the outputs. It will be understood, therefore, that a single stage comprising only a single neural network with sufficiently many layers may be adequate. Applicant has discovered that it is advantageous to separate the second filtering means into two stages. The first stage is the non-neural network CN/IC filters 106. The outputs from these filters indicate the presence of significant patterns in the two-dimensional frequency-time filter bank outputs. For two-dimensional signals, these significant patterns consist of local variations that have different orientations with respect to the two axes. For input signals containing speech information, these local variations of different orientations indicate the occurrence of significant tones and changes in significant tones, which are referred to as the elementary tonotopic features. The elementary tonotopic features may include onset, rise and fall of any significant tones of the input signal. As a further improvement, the tonotopic features may also indicate frequency of any significant tones of the input signal. The four tonotopic features (onset, rise, fall, frequency) contain overlapping or redundant information so that identifying patterns related to only three of the features may be adequate for speech recognition.

FIGS. 8A–8H are eight figures illustrating CN filters which may be used for identifying patterns related to the onset, frequency, fall and rise of significant tones present in any speech signal. Each of the eight FIGS. 8A–8H are two-dimensional representations of filter coefficients along the vertical frequency axis and the horizontal time axis. As in the FIGS. 4–7, the darker the area, the higher are the values of the coefficients of the filter. When the eight filters are used to filter a corresponding two-dimensional representation of the output of cochlear filter bank 104, patterns related to the four tonotopic features may be identified. While eight filters are shown in FIGS. 8A–8H, the information derived from the eight filters are somewhat redundant. Thus, FIGS. 8A and 8B both extract onset information. FIGS. 8C and 8D both extract frequency information. FIGS. 8E and 8F both extract information related to the fall in tone frequency. FIGS. 8G and 8H both extract information related to the rise in frequency of tones. Information concerning each of the four features (onset, frequency, rise and fall) may be derived from any two of the three remaining features.

FIGS. 9A–9H are filters similar to those in FIGS. 8A–8H, except that the filters in FIGS. 9A–9H are coarser in resolution than those illustrated in FIGS. 8A–8H. As indicated above, using only two filters, such as 8E and 8G, and two corresponding coarser filters such as those in FIGS. 9E and 9G for example, may be adequate for speech recognition. Other combinations are also possible and are within the scope of the invention. The preferred method of applying the filters in FIGS. 8 and 9 for filtering the output of filter bank 104 will be described below in reference to FIG. 12 and the figures that follow.

FIGS. 10A–10P graphically illustrate the equivalent filters resulting from applying first the CN filters of FIGS. 8A–8H, and then the 8 smoothing and 8 contrast IC filters. The outputs from the CN filters indicate the presence of local variations of different orientations, specifically the elementary tonotopic features of onset, rise, fall and frequency of tones in the case of an input signal containing speech. The smoothing IC filters perform local averaging and tend to suppress local variations of a smaller scale, or higher resolution. The outputs from the smoothing filters therefore indicate the presence of local variations of a lower resolution, or a greater scale. The contrast IC filters, on the other hand, as their name implies, are high-pass filters that tend to emphasize sharper local variations of a smaller scale, i.e., greater contrast. These sharper local variations usually indicate the presence of boundaries where the predominance of a particular orientation, or elementary tonotopic feature, abruptly increases or drops off. The outputs from the contrast IC filters therefore indicate the presence of boundaries of different orientations. This low-pass vs. high-pass difference between the smoothing IC filters and the contrast IC filters is evident from comparing FIG. 10A (which uses a smoothing IC filter) with FIG. 10B (which uses a contrast IC filter), and the other seven pairs, FIGS. 10C through 10P.

The sequential filtering by first the CN filters, followed by the smoothing IC filters amounts to an approximation of the filters of FIGS. 9A–9H. FIG. 11A illustrates the outputs from the cochlear filter bank 104 and the outputs of the CN/IC filters for a suitable input signal to illustrate the invention. These figures will be described in some detail after the filtering process is described below.

In any pattern recognition task, a key feature is the ability to eliminate irrelevant and random information. For this purpose, Applicant proposes a sequence of filters called CN/IC filters at different resolutions for filtering the output of the filter bank in order to identify the ultimate speech pattern, that is, phonemes and suprasegmentals. It will be understood, however, that such sequence of filters as described below may also be used for identifying patterns in non-speech signals, such as in identifying symbols in handwritten material.

FIG. 11A is a block diagram illustrating the operation of the CN/IC filters. In reference to FIG. 11A, after the output of filter bank 104 is filtered by the CN filters 150, the filtered output is supplied to a first stage of filters comprising IC smoothing filters 152 and IC contrast filters 162. The outputs of the smoothing filters 152 are in turn filtered by a second stage of filters: IC smoothing filters 154 and IC contrast filters 164. The outputs of the smoothing filters 154 are in turn filtered by a third stage of filters: IC smoothing filters 156 and IC contrast filters 166. The three stages form a sequence of three stages. While only three stages are shown, it will be understood that similar additional stages may be employed and are within the scope of the invention. The outputs of the last stage of the IC smoothing filters are supplied to the neural network 108 in FIG. 1. In addition, the outputs of the IC contrast filters at all the stages are also supplied to the neural network 108 in FIG. 1. In FIG. 11A, IC contrast filters 162 in the first stage derive contrast feature outputs from the outputs of the CN filters 150 so that the outputs of the contrast filters are referred to below as the IC1H contrast feature output. In the next stage of contrast filters 164, the contrast information is derived from the output of the first level IC smoothing filters 152 so that such outputs are labeled IC2H contrast feature outputs. Then the contrast information derived by IC contrast filters 166 from the second stage IC smoothing filters 154 are labeled IC3H contrast feature outputs. The outputs of the last stage of the IC smoothing filters (the third level 156 in the scheme of FIG. 11A), and the contrast feature outputs from all the levels in the CN/IC filter configuration (in FIG. 11A, it will consist of IC1H, IC2H and IC3H contrast feature outputs) are used as inputs to the neural network 108 of FIG. 1 for deriving the phonemes and the supersegmentals. It will be understood, however, that less than all of the contrast feature outputs and the output of a finer resolution from one of the smoothing filters other than 156 may be adequate as inputs to the neural network; all such variations are within the scope of the invention.

The serial deployment of the CN filters and then the IC smoothing filters is equivalent to the deployment of the CN filters of the same feature, but at half the resolution. Because of this, an alternative, but less efficient, scheme of operating the CN/IC filters, is to directly use CN filters at all the different levels of resolution, and not deploy the IC smoothing filters at all. This is illustrated in FIG. 11B.

Furthermore, as illustrated in FIGS. 10A-10P, the serial deployment of CN filters and then the IC contrast filters of the same feature may also be collapsed into one equivalent filter for that same feature. The coefficients of the equivalent filter are obtained as a linear combination of the coefficients of the separate filters. This will be further explained below in the detailed discussion of the CN and IC filters. In this case, the operation of the CN/IC filters would follow the scheme of FIG. 11C.

As FIG. 11A shows, the IC contrast filters operate on the outputs from the CN filters or the IC smoothing filters. Therefore, these outputs contain redundant information beyond the contrast information the IC contrast filters extract. This redundant information can be retained and passed along as inputs to the neural network 108 of FIG. 1, where it is then discarded. Therefore, an even less efficient, but still practical, scheme of operating the CN/IC filters is simply not to use the IC filters at all. This is illustrated in FIG. 11D.

FIG. 12 is a detailed flow diagram illustrating in more detail the operation of the CN/IC filters of FIG. 11A, when such filters are used for recognizing speech signals. As shown in FIG. 12, four pairs of CN filters are employed, each pair for recognizing a particular one of the four tonotopic features, namely onset, frequency or tone, and rise and fall. Each pair of the CN filters for a particular feature comprises the cosine and sine functions. While sine and cosine functions are used in the preferred embodiment for the CN and IC filters, it will be understood that symmetric and antisymmetric functions other than sine and cosine may be used and are within the scope of the invention. As shown in FIG. 12, each stage of IC contrast filters also includes four pairs of filters, each pair for a particular feature, and where each pair comprises one for the sine and the other for the cosine, and the same is true for the IC smoothing filters for the same stage. It will be noted that, at each stage, the two pairs of IC smoothing and contrast filters for a particular feature (e.g. onset) receive as inputs only the outputs of the IC or CN filters for the same feature, and not from the outputs of filters for any other feature.

FIG. 12 explicitly shows only two deployments or stages of IC filters, but the pattern is the same for all deployments of IC filters. Each stage of IC filter yields four groups of outputs, two for each feature.

For the first stage of IC filters, the output (corresponding to output of filter 162 of FIG. 11A) of the IC contrast onset cosine filter output is labeled "0" and the output of the IC contrast onset sine filter is labeled "1." The "0" and "1" outputs are fed to the data buffer 180 for IC1H outputs. The similar outputs (also corresponding to output of filter 162 of FIG. 11A) of the IC contrast filters for the first stage for tone or frequency, rise and fall, are labeled "2-7" and form the remaining six inputs for data buffer 180. It will be noted that the outputs of both the sine and cosine CN filters are used to derive the contrast information and average value information at the first stage. For the second stage (corresponding to filters 154, 164 in FIG. 11A), again there is a pair of IC contrast filters (sine and cosine) and a pair of IC smoothing filters (sine and cosine) for analyzing and identifying a tonotopic feature. It will be noted that there is no crossover connections between the CN and IC filters across different features. In other words, the different stages of IC filters derive contrast and average value information only from the outputs of the CN or IC filters for the same tonotopic feature.

The general functional nature (values of the coefficients) of the eight CN filters shown in FIG. 12 are illustrated in FIGS. 8 and 9 in combination with FIG. 12. The general functional nature (values of the coefficients) of the sixteen IC filters of each stage is illustrated in a different way in FIGS. 10A-10P. These figures show the equivalent filters resulting from first applying the CN filters of FIGS. 8A-8H, and then the IC filters. FIGS. 10A, 10C show the equivalent filters resulting from first applying CN filter of FIG. 8A, and CN filter of FIG. 8B, superposed as indicated in FIG. 13, and then applying the two IC smoothing filters for that feature (ie. onset). These two equivalent filters (CN+smoothing) are in fact an approximation of the filters in FIGS. 9A and 9B. FIGS. 10B, 10D show the equivalent filters resulting from first applying the same CN filters as for FIGS. 10A and 10C and then applying the two IC contrast filters for that feature (onset). These two filters are entirely new filters. For easy reference, the outputs of the filters in FIG. 12 are labeled by the numbers (8A, 8B, 10A-10D) of the figures that illustrate the filters. Similarly, FIGS. 10E-10P show the result achieved by applying the corresponding smoothing and contrast filters to the outputs of the remaining 6 CN filters.

As shown in FIG. 12, the second stage of IC filters derives the contrast feature outputs from the outputs of the smoothing filters of the previous stage. For the second stage, the outputs of the IC contrast onset cosine and IC contrast onset sine are labeled "8" and "9" respectively and are fed to data buffer 182. The outputs of IC contrast filters for tone, rise and fall features are labeled 10-15, and are fed to data buffer 182 for storing the IC2H outputs. While only two stages of IC filters are shown in FIG. 12, it will be understood that additional stages similar to the first and second stages may be employed and are within the scope of the invention. In the same manner as shown in FIG. 12 for the first and second stages, the contrast information derived at each additional stage (not shown) is fed to the corresponding additional data buffers (not shown) similar to buffers 180 and 182. The output from all stages of the IC filters together with the average value information output from the IC smoothing cosine and IC smoothing sine filters of the last stage are then fed to neural network 108 for identifying phonemes and suprasegmentals.

As discussed above, in order to identify the phonemes and suprasegmentals in continuous speech and independently of the speaker, it is useful to derive multi-resolution information. As shown in FIGS. 12 and 13, coarser and coarser resolution information is derived as one proceeds from the CN filters down the chain or sequence of stages of IC filters. In the preferred embodiment illustrated in equations 18-21 below, resolution decreases by a factor of 2 when information is passed from one stage to the next. It will be understood, however, that filters at the same stage (eg. 152, 162) need not be at the same resolution. Thus, as indicated in FIG. 12, the IC1H outputs in buffer 180 are at half of the resolution of the eight features at the CN filter stage, while the IC2H outputs in buffer 182 are at a quarter of the resolution of the CN filters.

In reference to FIG. 12, the CN and IC filters for the onset feature are such that they would assist in identifying vertical boundaries in the frequency/time two-dimensional representation such as those seen in FIGS. 4-7. The CN and IC tone filters are for identifying horizontal boundaries and the rise and fall CN and IC filters are for identifying inclined boundaries in the two-dimensional representation. While in the preferred embodiment, at least three of the four features are identified, it will be understood that in some cases, identification of one type of boundary may be useful for speech applications.

Each of FIGS. 8A-8H illustrates an embodiment where each of the CN filters has 17×17 coefficients. In the preferred embodiment, the coefficients of each CN filter are derived from Gabor functions shown below, where i, j ranges from −8 to 8:

$$g^0_r(i,j) = \exp(-\delta w_r^2 \delta t^2 - \delta k_r^2 \delta x^2) * \sin(w_r^* j + k_r^* i) \quad (14)$$

$$g^1_r(i,j) = \exp(-\delta w_r^2 \delta t^2 - \delta k_r^2 \delta x^2) * \cos(w_r^* j + k_r^* i) \quad (15)$$

where $g^0_0$ and $g^1_0$ denote the filters for the finest resolution, and $g^0_1, g^1_1, \ldots g^0_r$ and $g^1_r$ denote filters for successively coarser resolutions, each halving the resolution of the preceding set; i indexes the filter bank outputs and j, descretized time; $k_r$ is the spatial frequency, $w_r$ the temporal frequency, $\delta k_r$ the spatial frequency bandwidth, $\delta w_r$ the temporal frequency bandwidth. $\delta t$ and $\delta w_r$ are $$\delta t = \cos\theta^{s*} i + \sin\theta^{s*} j \quad (16)$$

$$\delta x = -\sin\theta^{s*} i + \cos\theta^{s*} j \quad (17)$$

where $\tan\theta^s = w_r/k_r$, and where s is an index for the orientation of the boundaries described above. In the preferred embodiment, the coarseness increases by a factor of 2 for each filter relative to the immediately preceding filter in the main path sequence of the smoothing filters and in the side paths of the contrast filters following the CN or IC smoothing filters in FIG. 11A. The increasing coarseness is expressed as $$w_{r+1} = (\tfrac{1}{2}) * w_r \quad (18)$$

$$k_{r+1} = (\tfrac{1}{2}) * k_r \quad (19)$$

$$\delta w_{r+1} = (\tfrac{1}{2}) * \delta w_r \quad (20)$$

$$\delta k_{r+1} = (\tfrac{1}{2}) * \delta k_r \quad (21)$$

In actual filters, we truncate the functions by limiting i and j to be within some particular intervals. There are many ways to cover the two-dimensional space-time with these coefficients, depending on the desired finest resolution, i.e., $w_0$, number of orientations, i.e., different $\theta^s$s, overlap and attenuation of the Gaussian at the truncation boundary.

In one embodiment, we use the following values:

$$
\begin{aligned}
w_0 &= 0.5 \text{ rad./sample} \\
\theta^| &= \pi/2 \text{ rad. (} | \text{ represents onset)} \\
\theta^- &= 0 \text{ rad. (} - \text{ represents tone)} \\
\theta^\backslash &= \pi/4 \text{ rad. (} \backslash \text{ represents fall)} \\
\theta^/ &= -\pi/4 \text{ rad. (} / \text{ represents rise)} \\
\delta w_0 &= 0.2 \text{ rad./sample} \\
\delta k_0 &= 0.2 \text{ rad./channel}
\end{aligned}
\quad (22)
$$

In all, there are eight distinct CN filters, forming four pairs corresponding to the four features onset, tone, rise and fall. i and j range from −8 to 8.

As noted above, filtering the two-dimensional output of the filter bank 104 by means of a number of CN filters at different resolutions yields multi-resolution decomposition of the output and enhances the capability in detecting significant patterns in an input signal, such as the above-described tonotopic features in speech. A general theory of such decompositions is described by Mallat, S. in "A Theory for Multiresolution Signal Decomposition: The Wavelet Representation," IEEE Trans. Pattern Anal., Machine Intell., vol. 10, pp 674, July 1989. A second set of filters referred to above as the IC filters may be constructed for simplifying the filtering needed to obtain such a decomposition. The function and result of the IC filters have been set forth above in reference to FIGS. 8-10; their derivation will now be described. To construct the IC filters, a CN filter of a coarser resolution may be approximated using a CN filter of a finer resolution by using the following equations:

$$g^p_r(i,j) \approx s^p_r(i,j) \quad (23)$$

$$s^p_r(i,j) = \Sigma_q \Sigma_m \Sigma_n h_L^{pq}[(i-2m), (j-2n)] g^q_{r-1}(m,n) \quad (24)$$

by minimizing the squared difference $$\Sigma_i \Sigma_j [g^p_r(i,j) - s^p_r(i,j)]^2 \quad (25)$$

In the preferred embodiment, m and n range from −2 to 2 for a 5×5 array of IC filter coefficients for each of two values of q (0, 1). The indices p, q denote symmetrical coefficients when equal to 0, and assymetrical coefficients when equal to 1. In particular they denote the sine quadrature and cosine quadrature when the filter coefficients are the Gabor functions of equations (14) and (15). The index r denote the level of resolution. We get eight distinct such $h_L$s for the specification in equations 22—two phase quadratures at each of four orientations. The $h_L$s constitute the lowpass half of the IC filters, hence they are also referred to as the IC smoothing filters. The other half, the $h_H$s, are any set of values that minimize the absolute value of the following sums of products $$\Sigma_q \Sigma_i \Sigma_j h_L^{pq}(i,j) * h_H^{pq}(i,j) \quad (26)$$

where p,q are again indices over the phase quadratures of sine and cosine. This minimization makes the $h_H$s as nearly orthogonal to the $h_L$s as possible. The theory of multiresolution decompositions (as in the article by Mallat cited above) requires exact orthogonality. With such requirement, the sum in expression (26) above would be identically zero. We relax that requirement to near orthogonality (that is, where the sum in expression (26) has been minimized). As a result, the features extracted by the $h_H$s will have a minimal amount of overlap with those extracted by the $h_L$s. The $h_H$s must also simultaneously minimize the absolute value of the following difference:

$$\Sigma_q \Sigma_i \Sigma_j [h_L^{pq}(i,j)]^2 - [h_H^{pq}(i,j)]^2 \quad (27)$$

This minimization makes the $h_H$s as nearly equal in magnitude to the $h_L$s as possible, thus excluding any unreasonably small values.

For $\theta |$:

$$h_H^{pq}(i,j) = (-1)^{(1-j)} h_L^{pq}(i, 1-j) \quad (28)$$

In all, there are 16 distinct IC filters, eight lowpass and eight highpass.

The lowpass half IC filters will be referred to as the IC smoothing filters. The other half will be referred to as the IC contrast filters for a total of 16 IC filters. FIGS. 10A, C, E, G, I, K, M, O illustrate the lowpass filters and FIGS. 10B, D, F, H, J, L, N, P illustrate the highpass IC filters. The CN and IC filters are derived using Gabor functions in accordance with equations 14, 15 and equations 23, 24, 25, 26, 27, and 28 above.

Substituting the $h_H$s for the $h_L$s in equation (24) also gives the equivalent contrast filters depicted in FIG. 11C, as follows:

$$c^p_r(i,j) = \Sigma_q \Sigma_m \Sigma_n h_H^{pq}[(i-2m), (j-2n)] g^q_{r-1}(m,n) \quad (29)$$

$s^p_r(i,j)$ are the coefficients of the equivalent smoothing filters at resolution r, and $c^p_r$ are the filter coefficients of the equivalent contrast filters at resolution level r, formed by a linear combination of the CN filters $g^p_{r-1}$ of the next higher (r−1) level of p resolution using the IC contrast filter coefficients $h_H^{pq}$.

Instead of the implementation described above employing Gabor functions, the CN/IC filters may also be implemented as a neural network whose weights can be trained to be substantially the same as the CN/IC filter coefficients.

FIG. 14 illustrates a circuit for implementing the superposition, multiplication and summing operations called for in FIG. 13. The multiplications are performed by multipliers 192, and the products are summed by adder 194. If desired, a temporary storage buffer (not shown) may be used to collect and store the incoming cochlear bank outputs before all 17 sets of output signals have arrived, so that all 17×17 outputs may be applied simultaneously to the multipliers. Alternatively, the configuration of FIG. 14 may also be implemented in software.

In lieu of the circuit of FIG. 14, the circuit of FIG. 16 may be used instead to perform the superposition, multiplication and summing operations called for in FIG. 13. As shown in FIG. 16, these are performed using delay elements 196, amplifiers 198, and adder 200. In all 17×16 delay elements are needed, as illustrated in FIG. 16. In general, in order to obtain pxq samples during q sampling intervals from p outputs, p(q−1) delay elements are needed.

It is useful to view the CN/IC filters in neural network terminology, since the individual filters described are not useful by themselves, but extract essential primitive features when used together with a particular pattern of connectivity, and renders the overall scheme similar to a neural network. In fact, the implementation of the operation of all the filters in FIG. 11A is similar to that of a neural network. These CN/IC filters, however, differ from a neural network in that the coefficients of the filters are preselected and fixed and do not change in response to training. Thus, the inputs from the cochlear filter bank may be regarded as a map of the response of the basilar membrane of the acoustic signal. The output from applying the CN tone cosine filters to this cochlear map constitutes another map which will be referred to below as the CN tone cosine map, because it shows how strongly the feature of a steady tone is occurring at different tones and at different times. In general, any output showing the occurrence of a particular feature is a "feature map," and a group of related feature maps constitutes a layer. The pattern of connectivity between the maps of two layers is identical. In this terminology, the CN/IC network has eight layers:

FB—the layer of the 1 cochlear response map;

CN—the layer of the 8 feature maps output by CN filters

IC1L—the layer of the 8 feature maps output by the first deployment of the IC smoothing filters (i.e. in the first stage);

IC1H—the layer of the 8 feature maps output by the first deployment of the IC contrast filters (i.e., in the first stage);

IC2L—the layer of the 8 feature maps output by the second deployment of the IC smoothing filters (i.e. in the second stage);

IC2H—the layer of the 8 feature maps output by the second deployment of the IC contrast filters (i.e. in the second stage);

IC3L—the layer of the 8 feature maps output by the third deployment of the IC smoothing filters (i.e. in the third stage);

IC3H—the layer of the 8 feature maps output by the third deployment of the IC contrast filters. (i.e. in the third stage).

A filter connects a map at its input to a map at its output. In the terminology of neural networks, a filter is referred to as a tract, which consists of individual synaptic connections, which are the individual filter coefficients.

Superposition Scheme for CN Filter Operation (FIG. 13)

The action of the CN and IC filters will now be described in some detail. As indicated above, in the preferred embodiment the cochlear filter has two hundred eighty-one outputs. In such embodiment, each CN filter is a 17 by 17 matrix of coefficients and is superposed onto seventeen of the cochlear filter outputs at seventeen time instances. Such superpositions are repeated for different portions of the two dimensional tone-time representation of the cochlear filter bank outputs, where such portions are located six channels and six time instances apart to generate forty-five outputs per CN filter, for a total of three hundred sixty outputs from eight CN filters every instant, but the output signal is decimated by a corresponding factor of six in time. Such filter action is illustrated in FIGS. 13–16.

As shown in FIG. 13, the operation of the CN filter operates by a superposition scheme. First, a 17×17 CN filter located in the two dimensional representation in FIG. 13 with one corner at the origin so that its center $C_{11}$ is at the eighth sampling time and at the eighth tone of the two hundred eighty-one tones. When the CN filter is placed at such position in the two-dimensional representation of the cochlear filter bank output, each coefficient of the 17×17 CN filter overlaps an output of the cochlear filter bank. The overlapping filter coefficient and the corresponding cochlear filter bank output are multiplied to produce a product. Thus the overlapping and multiplication of the 17×17 coefficients and their corresponding cochlear filter bank outputs yield 17×17 products; these products are added together to form an element of the CN feature map at $D_{11}$. Next the CN filter is shifted upwards along the tone scale by six tones so that its center is at $C_{21}$, where the same process is repeated. In other words, again the overlapping coefficients and filter bank outputs are multiplied to produce 17×17 products and the products summed to provide an element of the CN feature map at $D_{21}$. The same process of superposition, multiplication and summation is repeated similarly by shifting the CN filter to its right (i.e., center from $C_{11}$ to $C_{12}$, or $C_{21}$ to $C_{22}$) by six time intervals per shift, to obtain other elements of the CN feature map (e.g., $D_{33}$).

The superposition scheme of FIG. 13 is a combination of the connectivity shown in FIGS. 15 and 16. FIG. 15 is a cross-section of the detail signal flow spatially within individual CN filters. The cross section is cut across the direction of time, and shows the connectivity along the direction of tone. The connectivity along the direction of time is identical. Combining the two, we see how the 17×17 array of an individual CN filter is superposed on the outputs from the cochlear filter bank. As described above, the centers of the 17×17 arrays are located at $C_{11}, C_{21}, C_{31}, \ldots, C_{451}, C_{12}, C_{22}, \ldots, C_{452}, \ldots, C_{4545}$ (some not shown). One output is generated for each overlap or intersection of the 17×17 array with the cochlear filter bank outputs. It takes forty-five superpositions along the tone axis of a CN filter to cover the full range of two hundred eighty-one cochlear outputs. The CN filter is superposed repeatedly along the time axis as well. The CN filter outputs are also ordered in the directions of tone and time: $D_{11}, D_{21}, D_{31}, \ldots, D_{451}, D_{12}, \ldots, D_{4545}$. The centers are six locations apart in both directions in reference to the two dimensional frequency/time representation of the cochlear bank outputs. This means that the cochlear output is decimated by six in both the tone and time directions by this scheme of applying the CN filters.

Detail Signal Flow for CN Filter Operation (FIG. 14)

This shows the detail data signal flow at each of the intersections in the superposition scheme of FIG. 13.

Superposition Scheme for IC Filter Operation with Decimation by 2 (FIGS. 17A, 17B)

An IC filter has two arrays of 5×5 coefficients. FIG. 17A shows how one of the two 5×5 arrays of coefficients of an IC filter is superposed on a CN feature map which has forty-five locations along the tone direction. Since the centers of the filters are two locations apart in frequency and time, it takes twenty-one IC filters to cover a CN feature map, hence each IC filter generates a feature map at twenty-one different tones. A decimation of 2 occurs in this connection scheme. This is the scheme employed for layer IC1L and IC1H. Remember the cochlear response map has been decimated by 6 in tone and time by the CN filters. The IC1L and IC1H maps are therefore decimated by 6×2=12 in tone and time.

FIG. 17B shows the signal flow through 5 IC filters. Each block terminating in an adder represents one of the two arrays of 5×5 filter coefficients of an IC filter, represented by the two input lines to each IC filter in FIG. 12. The other array (not shown) has an identical circuit, but different amplifier gains (filter coefficients). The first array is for filtering the output from a particular CN cosine filter of an elementary tonotopic feature and the second array is for filtering the output from the CN sine filter of the same elementary tonotopic feature. Each adder sums the outputs from both blocks for the two arrays. The pattern of signal fan-in from the CN filter outputs results in the decimation of samples from 45 to 21 in the tone direction (the diagram only shows part of the entire circuit for 45 input tones). Discarding every other output sample in time results in a decimation by a factor of 2 in time. The symmetrical signal flow in the tone and time directions is better illustrated by the superposition scheme of FIG. 17A, where each input or output signal of FIG. 17B is represented by a square in FIG. 17A. Therefore, to perform the twenty-one superpositions, multiplications and summations, twenty-one blocks of the type shown in FIG. 17B may be employed, where FIG. 17B shows only five of such blocks. These twenty-one blocks (plus the twenty-one blocks for the other array of 5×5 filter coefficients but sharing the same adders) will give twenty-one outputs for each group of forty-five tone outputs of the CN filter. This process is performed repeatedly in time on the CN outputs to yield a 21-tone IC feature map.

Superposition Scheme For IC Filter Operation with no Decimation (FIGS. 18A, 18B)

In FIG. 18A, the contiguous location of the centers of the 5×5 arrays means the output feature maps have the same dimension along the tone direction as the input feature maps. This is the scheme employed for layers IC2L, IC2H, IC3L and IC3H.

FIG. 18B shows the signal flow through IC filters for a different superposition scheme. Each block terminating in an adder represents one of the two arrays of 5×5 filter coefficients of an IC filter. The other array (not shown) has an identical circuit but different amplifier gains (filter coefficients). The first array is for filtering the output from a particular IC smoothing cosine filter of an elementary tonotopic feature, and the second array is for filtering the output from the IC smoothing sine filter of the same elementary tonotopic feature. Each adder sums the outputs from both blocks for the two arrays. The pattern of signal fan-in is for no decimation in the tone direction (similar to FIG. 17B, the diagram only shows part of the entire circuit for 21 input tones). The symmetrical signal flow in the tone and time directions is better illustrated by the superposition scheme of FIG. 18A, where each input or output signal is represented by a square.

Detail Data Flow for IC Operation (FIGS. 19 and 20)

These show two implementations of the detail signal flow at each of the intersections in the superposition scheme of FIGS. 17 and 18 similar to FIGS. 14, 16.

Schematic Representation of the Signal Flow of CN/IC Filters (FIG. 21)

This shows the detailed signal flow between the different layers of CN/IC filters. It will be noted that some of IC filter outputs at the edges of the filters are fed to fewer inputs at the next layer. Thus, the outputs of IC1 at 190, 192 are fed respectively to only 3 and 4 inputs of IC2 instead of the 5 at filters away from the edges. The same is true for the CN filter outputs at the edges; these are fed to fewer inputs of the IC filters than CN filter outputs not at edges.

Neural Network

The third stage of the system comprising a neural network 108 of FIG. 1 will now be described. Neural network 108 is first of all a multi-layer perceptron (MLP), which is an extremely broad class of neural networks. The neural network 108 has the architecture of a Neocognitron in the succinct grouping of nodes into maps, the pairing of formation and deformation layers and the connectivity patterns. Neocognitrons are not multi-layer perceptrons in their transfer functions, weight adaptation or training procedure. Because of these differences, a speech-recognition Neocognitron is very difficult to build. Some researchers in character recognition have realized the shortcomings of the Neocognitron, and have adopted the MLP with an architecture specialized to that of a Neocognitron. See "An Analog Neural Network Processor and its Application to High-Speed Character Recognition," by Boser et al., *Proc. Int. Joint Conf. Neural Networks*, pp. I-415, July 1991. Such architecture will be referred to as an MLP/N. LeCun of AT&T, one of the authors of the article, however, does not use multi-resolution CN/IC filters or other similar filters. When a network uses more than one resolution, it is referred to as an MLP/M. When temporal back propagation is employed in an MLP, such networks are referred to as MLP/T. The neural network 108 described in detail below is an MLP/MNT, that is, an MLP with multi-resolution inputs, a Neocognitron architecture and temporal back propagation.

Waibel has succeeded in applying straightforward MLP's to phoneme recognition. See "Modularity and Scaling in Large Phonemic Neural Networks," by Waibel et al., *IEEE Trans. Acoust., Speech and Signal Processing*, Vol. 37, pp. 1888, 1989. However, this straightforward approach has difficulty achieving speaker-independence. See "The Meta-Pi Network: Connectionist Rapid Adaptation for High-Performance Multi-Speaker Phoneme Recognition," by Hampshire, II et al., *Proc. Int. Conf. Acoust., Speech and Signal Processing*, p. 165, 1990. Minor modifications to the straightforward approach have also not resulted in significant improvement. See "Frequency-Time-Shift-Invariant Time-Delay Neural Networks for Robust Continuous Speech Recognition," by Sawai, *Proc. Int. Conf. Acoust., Speech and Signal Processing*, p 45, 1991. One of the shortcomings in the model developed by Waibel et al. in the article referenced above lies in the fact that much of the rich perceptual information has been filtered out before Waibel et al. apply their MLP to phoneme recognition. In contrast, the CN/IC filters described above extract and preserve rich perceptual information which enables neural network 108 to achieve speaker-independent speech recognition.

Block Signal Flow for NN Neural Network Operation (FIG. 22)

The input signals are the feature maps output by the IC filters. Here we use the notation of "H" and "L" to denote contrast feature maps and smoothing feature maps. In the preferred embodiment, the coarser two stages of contrast feature maps, namely IC2H and IC3H, as well as the coarsest smoothing feature maps, IC3L, support the formation of vowel- and suprasegmental-related features and support the consonant-related features at a point further downstream in the signal as shown by signal path 250 in FIG. 22. However, it is possible to employ such information further upstream, either in place of path 250 or in addition thereto, as illustrated by path 260. Recall that there are eight individual feature maps in each of the groups IC2H, IC3H and IC3L, for a total of twenty-four feature maps.

In the preferred embodiment, the finest level of contrast feature maps, IC1H, supports the formation of consonant-related features.

The gross vertical architecture of the network is that vowel and suprasegmental recognition depends only on vowel- and suprasegmental-related features, whereas consonant recognition depends on vowel-related, suprasegmental-related and consonant-related features. The vowel-related and suprasegmental-related features are formed from the coarser-resolution elementary tonotopic feature maps, whereas the consonant-related features are formed from the finer-resolution elementary tonotopic feature maps in addition to the coarser-resolution ones.

The gross horizontal architecture of the network is the alternate layering of formation and deformation tracts. Recall that tracts are analogous to filters, as explained above. In the preferred embodiment, both phoneme- and suprasegmental-related feature maps are derived at each formation and deformation layer, it being understood that deriving only the phoneme-related or only the suprasegmental-related feature maps may be sufficient for some speech recognition purposes and is within the scope of the invention.

Signal Flow for Vowel or Suprasegmental Recognition (FIG. 23)

We show here in detail the signal flow between formation and deformation tracts in FIG. 22 for recognizing vowels and suprasegmentals. Each rectangular box in the diagram is either a group of related tracts, or a single tract. A tract, as explained above, is conceptually interchangeable with a filter. The array of filter coefficients for a tract is called weights (to conform to conventional terminology in the field of neural networks). There are two levels of formation, one for forming vowel- and suprasegmental-related features, and the other for forming the vowels themselves. For each level of formation, there is a corresponding level of deformation. In a formation layer, a phoneme (i.e., vowel or consonant) or a suprasegmental is recognized in a process similar to that of the CN filters described above, except that the weights of the layer (corresponding to the CN filter coefficients) are obtained by training instead of by using Gabor functions as is the case with the CN filter coefficients. The weights of the deformation layers, however, are fixed.

The formation of a vowel- and suprasegmental-related feature map uses tracts connecting it to the feature maps at the next lower levels. So, the formation of the first of sixteen vowel-related feature maps, VFF00, uses tracts connecting it to all twenty-four feature maps of IC2H, IC3H and IC3L. This group of tracts has been collectively named IC_VFF00. The individual tracts are named IC2H00_VFF00, IC2H01_VFF00, etc. (For convenience, we have labeled the IC feature maps here in numeric order, rather than spelling out the names of the features they extract.)

We obtain the invariant vowel- and suprasegmental-related feature map VFD00 from VFF00 when we operate on it with the single tract named VFF00_VFD00, which consists of an array of 7×7 weights of equal value, which maybe set to 1. That is, VFF00_VFD00 sums the values of the VFF00 feature map within a 7×7 region to form VFD maps. Other variations of local averaging may include setting most but not all of the weights to be close in value to each other. The diagram shows sixteen such deformation tracts: VFF00_VFD00 to VFF15_VFD15, but in fact, they have identical weights.

A vowel map is a map showing the occurrences of that vowel at different tones and times. The vowel map for the vowel A (as in "hard"), is labeled VOF-A. It is formed by the group of tracts VFD_VOF-A which connects it to all the invariant vowel-related feature maps (VFD maps). The final vowel output is a degenerate map of one tone, which shows the occurrence of that vowel at different times. At any given instant of time, the phoneme with the highest output is taken to be the recognized phoneme.

For suprasegmentals, the interpretation of the output is different. The suprasegmental is considered present if the output is positive, and absent if the output is zero or negative. The suprasegmental "syllabic" qualifies the corresponding recognized phoneme as beginning a new syllable. The suprasegmental "stressed" qualifies the corresponding syllable as being stressed.

A phoneme is either a vowel or a consonant. Listed below are all the vowels for English: their symbols and representative examples. Monophthongs:

| Monophthongs: | | |
|---|---|---|
| i | as in | hid |
| e | as in | head |
| a | as in | had |
| ~ | as in | herd |
| — | as in | HUD |
| A | as in | hard |
| o | as in | hod |
| u | as in | hood |
| O | as in | hoed |
| I | as in | heed |
| @ | as in | hawed |

-continued

| U | as in | who'd |
|---|---|---|
| Diphthongs: | | |
| E | as in | hayed |
| Y | as in | hide |
| W | as in | how |
| % | as in | hoy |
| R | as in | here |
| & | as in | haired |
| \| | as in | hired |
| Q | as in | hued |

Signal Flow for Consonant Recognition (FIG. 24)

The description above of formation and deformation tracts for FIG. 23 applies to consonant recognition as well, and the terminology is identical if "V" in the various terms in FIG. 23 is replaced by "C" in FIG. 24. Not shown in this diagram for lack of space but indicated in FIG. 22 are the consonant formation tracts connecting the COF consonant maps to the VFD invariant vowel-related feature maps. So, for example, in the formation of the consonant map COF-b, we need not only the group of tracts labeled CFD_COF-b, shown in the diagram, but also the group of tracts VFD_COF-b.

We list below all the consonants and their symbols.

| Stops, voiced | | |
|---|---|---|
| b | d | g |
| Stops, voiceless | | |
| p | t | k |
| Stops, nasal | | |
| m | n | N(ng) |
| Approximants | | |
| l | r | w | y |
| Fricatives, voiced | | |
| v | z | D(th) | Z(sh) |
| Fricatives, voiceless | | |
| f | s | T(th) | S(sh) |
| Africatives | | |
| c(ch) | j | |
| Aspirants | | |
| h | | |

It will be understood that the invention is applicable to recognition of phonemes different from those above.

Superposition Scheme for Feature Formation from IC1H Maps (FIG. 25)

The superposition, multiplication, and summing schemes in the Neural Network section is similar to that described above for the CN/IC filter section in reference to FIGS. 13, 17 and 18. This figure shows how the 5×5 array of weights of an individual feature formation tract (IC-CFF) is superposed on a twenty-one-tone IC1H feature map to produce a twenty-one tone CFF feature map of FIG. 24. The centers of the 5×5 arrays are located, for example, at the shaded squares. These correspond to the similarly shaded squares in the output feature map. For example, for the superposition, multiplication of overlapping quantities and the summation of the resulting products when the center of the superposing 5×5 array is at $E_{11}$, the sum from such summation is placed at $F_{11}$ corresponding to $E_{11}$. Similarly, for the superposition, multiplication of overlapping quantities and the summation of the resulting products when the center of the superposing 5×5 array is at $E_{12}$, the sum from such summation is placed at $F_{12}$ corresponding to $E_{12}$. For the same reason, the sum of the same process with the array center placed at $E_{213}$ is placed at $F_{213}$. For the lower and upper two tones, such as those corresponding to tones $F_{11}$, $F_{21}$, $F_{201}$, $F_{211}$ in the phoneme feature map, only part of the 5×5 array is used.

Superposition Scheme for Feature Formation from IC2H Maps. (FIGS. 26A–26C)

The difference between feature formation from an IC2H map (ie. IC-CFF in FIG. 23) and an IC1H map is in how the cells of the tract array are spaced one apart on the grid of cells of the IC2H feature map in both the tone and time direction. For example, adjacent cells G, H are spaced one tone apart as shown. Otherwise, the superposition, multiplication, and summing procedure is the same. The superposition scheme of FIG. 26A is said to have a stride of 2. We still output a twenty-one tone feature map, but for the lower and upper four tones, only part of the 5×5 array is used.

FIGS. 26B and 26C together show the signal flow through the feature formation tracts in nine blocks. The same points in the two FIGS. 26B, 26C are marked by the same letters (a, b, c, d, e, f) to show how the parts of the circuits in the two figures are connected. Each block terminating in an adder represents a tract. The pattern of signal fan-in from the IC2H filter outputs is for no decimation in the tone direction, but the tracts input every other tone (the diagram only shows part of the entire circuit for 21 input tones). Also, the double delay elements in the circuit implies the tract inputs every other sample in time also. The symmetrical signal flow in the tone and time directions is better illustrated by the superposition scheme of FIG. 26A, where each input or output signal is represented by a square. Circuits for different superposition schemes differ only in the fan-in pattern and amount of delay.

Superposition Scheme for Feature Formation from IC3H or IC3L Maps (FIG. 27) for IC-CFF in FIG. 23

This superposition scheme has a stride of 4—the cells of the tract array are spaced three apart in tone and time. Out of the twenty-one tones on the output phoneme feature map, only the middle five make use of the entirety of the tract array. The lower eight and upper eight tones make use of only parts of the tract array.

Superposition Scheme for Feature Deformation (FIGS. 28A, 28B)

As explained previously, a deformation tract VFF-VFD, CFF-CFD in FIGS. 23, 24 consists of an array of 7×7 weights which can be all equal to 1. The lower and upper two tones are dropped and the output is decimated by 2 in the tone direction only, resulting in a nine-tone invariant feature map.

FIG. 28B shows the signal flow through the feature deformation tracts. Each block terminating in an adder represents a tract. The pattern of signal fan-in is for a decimation of 2 in the tone direction. There is no decimation in the time direction. The signal flow in the tone and time directions is better illustrated by the superposition scheme of FIG. 28A, where each input or output signal is represented by a square.

Superposition Scheme for Phoneme/Suprasegmental Formation and Output (FIG. 29)

A phoneme formation tract (VFD-VOF, VFD-SUF of FIG. 23; CFD—COF of FIG. 24) also has a 5×5 array of weights. This scheme has a stride of 1 (i.e., contiguous) in the tone direction, and a stride of 2 in the time direction. The bottom and top two tones are dropped, resulting in a five-tone phoneme/suprasegmental map.

A phoneme output tract (which is a deformation tract) i.e., VOF-A_A ... VOF-Q_Q ... SUF of FIG. 23; COF-b_b ... COF-h of FIG. 24 has a 5×1 array of weights all identically equal to 1. This results in the single phoneme or suprasegmental output showing the occurrence of the phoneme or suprasegmental in time.

Detail Signal Flow of Tract Operation (FIG. 30)

As previously discussed, feature formation and phoneme formation maps depend on many tracts. FIG. 30 illustrates a circuit for implementing the superposition, multiplication and summing operations called for in FIG. 26. The multiplications are performed by multipliers 202, and the products are summed by adder 204. The notation "... from other connected tracts" next to the summation sign indicates that the signal flow from all the supporting tracts are summed before thresholding and passing through a nonlinear amplifier with threshold and cutoff. The threshold and cutoff are known to those skilled in the art. Circuits similar to that of FIG. 30 may be used to implement other tract operations in FIGS. 25, 27–29.

Network Development

The network described above may be trained using back propagation in a manner known to those skilled in the art.

System Results in Analyzing the Sound "garp"(gAp)

The results obtained in using the system of FIGS. 1–30 described in detail above in analyzing the sound "gAp" (pronounced garp) are described below. FIG. 31 is a two-dimensional (frequency and time) representation of the two hundred eighty-one outputs of the cochlear filter bank 104 of FIG. 1, where again the amplitude of the sound signal is proportional to the darkness of the image. The three portions of the representation corresponding to consonant "g," vowel "A," and consonant "p" are labeled accordingly in FIG. 31.

FIGS. 32A, 32B together are a graphical illustration of the outputs of the CN/IC filters 106 in FIG. 1. These filters are used to analyze the two-dimensional representation of FIG. 31. Thus, as shown in FIGS. 32A, 32B, the onset-sine and onset-cosine CN maps identify the onset times of significant tones in the sound produced when one says "gAp." The tone-sine and tone-cosine CN maps then identify frequency information present in the sound and the remaining four CN maps identify the fall and rise of significant tones in the sound.

The dark areas in the various maps in FIGS. 32A–32D identify positive amplitude events whereas bright areas identify negative amplitudes of the significant tone related events, and gray areas contain essentially no event information. Also shown in FIGS. 32A, 32B are the outputs of the IC1 contrast filters, where each of the eight contrast maps are labeled accordingly corresponding to the labels of the eight CN maps. The smoothing and contrast maps for IC1, IC2 and IC3 follow the same from bottom to top order. The smoothing maps, going from left to right in decreasing resolution, show a progressive loss of fine details and the smearing out of more uniform patches. The contrast maps show strong output where there is sharp contrast of the corresponding orientation in the corresponding smoothing map, indicating the boundaries at each level of resolution.

As would be apparent from FIGS. 32A, 32B the pattern of the phonemes in the sound becomes more and more apparent as resolution becomes coarser. Thus, at the coarsest level, that is the contrast and smoothing maps for the IC3 filters, the patterns become the most apparent.

The outputs of the IC filters are then processed by the neural network 108 of FIG. 1 where the outputs of the formation and deformation layers are shown in FIGS. 32C, 32D. Also shown are the phoneme formation maps and phoneme output maps. As is evident from FIGS. 32C, 32D not only are the phonemes in the sound "gAp" identified, so are the suprasegmentals. For example, the full vowel suprasegmental indicated in the phoneme output maps overlap in time the vowel "A" and therefore indicates that such vowel is a full vowel. Similarly, the voiced syllabic consonant suprasegmental overlaps "g" in the phoneme output maps and indicates that such consonant is syllabic. As indicated above, by employing the above-described techniques, the system 100 in FIG. 1 of this invention is capable of recognizing phonemes in continuous speech against noisy backgrounds and is speaker-independent.

While the invention has been described above in reference to various embodiments, it will be understood that various modifications and changes may be made without departing from the scope of the invention which is to be limited only by the appended claims.

What is claimed is:

1. A system for recognizing speech features in an input speech signal, said input speech signal changing over tame and containing tonotopic information, said system comprising:
   first means for filtering the input speech signal provide an output having amplitudes that are functions of both tonotopy and time in a first two dimensional representation, said output indicating the tonotopic information of said input speech signal over a time period; and
   second means for filtering said output to provide an output that, over time, indicates a second two dimensional representation in tonotopy and time of one or more elementary tonotopic features of the input speech signal, said features including onset, rise and fall of any significant tones of the input speech signal over time.

2. The system of claim 1, wherein said output of the second filtering means indicates at least two of the three features, namely, the onset, rise and fall of any significant tones of the input speech signal over time.

3. (Amended) The system of claim 2, wherein said output of the second filtering means also indicates frequency of any significant tones of the input speech signal.

4. The system of claim 1, further comprising a neural network responsive to said second two dimensional representation of said input speech signal for identifying phonemes, groups of phonemes or suprasegmentals in said input signal.

5. The system of claim 4, wherein said network includes at least one pair of phoneme- or suprasegmental-related formation and deformation layers to provide formation and deformation maps, said deformation layer performing a local-averaging function on said formation map to provide the deformation map.

6. The system of claim 4, wherein said first filtering means is a filter bank having coefficients that are functions of selected dimensions of a representative biological cochlear.

7. The system of claim 6, said representative biological cochlear having a basilar membrane with a breadth, wherein said coefficients are functions of the breadth of the basilar membrane.

8. The system of claim 1, wherein said first filtering means includes a bank of M filters having different frequency pass bands, M being a positive integer greater than 1, each filter providing an output, said filters being indexed from 1 to M by pass band frequencies of the filters along a frequency axis and the outputs of the filters at N different times being indexed from 1 to N along a time axis, N being a positive integer greater than 1, forming an M by N array of filter outputs, said second filtering means including:
   means for superposing at least one p by q array of filter coefficients upon a portion of said M by N array of filtered outputs, p and q being positive integers, so that each coefficient corresponds to a filter output in said M by N array; and
   means for multiplying each coefficient by the corresponding filter output to obtain products and summing said products to obtain a first processed value for said superposition upon said one portion.

9. The system of claim 8, wherein said superposing means includes p(q-1) delay elements for delaying p outputs of the M filter outputs and pq gain or amplifying elements for amplifying the outputs.

10. The system of claim 8, wherein said superposition means superposes said p by q array upon each of mn different portions of the M by N array, m and n being positive integers, where the portions form an m by n array along the frequency and time axes, and wherein, for each superposition upon a portion, said multiplying means multiplies each coefficient by the corresponding filter output to obtain products and summing said products to obtain a first processed value, thereby obtaining from the mn superpositions and multiplications an m by n array of first processed values along said two axes.

11. The system of claim 10, wherein said portions are selected such that spacing between adjacent portions is the same for the m by n array of portions.

12. The system of claim 10, wherein said superposing means superposes each of 2 p by q arrays of coefficients upon one or more portions of said M by N array successively so that each coefficient corresponds to a filter output in said M by N array, and wherein, for each p by q array and for each superposition, said multiplying means multiplies each coefficient of such p by q array by the corresponding filter output to obtain products and sums said products for such p by q array to obtain one processed value for such superposition, and to obtain one or more such processed values for each p by q array.

13. The system of claim 12, wherein the coefficients of each p by q array are such that the processed values obtained for such array indicate at least two of the following four elementary tonotopic features: the onset, frequency, rise and fall of any significant tones in the input signal.

14. The system of claim 13, wherein said superposing means superposes each of 4 pairs of p by q arrays of coefficients upon one or more portions of said M by N array successively so that each coefficient corresponds to a filter output in said M by N array, and wherein the coefficients of each pair of p by q arrays are such that the processed values obtained for such pairs of arrays indicate respectively one of the following four elementary tonotopic features: the onset, frequency, rise and fall of any significant tones in the input signal.

15. The system of claim 8, wherein the coefficients of said p by q array are such that the processed value obtained indicates one of the following elementary tonotopic features: the onset, frequency, rise or fall of any significant tones in the input signal.

16. The system of claim 8, wherein said superposition means superposes said p by q array upon different portions of the M by N array so that each of the M by N filter outputs is superposed upon at least one coefficient, and wherein said multiplying means multiplies each of the M by N filter outputs by at least one coefficient.

17. The system of claim 8, wherein said coefficients are symmetric or anti-symmetric functions of frequency and time.

18. The system of claim 8, wherein said coefficients are symmetric or anti-symmetric functions of frequency and time modulated by a Gaussian function.

19. The system of claim 18, wherein said coefficients are Gabor functions of frequency and time.

20. The system of claim 1, said second filtering means including at least two filters at different resolutions for filtering the output of the first filtering means to provide speech context information for the recognition of phonemes.

21. The system of claim 20, further comprising a neural network responsive to said two dimensional representation of said input speech signal for identifying phonemes, groups of phonemes or suprasegmentals in said input signal.

22. The system of claim 21, wherein said network includes at least one pair of phoneme- or suprasegmental-related formation and deformation layers to provide formation and deformation maps, said deformation layer performing a local-averaging function on said formation map to provide the deformation map.

23. A filter bank for improving signal to noise ratio in processing an input signal comprising:
   a plurality of M filters arranged in parallel, M being a positive integer, each filter having a first stage and a second stage;
   wherein the first stage of each filter includes:
   (a) first delay means for delaying the input signal, and
   (b) means for subtracting from the input signal or a signal derived therefrom the delayed input signal or a signal derived therefrom and adding thereto feedback signals from at least some of the second stages of the M filters or signals derived therefrom to derive an output signal;
   wherein the second stage of each filter provides an output signal and includes:
   (c) first means for adding the output signals of the first stages of at least some of the filters or signals derived therefrom to obtain a first sum signal;
   (d) second means for delaying said first sum signal and supplying said delayed first sum signal or a signal derived therefrom to the first stages of at least some of the filters;
   (e) second means for adding the sum signal and the delayed sum signal or signals derived therefrom to obtain a second sum signal;
   (f) third means for delaying the output signal of the second stage and supplying said delayed output signal of the second stage or a signal derived therefrom to the first stages of at least some of the filters; and
   (g) means for adding to the second sum signal or a signal derived therefrom the delayed output signal of the second stage or a signal derived therefrom to derive the output signal of the second stage.

24. The filter bank of claim 23, wherein M is greater than or equal to 10, and wherein the subtracting and adding means (b) adds feedback signals from at least half of the second stages of the M filters or signals derived therefrom in deriving the output signal, and wherein the first adding means adds the output signals of the first stages of at least half of the filters or signals derived therefrom to obtain said first sum signal.

25. The filter bank of claim 23, wherein said first, second and third delaying means introduce substantially the same delay.

26. The filter bank of claim 23, further comprising means for sampling the input signal, the first and second sum signals, and the output signals of the two stages, at a substantially constant sampling rate and at sampling interval T to obtain samples of such signals, wherein at $(n-1)$th and at nth time instants when such signals are sampled, n being a positive integer, an $(n-1)$th sample and an nth sample of each of such signals are obtained.

27. The filter bank of claim 26, i and j being integers in the range 1 to M, wherein the nth sample $z^i(n)$ of said output signal of said first stage of the ith filter is given by:

$$\bar{z}^i(n) = a_1^i * z_1^i(n-1) + c^i * \Sigma_j d^j \Theta^i_j * z_1^j(n-1) + a_2^i * z_2^i(n-1) + b^i * (u(n) - u(n-1))$$

where the $(n-1)$th sample $z_1^i(n-1)$ and the nth sample $z_1^i(n)$ of the first sum signal for the ith filter are respectively given by:

$$z_1^i(n-1) = \Sigma_j e^i_j * \bar{z}^j(n-1);$$

$$z_1^i(n) = \Sigma_j e^i_j * \bar{z}^j(n);$$

where the nth sample $z_2^i(n)$ of the output signal of the second stage of the ith filter is given by:

$$z_2^i(n) = z_2^i(n-1) + (T/2) * (z_1^i(n) + z_1^i(n-1));$$

where $z_2^i(n-1)$ is the $(n-1)$th sample of the output signal of the second stage of the ith filter;
where the $(n-1)$th sample and nth sample of the input signal are respectively $u(n-1)$ and $u(n)$;
where $$\Theta^i_j = \begin{cases} i, & i < j \\ 0, & i = j \\ j, & j < i \end{cases};$$

$\Sigma_k [\delta^i_k + c^i \Theta^i_k d^k] e^k_j = \delta^i_j$; and
where $a_1^i$, $a_2^i$, $b^i$, $c^i$, $d^i$ are constants.

28. The filter bank of claim 27, said bank suitable for use in recognizing speech features in speech input signals, wherein when $a^i_1$ is in the range between 0 and about 1, the coefficients $a_2^i$, $b^i$, $c^i$, $d^i$ are respectively in the ranges between about $-1,000,000,000$ and 0, about $-100,000$ and 0, 0 and about 10, and 0 and about 10,000, for all values of i between 1 and M.

29. The filter bank of claim 27, said bank suitable for use in recognizing speech features in speech input signals, wherein $a_1^i$, $a_2^i$, $b^i$, $c^i$, $d^i$ are related to characteristics of a representative human cochlear according to the following relations, where the height and width of the scalae vestibuli and tympani of the cochlear are H, where the density of a fluid in the scalae is $\rho$, where the basilar membrane of length L of the cochlear comprises M sections, and where the ith section has mass $m^i$, breadth $B^i$, damping coefficient $q^i$, stiffness coefficient $K^i$:

$$\mu^i = m^i + (\tfrac{1}{3})\rho H B^i + 2\rho(D/H)^2(B^i)^2 * i + q^i(T/2) + K^i(T/2)^2;$$

$$a^i_1 = (m^i + (\tfrac{1}{3})\rho H B^i + 2\rho(D/H)^2(B^i)^2 * i - q^i(T/2) - K^i(T/2)^2)/\mu^i;$$

$$a^i_2 = -2K^i(T/2)/\mu^i;$$

$$b_i = -2\rho D B^i * i/\mu^i;$$

$$c^i = 2\rho D^2(B^i/H)/\mu^i;$$

$$d^i = B^i/H;$$

and $$D = L/M.$$

30. The filter bank of claim 29, wherein the quantity $B^i$ varies linearly with the distance of the ith section from one end of the basilar membrane.

31. The filter bank of claim 23, wherein said M filters have substantially non-overlapping frequency pass bands.

32. A system for recognizing speech features in an input speech signal that has time and frequency dependent amplitudes, said system comprising means for filtering said input speech signal or a signal derived therefrom in a two dimensional representation in tonotopy and time to provide an output indicating contrast information in the representation, said contrast information in turn indicating the presence of any significant speech features in the input speech signal.

33. The system of claim 32, said filtering means including at least two contrast filters at different resolutions.

34. The system of claim 33, wherein the input speech signal contains significant local variations in the two dimensional representation of the input speech signal, said two dimensional representation having a tonotopic direction and a time direction, said filtering means further comprising an orientation filter providing an output indicating orientations of said local variations with respect to the two directions.

35. The system of claim 34, wherein said orientation filter has a resolution different from those of the contrast filters.

36. The system of claim 34, wherein said local variations define boundaries with said orientations, said contrast filters providing outputs indicating the presence of significant speech features in the input speech signal by indicating said boundaries.

37. The system of claim 34, said two dimensional representation representing tonotopic characteristics of said input signal in tonotopy and time, said system further comprising:
 a neural network including:
  at least one phoneme- or suprasegmental-related formation layer for processing the contrast information and the output of the orientation filter to provide a plurality of phoneme- or suprasegmental-related feature formation maps.

38. The system of claim 32, wherein the input speech signal contains local variations in the two dimensional representation of the input speech signal, said variations having orientations and defining boundaries in said representation, said two dimensional representation having a tonotopic direction and a time direction, said filtering means comprising:
 one or more orientation filters each providing an output indicating orientations of said local variations with respect to the two directions; and
 one or more contrast filters, each filtering the output of one of the orientation filters or a signal derived therefrom to provide an output indicating the locations of the boundaries.

39. The system of claim 38, said system comprising two or more orientation filters providing outputs at different resolutions and two or more contrast filters, wherein each contrast filter filters the output of one of the orientation filters to provide an output indicating the locations of the boundaries.

40. The system of claim 38, said system further comprising one or more smoothing filters connected in series in at least one sequence, each sequence of smoothing filters filtering the output of one of said one or more orientation filters or a signal derived therefrom, defining a corresponding orientation filter, to each provide an output, so that the output of each smoothing filter in a sequence contains average value information indicating orientations of said local variations at a coarser resolution than those indicated by the output of the corresponding orientation filter and by the output of a different smoothing filter upstream in the same sequence, and wherein each contrast filter filters either the output of an orientation filter or the output of a smoothing filter, or a signal derived therefrom to provide an output, said contrast filters each providing an output that is coarser in resolution than the output of the orientation filter or smoothing filter filtered by said each contrast filter, said output of each contrast filter containing contrast value information indicating the locations of the boundaries at different resolutions.

41. The system of claim 40, wherein the output of each smoothing filter in the sequence indicates orientations of said local variations at a resolution coarser than those indicated by the output of the immediately preceding orientation filter or smoothing filter by a factor of 2, and said contrast filters each provides an output that is coarser in resolution than the output of the orientation filter or smoothing filter filtered by said each contrast filter by a factor of 2.

42. The system of claim 40, wherein said sequence includes at least three smoothing filters, said system including at least three contrast filters, one of said contrast filters filtering the output of the orientation filters and each of the remaining contrast filters filtering the output of a corresponding smoothing filter, except for the last smoothing filter in the sequence.

43. The system of claim 40, said system comprising at least a first and a second orientation filter for detecting local variations with a first and a second orientation respectively, wherein the output of the contrast filter filtering the output of the first orientation filter indicates the presence of a boundary with said first orientation, defining a first type of boundary, different from a second type of boundary, the presence of which is indicated by the output of the contrast filter filtering the output of the second orientation filter.

44. The system of claim 43, wherein the orientation of each of the two types of orientation filters is vertical, horizontal, or inclined with respect to the vertical and horizontal directions of the two dimensional representation.

45. The system of claim 43, wherein said smoothing filters are connected in series in at least two sequences, each sequence filtering the output of its corresponding orientation filter to provide outputs indicating orientation of the first or second type of boundaries at coarser resolutions, said contrast filters filtering the outputs of said orientation or smoothing filters in each sequence providing outputs indicating the locations of said first or second type of boundaries.

46. The system of claim 40, said two variables being frequency and time, said two dimensional representation representing tonotopic characteristics of said input signal in tonotopy and time, said system further comprising:
a neural network including:
at least one phoneme- or suprasegmental-related formation layer for processing the contrast value information provided by at least some of the contrast filters and the average value information provided by at least one smoothing filter in the sequence to provide a plurality of phoneme- or suprasegmental-related feature formation maps.

47. The system of claim 46, wherein said neural network processes the average value information provided by the last smoothing filter in the sequence to provide said plurality of phoneme- or suprasegmental-related feature formation maps.

48. The system of claim 47, wherein said layer provides said phoneme- and suprasegmental-related feature formation maps by processing contrast value information derived by the contrast filters of all the resolutions except the contrast filter of the highest resolution and the average value information derived by the last smoothing filter of the sequence, and provides consonant-related feature formation maps by processing contrast value information provided by all of the contrast filters and the average value information provided by the last smoothing filter in the sequence.

49. The system of claim 48, said neural network further comprising at least a first phoneme- or suprasegmental-related deformation layer which performs a local-averaging operation on each phoneme- or suprasegmental-related feature formation map to provide a phoneme- or suprasegmental-related deformation map, and on each consonant-related formation feature map to provide a consonant-related deformation map, said formation and deformation layers defining a first pair of formation and deformation layers.

50. The system of claim 49, said neural network further comprising additional pairs of formation and deformation layers, said pairs connected in a sequence of pairs with the first pair as the first in the sequence, wherein at least one additional pair including:
an additional phoneme- or suprasegmental-related formation layer for processing said phoneme- or suprasegmental-related deformation map provided by the deformation layer of a preceding pair to provide an additional set of phoneme- or suprasegmental-related feature formation maps and for processing said consonant-related and phoneme- or suprasegmental-related deformation maps provided by the deformation layer of a preceding pair to provide an additional group of consonant-related feature formation maps.

51. The system of claim 50, said at least one additional pair further comprising:
an additional phoneme- or suprasegmental-related deformation layer for processing said additional set of phoneme-related or suprasegmental-related feature formation maps to provide an additional phoneme- or suprasegmental-related deformation map.

52. The system of claim 51, wherein the last pair of formation and deformation layers in the sequence of pairs of formation and deformation layers provide a vowel-related deformation map, a suprasegmental-related deformation map, and a consonant-related deformation map that together provide information concerning a phoneme, a group of phonemes, or a suprasegmental.

53. The system of claim 32, said filtering means providing an output indicating the presence of one of three types of boundaries: vertical, horizontal or inclined boundaries.

54. The system of claim 32, wherein the filtering means output indicates at least one of the following: onset, frequency, rise or fall of significant tones in the input signal.

55. A system for recognizing speech features an input speech signal, said input speech signal containing tonotopic information, said system comprising:
means for filtering the input speech signal to provide a filtered output, said output indicating the tonotopic information of said input speech signal over a time period and identifying any significant speech features therein; and
a neural network comprising:
at least one pair of phoneme- or suprasegmental-related formation and deformation layers for processing the output of the filtering means to provide formation and deformation maps, said formation layer processing the output of the filtering means or of the deformation maps to identify phoneme- or suprasegmental-related features in said input speech signal, said deformation layer performing a local-averaging function on said formation map to provide the deformation map to enable the recognition of phonemes or suprasegmentals in said input speech signal irrespective of variability of speech of different speakers.

56. The system of claim 55, said phoneme- or suprasegmental-related formation layer processing the output of the filtering means to provide a plurality of phoneme- or suprasegmental-related feature formation maps; and said phoneme- or suprasegmental-related deformation layer performing a local averaging operation on said plurality of phoneme- or suprasegmental-related feature formation maps to provide invariant phoneme- or suprasegmental-related feature maps.

57. The system of claim 56, wherein said filtering means includes at least one bank of R filters, R being a positive integer greater than 1, each filter providing an output, said filters being indexed from 1 to R along a tone axis and the outputs of the filters at S different times being indexed from 1 to S along a time axis, forming an R by S array of filter outputs;
wherein said at least one formation layer includes a plurality of tracts, each tract including:
means for superposing at least one t by u array of weights upon a portion of said R by S array, t and u being positive integers, so that each weight corresponds to a filter output in said R by S array; and
means for multiplying each weight by the corresponding filter output to obtain products and summing said products to obtain a first processed value for said superposition upon said one portion.

58. The system of claim 57, wherein said superposition means superposes said t by u array upon each of rs different portions of the R by S array, r and s being positive integers smaller than R and S respectively, where the portions form an r by s array along the frequency and time axes, and wherein, for each superposition upon a portion, said multiplying means multiplies each weight by the corresponding filter output to obtain products and summing said products to obtain a first processed value, thereby obtaining from the rs superpositions an r by s array of first processed values along said two axes.

59. The system of claim 58, wherein said at least one deformation layer includes a plurality of tracts each comprising:
   second means for superposing at least one v by w second array of coefficients upon a portion of said r by s array of first processed values, v and w being positive integers smaller than r and s respectively, so that each weight in the second array corresponds to a processed value in said r by s array of first processed values; and
   second means for multiplying each coefficient in the second array by the corresponding first processed value to obtain products and summing said products to obtain a second processed value for said superposition upon said one portion, said coefficients of the second array being such that said second processed value is an average value of the corresponding first processed values.

60. The system of claim 59, wherein said v by w second array of coefficients is a matrix with most of its coefficients substantially equal to each other.

61. The system of claim 57, wherein said superposing means includes t(u−1) delay elements for delaying t outputs of the R filter outputs and tu amplifying elements for amplifying the tu outputs of the R filter outputs.

62. The system of claim 55, said output of the filtering means indicating one or more elementary tonotopic features of the input speech signal in a two dimensional representation of the signal in tonotopy and time, said features including onset, rise and fall of any significant tones in the input speech signal over time.

63. A method for recognizing speech features in an input speech signal, said input speech signal changing over time and containing tonotopic information, said method comprising:
   (a) filtering the input speech signal to provide an output having amplitudes that are functions of both tonotopy and time in a first two dimensional representation, said output indicating the tonotopic information of said input speech signal over a time period; and
   (b) filtering said output to provide an output that, over time, indicates a second two dimensional representation in tonotopy and time of one or more elementary tonotopic features of the input speech signal, said features including onset, rise and fall of any significant tones of the input signal over time.

64. The method of claim 63, wherein said filtering step in step (b) provides an output that indicates at least two of the three features, namely, the onset, rise and fall of any significant tones of the input signal over time.

65. The method of claim 63, wherein said filtering step in step (b) provides an output that indicates also frequency of any significant tones of the input signal.

66. The method of claim 63, wherein said filtering step in step (a) employs a bank of M filters having different frequency pass bands, M being a positive integer greater than 1, each filter providing an output, said filters being indexed from 1 to M by pass band frequencies of the filters along a frequency axis and the outputs of the filters at N different times being indexed from 1 to N along a time axis, N being a positive integer greater than 1, forming an M by N array of filter outputs, said filtering step in step (b) including:
   superposing at least one p by q array of filter coefficients upon a portion of said M by N array of filtered outputs, p and q being positive integers, so that each coefficient corresponds to a filter output in said M by N array; and
   multiplying each coefficient by the corresponding filter output to obtain products and summing said products to obtain a first processed value for said superposition upon said one portion.

67. The method of claim 66, wherein the coefficients of said p by q array in the superposing step indicates one of the following elementary tonotopic features: the onset, frequency, rise or fall of any significant tones in the input signal.

68. The method of claim 63, said filtering step in step (b) including filtering the output of the filtering step in step (a) at different resolutions to provide speech context information for the recognition of phonemes.

69. A method for recognizing speech features in an input speech signal that has time and frequency dependent amplitudes, said method comprising filtering said signal or a signal derived therefrom in a two dimensional representation in tonotopy and time to provide an output indicating contrast information in the representation, said contrast information in turn indicating the presence of any significant speech features in the input speech signal.

70. The method of claim 69, said filtering including filtering at different resolutions to derive contrast information.

71. The method of claim 70, wherein the input speech signal contains significant local variations in the two dimensional representation of the input speech signal, said two dimensional representation having a vertical tonotopic direction and a horizontal time direction, said filtering further comprising providing an output indicating orientations of said local variations with respect to the two directions.

72. The method of claim 71, wherein said providing step provides an output at a resolution different from those of the contrast information derived by the filtering.

73. The method of claim 71, wherein said local variations define boundaries with said orientations, said filtering at different resolutions generating outputs that indicate the presence of significant speech features in the input speech signal by indicating said boundaries.

74. A method for recognizing speech features in an input speech signal, said input speech signal containing tonotopic information, said system comprising:
   filtering the input speech signal to provide a filtered output, said output indicating the tonotopic information of said input speech signal over a time period and identifying any significant speech features therein; and processing the output of the filtering step to provide a formation map to enable the identification of phoneme- or suprasegmental-related features in said input speech signal, and performing a local-averaging function on said formation map to provide a deformation map to enable the recognition of phonemes or suprasegmentals in said input speech signal irrespective of variability of speech of different speakers.

75. The method of claim 74, said processing and performing step processing the output of the filtering step to provide a plurality of phoneme- or suprasegmental-related feature formation maps and performing a local averaging operation on said plurality of phoneme- or suprasegmental-related feature formation maps to provide invariant phoneme- or suprasegmental-related feature maps.

* * * * *

UNITED STATES PATENT AND TRADEMARK OFFICE
CERTIFICATE OF CORRECTION

PATENT NO.   : 5,377,302
DATED        : December 27, 1994
INVENTOR(S)  : Elaine Y.L. Tsiang It is certified that error appears in the above-indentified patent and that said Letters Patent is hereby corrected as shown below:

In Column 29, Line 26 in Claim 1:
    Replace "over tame and containing tonotopic information, said" with --over time and containing tonotopic information, said--

In Column 29, Line 28, in Claim 1:
    Replace: "first means for filtering the input speech signal pro-" with --first means for filtering the input speech signal to pro- In Column 36, Line 22, in Claim 55:
    Replace "55. A system for recognizing speech features an input" with --55. A system for recognizing speech features in an input--

Signed and Sealed this

Tenth Day of October, 1995

*Attest:*

BRUCE LEHMAN

*Attesting Officer*      *Commissioner of Patents and Trademarks*